United States Patent [19]

Fleming et al.

[11] Patent Number: 5,748,891
[45] Date of Patent: May 5, 1998

[54] SPREAD SPECTRUM LOCALIZERS

[75] Inventors: Robert Alan Fleming; Cherie Elaine Kushner, both of Nicasio, Calif.

[73] Assignee: Aether Wire & Location, Nicasio, Calif.

[21] Appl. No.: 279,329

[22] Filed: Jul. 22, 1994

[51] Int. Cl.⁶ .................................................. H04B 15/00
[52] U.S. Cl. ........................... 375/200; 375/204; 375/208; 342/132; 342/145; 342/189
[58] Field of Search ........................... 375/200–210, 375/219; 342/145, 128, 189, 379, 132; 367/125; 380/34; 327/164, 165–167, 172, 291, 293

[56] References Cited

U.S. PATENT DOCUMENTS

| | | | |
|---|---|---|---|
| 4,506,267 | 3/1985 | Harmuth | 343/744 |
| 5,134,408 | 7/1992 | Harmuth | 342/21 |
| 5,216,691 | 6/1993 | Kaufmann | 375/206 |
| 5,274,271 | 12/1993 | McEwan | 307/108 |
| 5,345,471 | 9/1994 | McEwan | 375/200 |
| 5,361,070 | 11/1994 | McEwan | 342/21 |
| 5,365,516 | 11/1994 | Jandrell | 375/200 |
| 5,488,662 | 1/1996 | Fox et al. | 380/34 |

OTHER PUBLICATIONS

"Spread Spectrum Systems," R. C. Dixon, John Wiley and Sons, Second Edition, 1984, chapter 2.

"Frequency–Sharing and Spread–Spectrum Transmission with Large Relative Bandwidth," H. F. Harmuth, IEEE Transactions on Electromagnetic Compatibility, vol. EMC–20, No. 1, Feb. 1978, pp. 232–239.

"An Overview of Impulse Radar Phenomenon," D. L. Black, IEEE AES Systems Magazine, Dec. 1992, pp. 6–11.

"Shift Register Sequences," S. W. Golomb, Aegean Park Press, Laguna Hills, CA, 1982, pp. 2–6 and 24–30.

"New approach to microwave reflectometry: correlation reflectometry via stochastic noise signals," V. S. Korostejlov, et al., IAEA Technical Meeting on Microwave Reflectometry for Fusion Research, Abingdon, England, Mar. 1992.

(List continued on next page.)

Primary Examiner—Stephen Chin
Assistant Examiner—Amanda T. Le
Attorney, Agent, or Firm—Trial & Technology Group

[57] ABSTRACT

A network of localizers determines relative locations in three-dimensional space to within 1 cm by cooperatively measuring propagation times of pseudorandom sequences of electromagnetic impulses. Ranging transmissions may include encoded digital information to increase accuracy. The propagation time is determined from a correlator circuit which provides an analog pseudo-autocorrelation function sampled at discrete time bins. The correlator has a number of integrators, each integrator providing a signal proportional to the time integral of the product of the expected pulse sequence delayed by one of the discrete time bins, and the non-delayed received antenna signal. With the impulses organized as doublets the sampled correlator output can vary considerably in shape depending on where the autocorrelation function peak falls in relation to the nearest bin. Using pattern recognition the time of arrival of the received signal can be determined to within a time much smaller than the separation between bins. Because operation of standard CMOS circuitry generates noise over a large frequency range, only low-noise circuitry operates during transmission and reception. To provide the time accuracy necessary for distancing, a high-frequency clock operates during inter-localizer communications. The high-frequency clock uses a phase-lock loop circuit to increase the clock rate and a programmable delay to provide still finer time graduations. A stage in the low-frequency clock uses low-noise circuitry during transmissions and receptions, and standard circuitry at other times.

16 Claims, 35 Drawing Sheets

OTHER PUBLICATIONS

"Noise–Modulated Distance Measuring Systems," B.M. Horton, Proceedings of the I.R.E., May, 1959, pp. 821–828.

"A CCD Time–Integrating Correlator," B. E. Burke and D. L. Smythe, Jr., IEEE Journal of Solid–State Circuits, vol. SC–18, No. 6, Dec. 1983, pp. 736–744.

"Programmable, Four–Channel, 128–Sample, 40–Ms/s Analog–Ternary Correlator," S. C. Monroe, et al., IEEE Journal of Solid–State Circuits, vol. 25, No. 2, Apr. 1990, pp. 425–430.

"CMOS Active Filter Design at Very High Frequencies," Y.–T. Wang and A. A. Abidi, IEEE Journal of Solid–State Circuits, vol. 25, No. 6, Dec. 1990, pp. 1562–1574.

"A Ratio–Independent Algorithmic Analog–to–Digital Conversion Technique," P. W. Li, et al., IEEE Journal of Solid–State Circuits, vol. SC–19, No. 6, Dec. 1984, pp. 828–836.

"A BiCMOS Time Interval Digital For High–Energy Physics Instrumentation," M. J. Loinaz and B. A. Wooley, IEEE 1993 Custom Integrated Circuits Conference, pp. 28.6.1–28.6.4.

"Charge–Pump Phase–Lock Loops," F. M. Gardener, IEEE Transactions on Communications, vol. Com–28, No. 11, Nov. 1980, pp. 1849–1858.

"Radiation of Nonsinusoidal Electromagnetic Waves," H. F. Harmuth, Academic Press, San Diego, CA, 1990, pp. 36–47.

"DC Motors, Speed Controls, Servo Systems," Electro–Craft Corporation, Hopkins, MN, Third Edition, 1975, pp. 4–31 and 4–32.

"Guide to GPS Positioning," D. Wells, Canadian CPS Associates, Second Printing, 1987, pp. 4.10 to 4.15 and 6.0 to 6.6.

"The GPS message on the hardware platform," P. Mattos, Electronics World + Wireless World, Feb. 1993, pp. 146–151.

"Global Positioning System," Institute of Navigation, Washington, D.C., vol. 1, 1980, pp. 81–86.

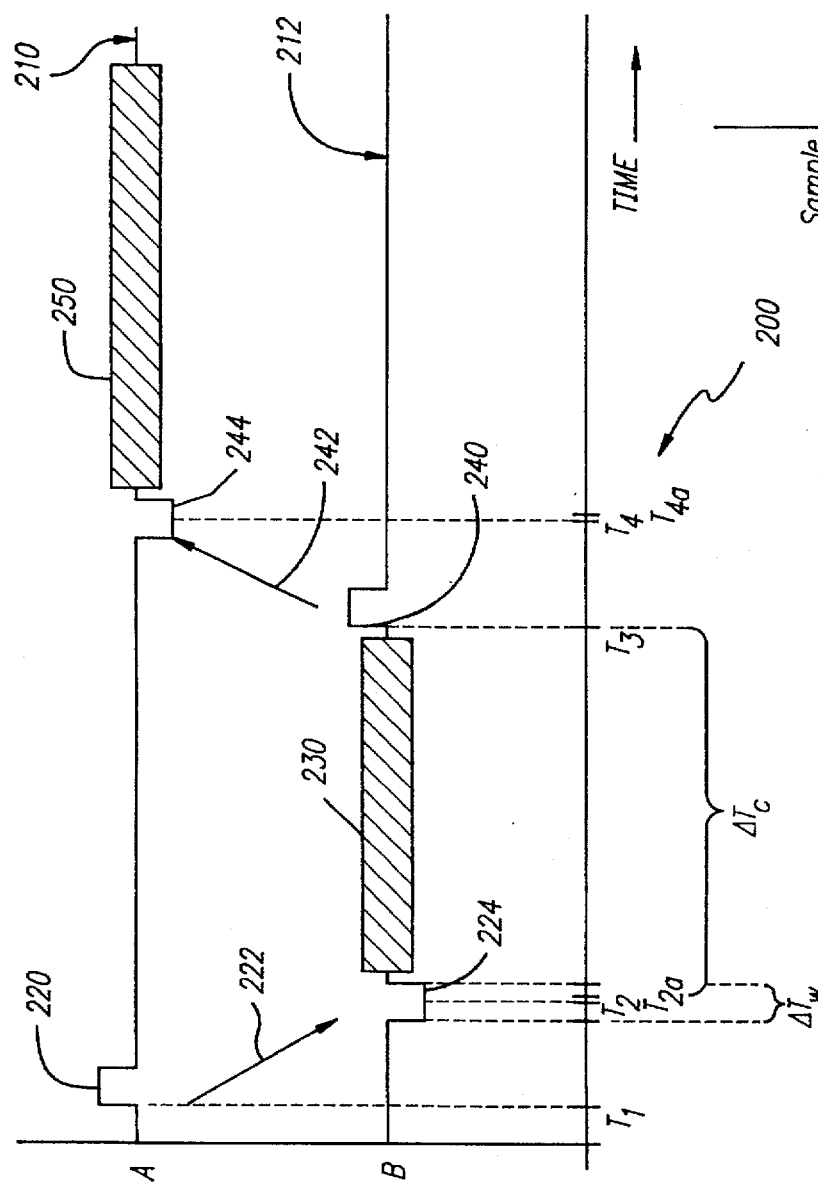

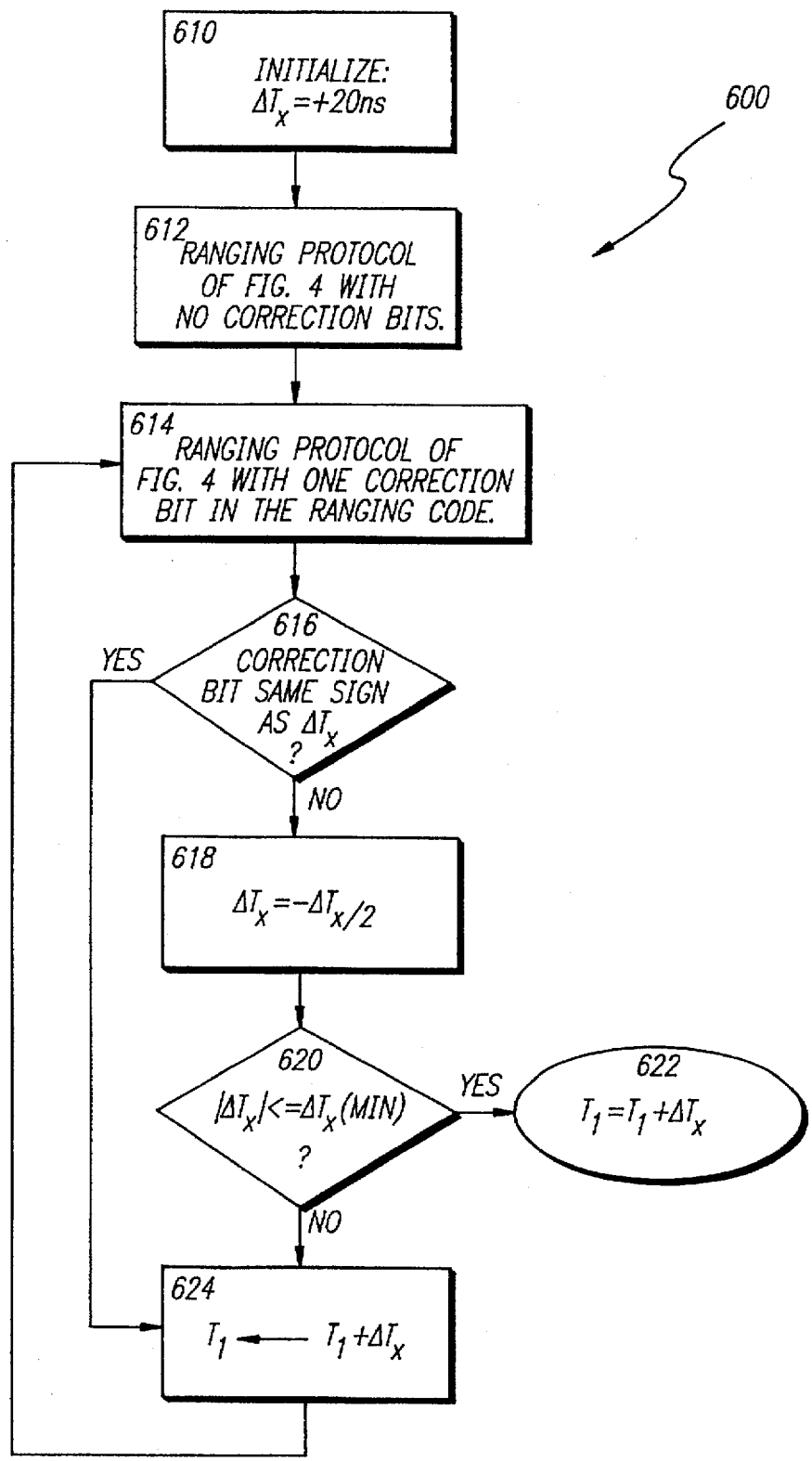

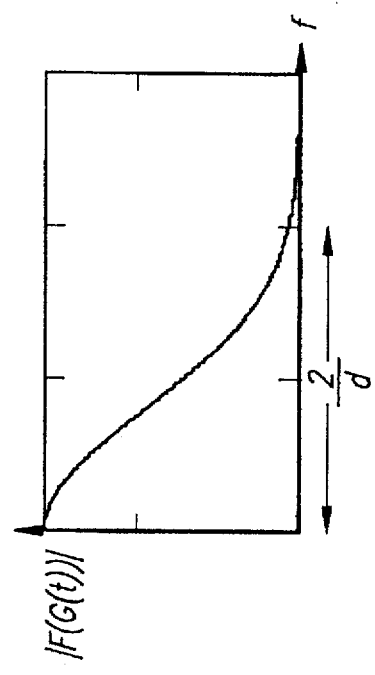
FIG. 10a.1
FIG. 10a.2
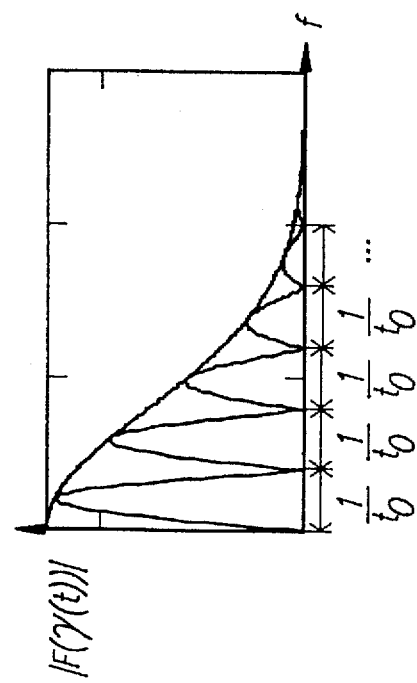
FIG. 10b.1
FIG. 10b.2
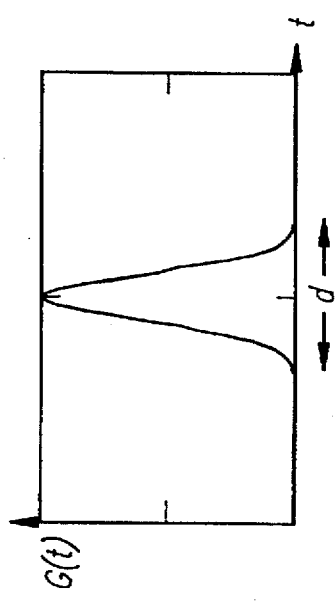
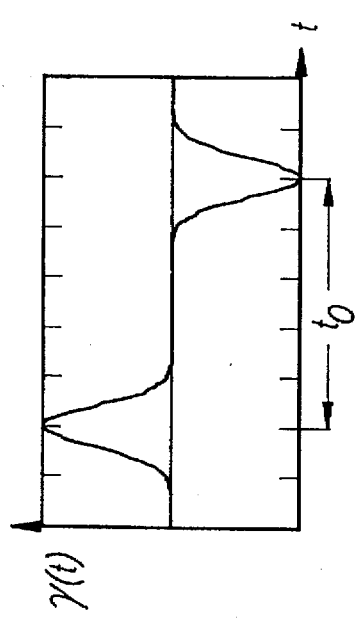

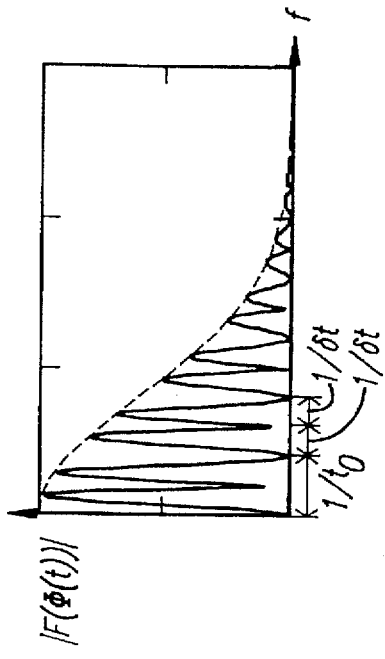
FIG. 10c.2
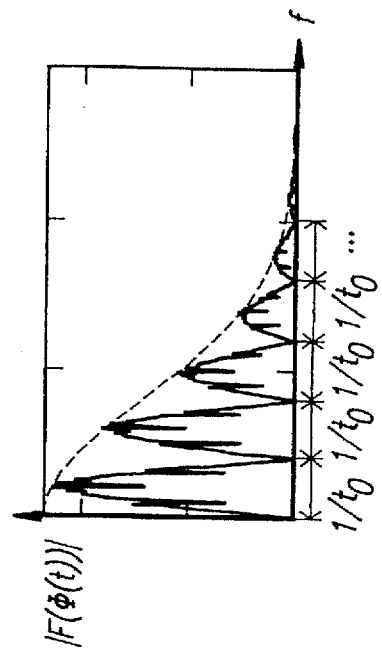
FIG. 10d.2
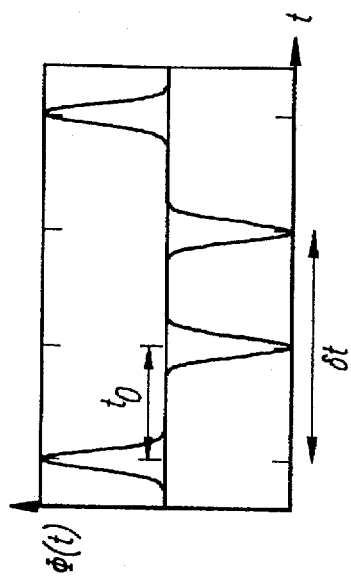
FIG. 10c.1
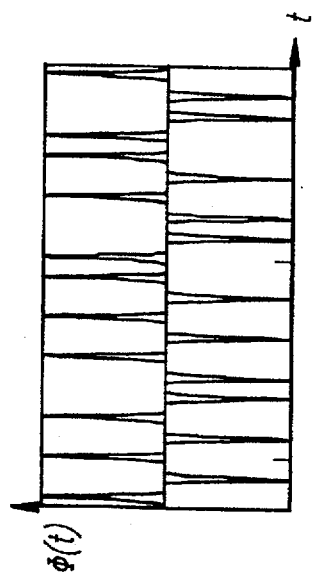
FIG. 10d.1

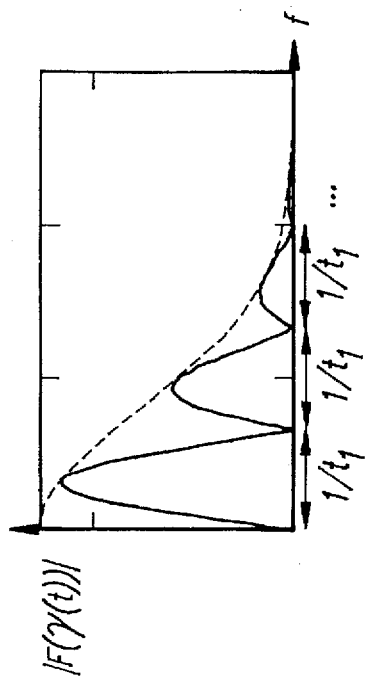
FIG. 10e.1
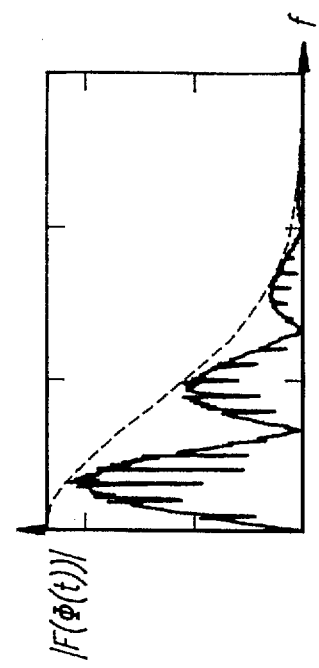
FIG. 10e.2
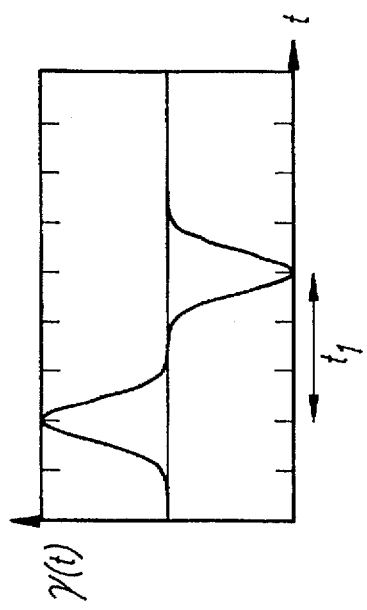
FIG. 10f.1
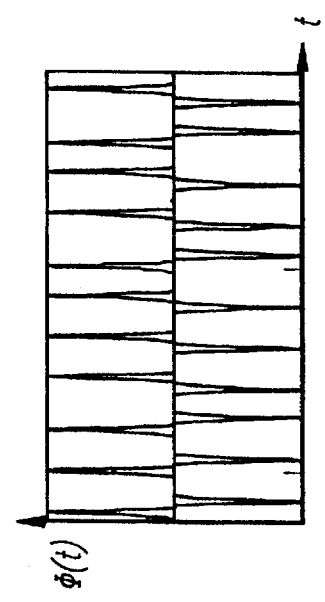
FIG. 10f.2

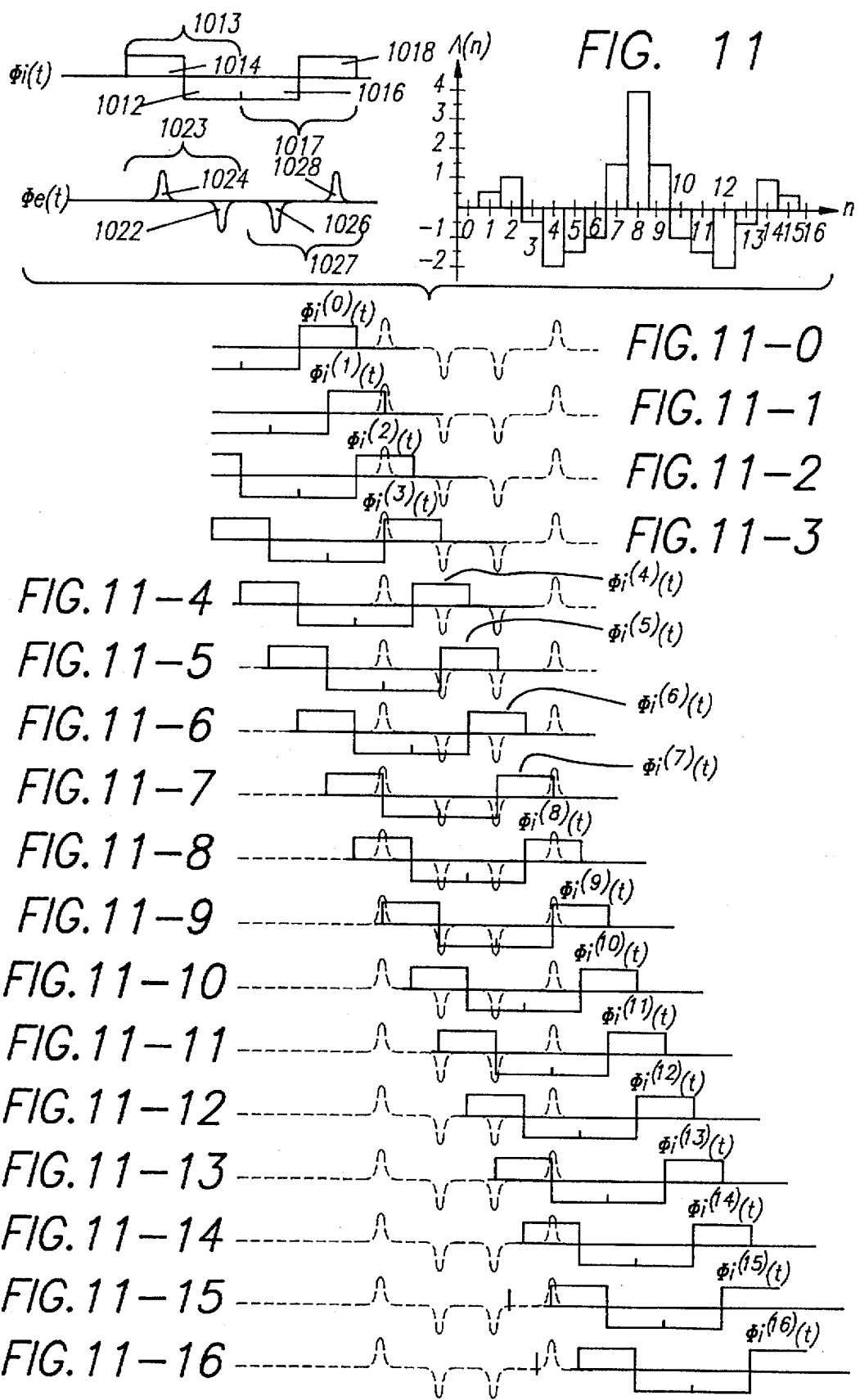

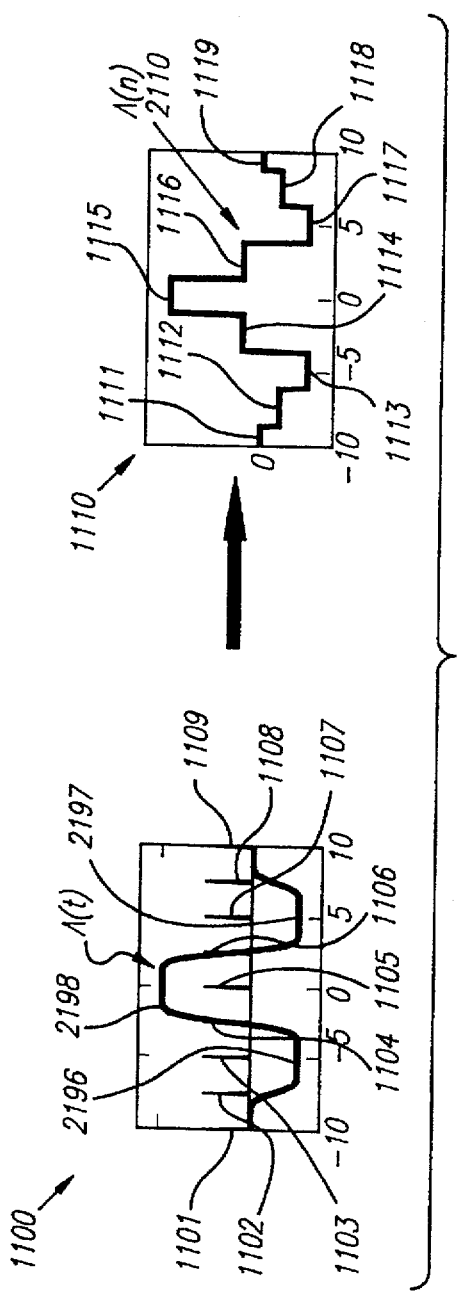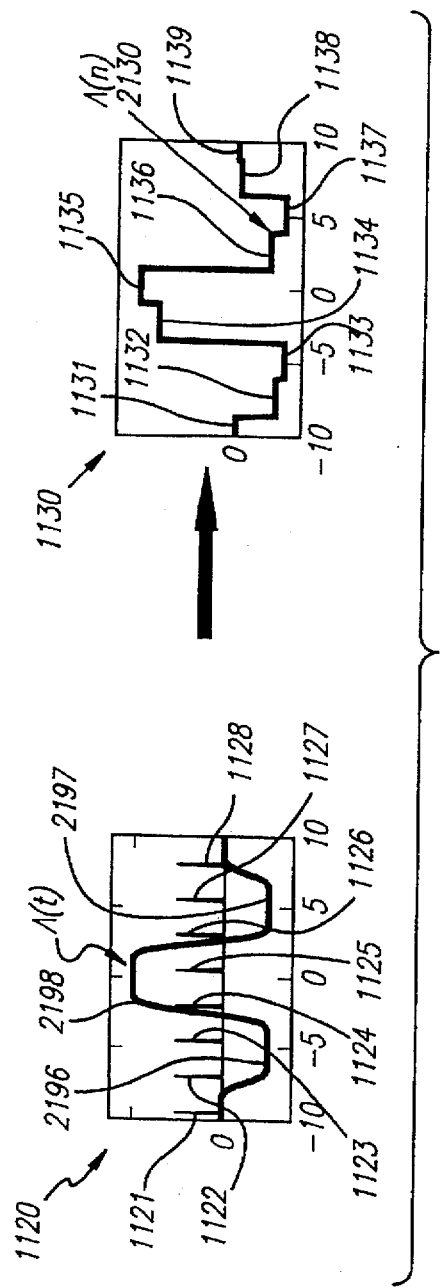
FIG. 12-1
FIG. 12-2

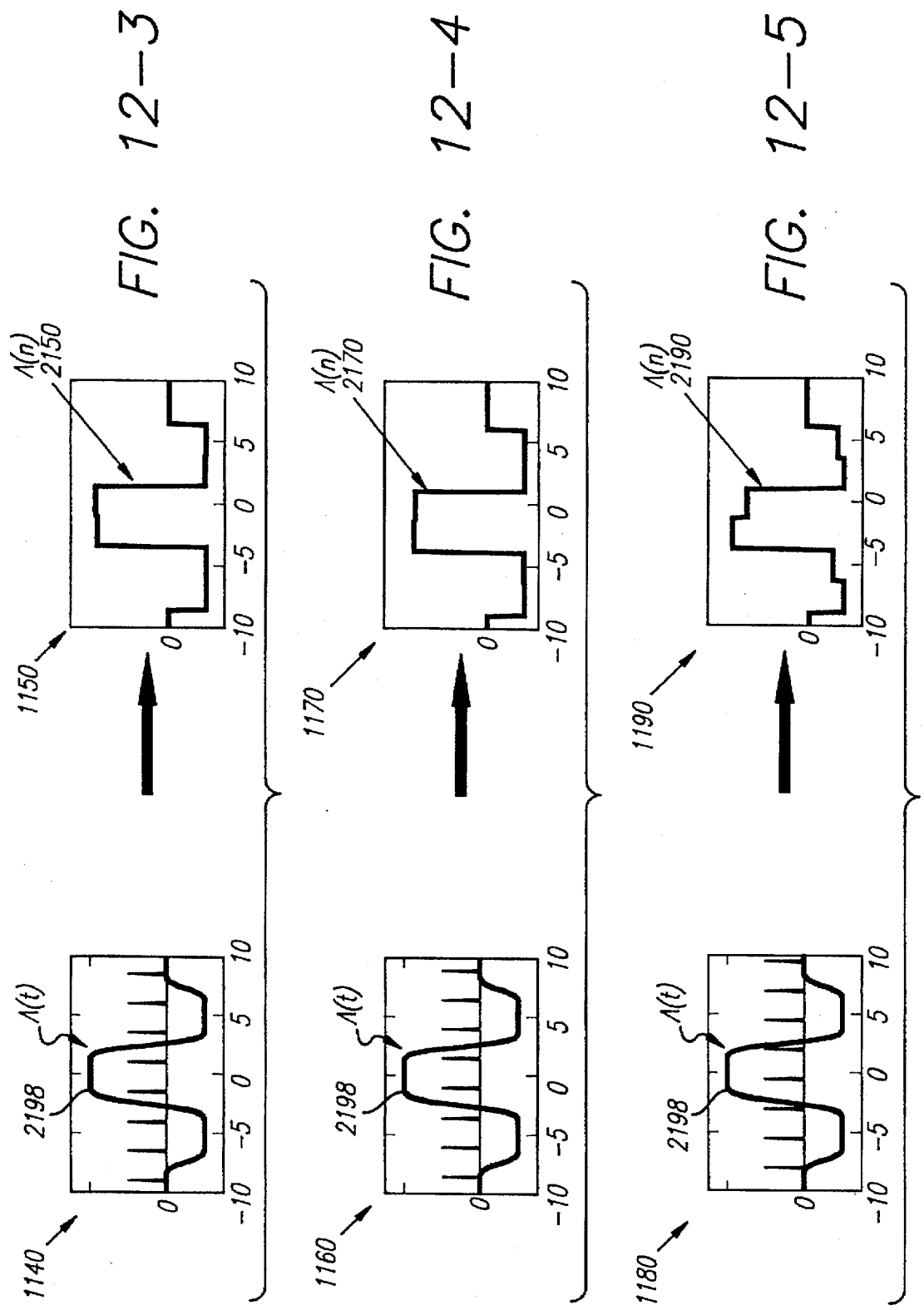

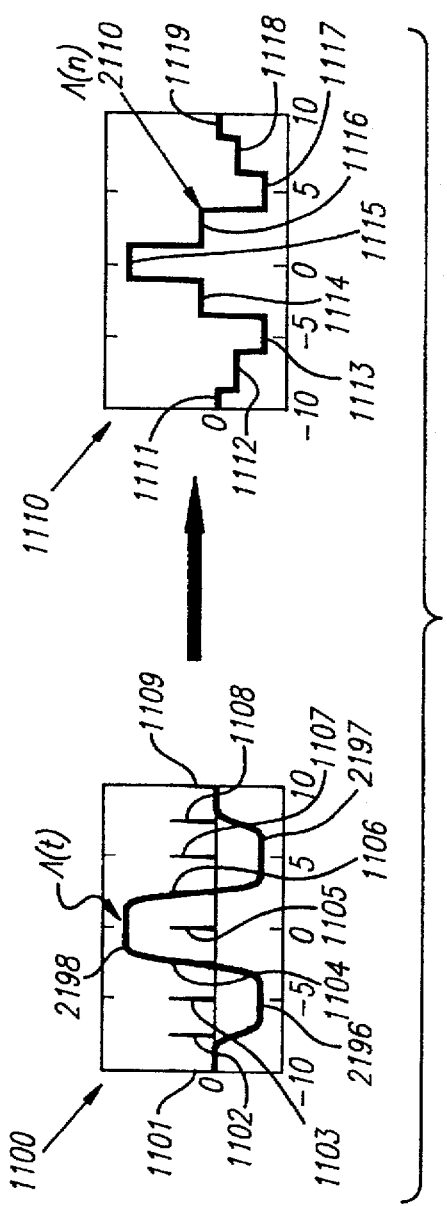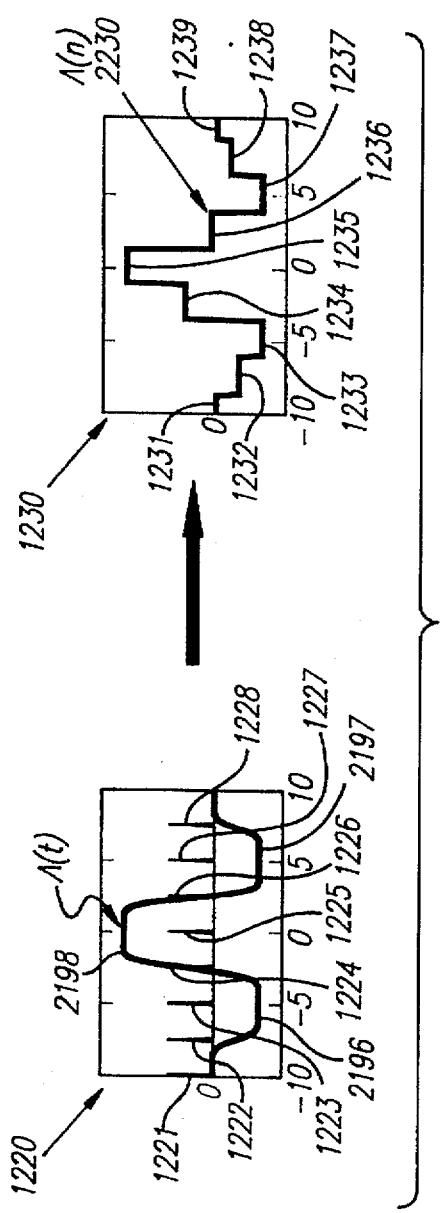
FIG. 13-1
FIG. 13-2

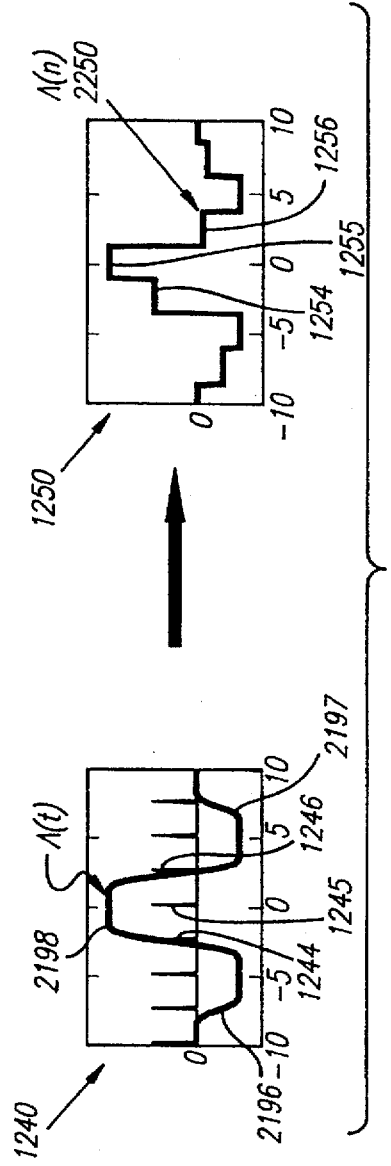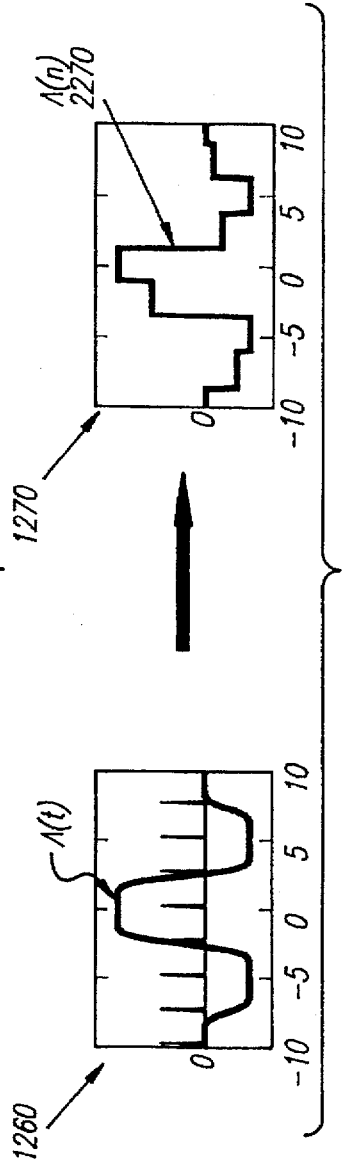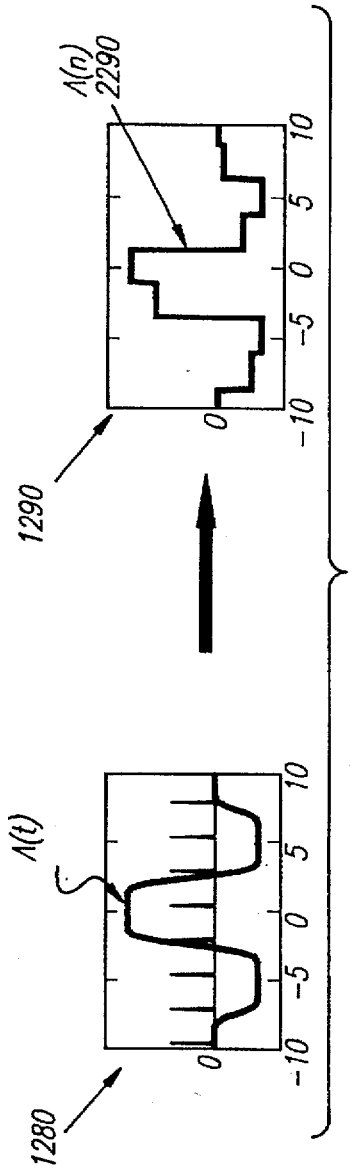
FIG. 13-3  FIG. 13-4  FIG. 13-5

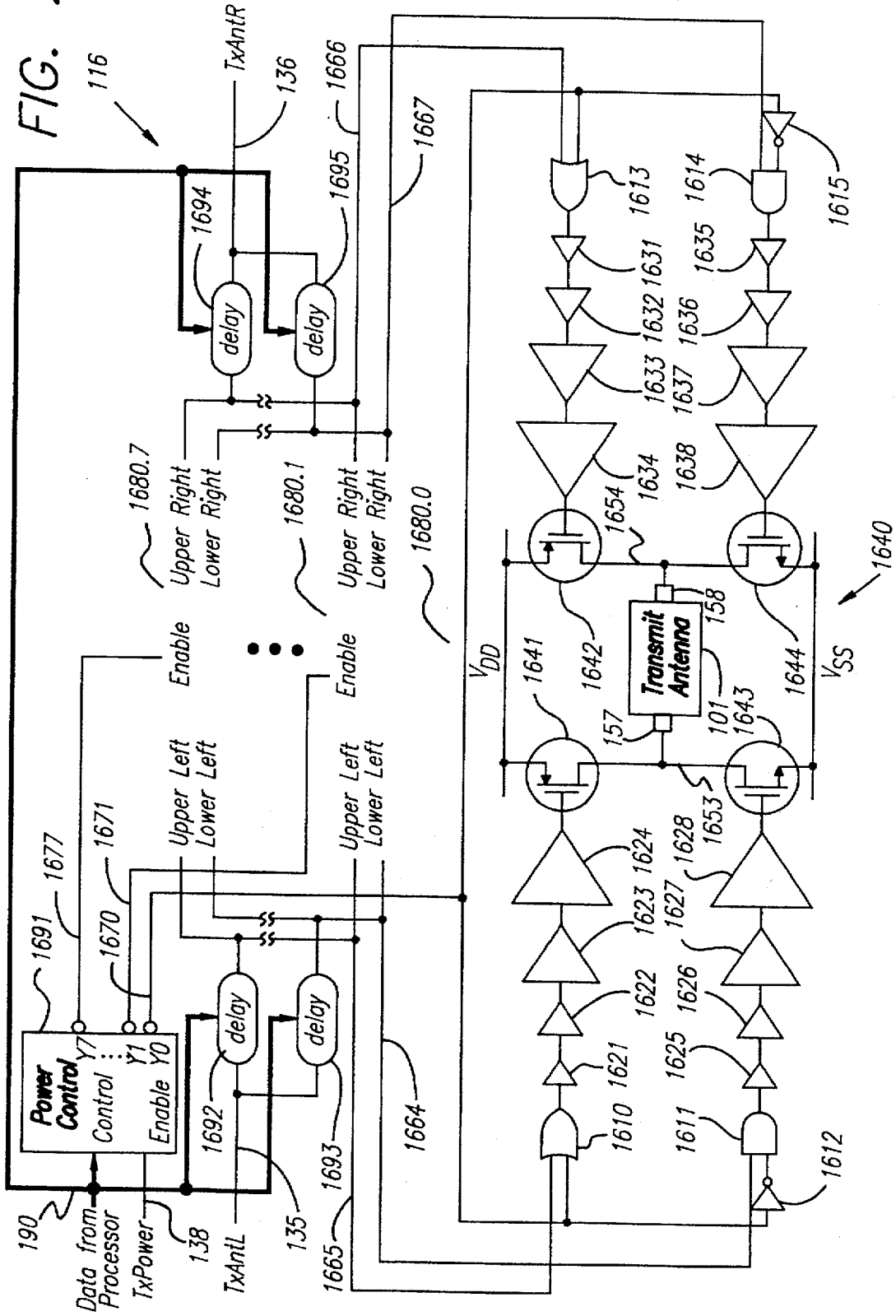

SPREAD SPECTRUM LOCALIZERS

BACKGROUND OF THE INVENTION

1. Field of the Invention

The present invention is related generally to spread spectrum radio communication systems, and more particularly to nonsinusoidal spread spectrum radio communication systems used to determine the locations of transceivers.

2. Prior Art

In traditional radio communication systems the transmitted electromagnetic power is concentrated in a narrow frequency band, whereas in spread spectrum communication systems the power is distributed over a relatively large bandwidth. Spread spectrum radio communications are used in place of traditional systems to circumvent communications jamming by interference signals, prevent detection and interception by unwanted receivers so as to provide privacy, provide tolerance to multipath transmissions, send multiple independent signals over a frequency band, and/or provide accurate ranging information.

The standard categories of spread spectrum radio communication techniques include direct sequence, frequency modulation, chirp modulation (or linear frequency modulation), and time hopping. In chirp modulation each transmitted pulse has a carrier frequency which changes linearly with time. The reception circuitry is designed such that the propagation of the signal through the circuitry is inversely related to the carrier frequency, so that the length of chirped pulses are shortened and there is increased signal power during the pulses in comparison to unchirped signals. In frequency hopping transmissions the frequency of the carrier changes according to a pseudorandom sequence. The receiver must know the pseudorandom sequence to be able to tune to the correct carrier frequencies at the proper times. Time hopping transmissions consist of a sequence of frames, each frame having a single impulse or monocycle (see R. A. Scholtz, "Multiple Access with Time-Hopping Impulse Modulation," MILCOM'93, Bedford, Mass. 1993). The location of the pulses in the frames is determined by a pseudorandom sequence, and without knowledge of the sequence the signal cannot be detected.

In direct-sequence spread-spectrum transmissions, the transmitted signal a(t) is encoded with a data string d(t) of positive and negative unity according to $$a(t) = \psi(t) \, d(t) \cos(\omega t + \theta),$$

where t is time, $\omega$ is the angular frequency of the carrier, $\theta$ is a phase angle, and the modulating signal $\psi(t)$ is a string of pseudorandom sequences $\Phi(t)$, the pseudorandom sequences $\Phi(t)$ being repeated M times, i.e., $$\psi(t) = \Phi(t \bmod t_s),$$

where "mod" represents the modulo operation, $t_s$ is the length of the pseudorandom sequence, $\Phi(t)$ is zero outside the range $0 \leq t \leq t_s$, and $\psi(t)$ is equal to zero outside the range $0 \leq t \leq M t_s$. The signal d(t) is a data stream of positive and negative unity values, the values of d(t) changing at the beginning of each cycle of the pseudorandom signal $\Phi(t)$. Each pseudorandom sequence $\Phi(t)$ consists of a string of basic units called "chips." Each chip consists of a chip function $\gamma(t)$—in the simplest cases the chip function $\gamma(t)$ has a constant value—multiplied by a code sequence $\sigma(i)$, where i is an integer and $\sigma$ takes on the phase factor values of plus and minus one. Each chip has a length of $\delta t$, and if there are L chips per pseudorandom sequence $\Phi(t)$ then $\Phi(t)$ has a period $t_s$ of (L*$\delta t$). The pseudorandom sequence $\Phi(t)$ therefore has the functional form $$\Phi(t) = \gamma(t \bmod \delta t) * \sigma[t/\delta t],$$

where the square brackets indicate the largest integer less than or equal to the argument within the brackets, and $\gamma(t)$ is zero outside the range $0 \leq t \leq \gamma t$. When $1/\omega$ is much smaller than the chip length $\delta t$, and the value of $\Phi(t)$ changes much faster than the value of d(t) (for instance when L is much greater than unity) the transmitted spectrum has a width on the order of the width of the spectrum of the chip function $\gamma(t)$. This relation allows the transmitted spectrum to be "spread" by imposing a chip function $\gamma(t)$ with a wide spectrum. To receive the direct sequence transmission it is necessary to know the pseudorandom sequence $\Phi(t)$ and the phase of the carrier and the chip function $\gamma(t)$. It should be noted that all the above-mentioned spread spectrum techniques rely on a sinusoidal carrier.

Historically, localization systems have been used for surveying and military applications, such as troop positioning and aircraft and missile guidance. The most prevalent military localization systems, Loran, Omega, and Global Positioning System (GPS), determine position based on the propagation time of the electromagnetic signals from beacons at known locations. Loran and Omega beacons are ground-based, and GPS transmitters are satellites. In these localization technologies, pulses are modulated onto a sinusoidal carrier, and traditional resonant circuits are used for transmission and reception.

The GPS system utilizes 21 active satellites in 12-hour orbits above the Earth to allow determination of three-dimensional position to an accuracy to about 10 meters, and velocity to an accuracy of 0.03 meters/second. At any location on Earth at least four GPS satellites are above the horizon at all times. Each satellite transmits the position of the satellite in space, and highly accurate time information derived from an onboard atomic clock. The user's position and the bias of the user's clock are determined by measuring the time for propagation of the signals from the satellites to the user.

Because refraction effects, deviations in velocity and variations in amplitude of radio waves propagating through the ionosphere increase with decreasing frequency, the accuracy of a satellite-based localization system is increased by using high frequency radio transmissions. However, the frequency is limited by practical circuit-design considerations and the fact that the absorption of radio transmissions by water molecules, even in fair weather, increases sharply near 10 GHz. The satellites transmit at two frequencies 1.227 GHz and 1.575 GHz, to allow corrections to be made for frequency-dependent time delays in the propagation of the signals through the atmosphere. Because gigahertz radio transmissions are line-of-sight, a GPS receiver must have a clear view of the sky and at least four satellites to function. This limits the applications to which this technology can be applied.

Since it is difficult to construct gigahertz resonant systems using inexpensive integrated circuitry, such localization systems must be constructed from discrete components, and powered accordingly. To provide reasonable efficiency, antennas for gigahertz reception must be on the order of at least ten centimeters. These limitations in the miniaturization of sinusoid-based localizers, while within bounds acceptable for military and industrial applications, provide limits as to the applicability of sinusoid-based localization technologies, such as GPS, to many aspects of everyday life.

OVERVIEW OF THE PRESENT INVENTION

The present invention is directed to a network of nonsinusoidal spread spectrum (NSS) transceivers capable of precisely locating objects in three-dimensional space. In the preferred embodiment these "localizers" are about the size of a coin, can operate without a clear view of the sky, have a low enough power consumption that they can operate for long periods of time powered by a small battery, do not require a system of satellites, and are very inexpensive.

Such localizers can be utilized in a myriad of applications, serving as extensions of the senses of people and machines. It is envisioned that these localizers will someday be commonly used in almost every aspect of everyday life. For instance, a localizer could be attached to the clothing of a young child, and if that child were to enter an area that presented a danger to her an alarm could sound to alert her or her guardians. Such localizers might also be used to help members of a group, such as a family, locate each other in a crowd or a large building complex. Such localizers might also be placed on each item in a store, so that the items could be easily located and an inventory of the store items could be tallied electronically.

The method of the present invention is to be contrasted with radar distancing where there is lower distance resolution since radar pulses must be relatively long to modulate a sinusoidal carrier. Furthermore, radar distancing requires high-power transmissions since the detected signals are reflected from the target rather than broadcast by the target.

The limitations of sinusoidal-carrier transmissions are circumvented in the present invention by a radio communication system where sequences of electromagnetic impulses are not modulated by a sinusoidal carrier. (In this specification an "impulse" will refer to an electromagnetic signal, or the electric signal in a circuit generating the electromagnetic signal or otherwise directly corresponding thereto, which is a Gaussian or short rectangular signal and does not modulate another signal. In contrast, a "pulse" will refer to an electromagnetic signal, or the electric signal in a circuit generating the electromagnetic signal or otherwise directly corresponding thereto, which has a sinusoidal carrier modulated by a short signal such as a Gaussian. Also, a "pulse" will refer to short signals in a circuit which do not directly correspond to or generate electromagnetic signals, such as "clock pulses.") These nonsinusoidal spread spectrum (NSS) transmissions a(t) are of the form $$a(t)=\psi(t)*d(t),$$

where, as before, $$\psi(t)=\Phi(t \bmod t_s),$$

t is time, d(t) is the data function with values of positive and negative unity, $\Phi(t)$ is a pseudorandom sequence of impulses of length $t_s$ and is nonzero over the range $0 \leq t \leq t_s$, and $\psi(t)$ is a string of M repeated pseudorandom sequences $\Phi(t)$ and is nonzero over the range $0 \leq t \leq M*t_s$. One or more bits of data from d(t) is encoded on each repetition of the pseudorandom sequence $\Phi(t)$. The transmitted spectrum has a width on the order of the width of the spectrum of an impulse. NSS radio technology can generate bandwidths 10–100 times as great as those for sinusoidal-carrier technologies mentioned above. By controlling the spacing between impulses, maxima in the energy of the transmitted signals can be placed at strategic locations, such as between commercial radio and television bands.

Reception of such NSS transmissions is accomplished by circuitry which calculates the correlation between the received signal and the expected pseudorandom sequence $\Phi(t)$. To receive a transmission, the transmitted pseudorandom sequence must be known by the receiver. Useful pseudorandom sequences must have low cross-correlations and sharp peaks in their autocorrelation function. With low cross-correlations the communications between one pair of localizers using one pseudorandom sequence will not interfere with the communications of other localizers in the vicinity using other pseudorandom sequences. A sharply peaked autocorrelation function is required to determine the arrival time of an impulse sequence. The fine detail of the autocorrelation function is used to improve the accuracy of the arrival time determination.

To generate the sequences of impulses that are transmitted, and to process the sequences of impulses that are received, the circuitry of the localizers must switch currents on and off at a rate comparable to the rate of transmitted impulses in the pseudorandom sequences. However, the operation of normal digital logic generates noise which is electrically coupled back into the receiving circuitry, so it may mask the reception of communications. Also, since a change in current generates an electromagnetic field, the circuitry generates NSS noise which contributes to the noise, masking communications transmissions. Therefore, during reception the localizers of the present invention use only low-noise circuitry to raise the signal-to-noise ratio. The low-noise circuitry has a higher power consumption than normal CMOS circuitry, since it uses current-steering logic rather than current-switching logic, and is therefore operated only when necessary. During transmission the localizers of the present invention use circuitry having parallel routing of differential signals to reduce the susceptibility of the logic to noise, and balance the current flow between sections of the circuit. In the preferred embodiment, portions of the circuitry which are used for both transmission and reception utilize both current-steering logic and parallel routing of differential signals.

Relative distances between localizers are determined by measuring the propagation time of pulse sequences between localizers. Knowing the distance between a first localizer and a second localizer, then the relative position of the first localizer is known to be on a sphere with a radius equal to the known distance centered around the second localizer. Similarly, knowing the distances from a first localizer to a second localizer and a third localizer, and the distance between the second and third localizers, then the relative position of the first localizer is known to be on a circle. Knowing the distances from a first localizer to a second localizer, a third localizer, and a fourth localizer, and the distances between the second, third, and fourth localizers, then the relative position of the first localizer is known to within one of two points, a reflection about the plane defined by the second, third and fourth localizers. Therefore, to actually determine the relative position of a localizer more information is needed: the distance of that localizer to four other localizers and the relative positions of those four other localizers must be known. Therefore, the relative positions of a large network of localizers may be determined by repeatedly determining the distances from a localizer with an unknown relative position to four localizers with known relative positions.

However, it should be noted that there are combinations of locations that make the determination of the three-dimensional locations impossible. For example, when all the localizers of known relative positions are on a plane then the position of another localizer can only be determined to within two points, a reflection about the plane in which the other localizers are located. In addition, some reference points are necessary to determine absolute locations since the distancing communications only provide relative locations. In a survey application, for example, reference localizers would be arranged on known control points so absolute positions could be determined. Another option is to place localizers on both ends of rods that hang free in gravity, thereby providing orientation information.

To determine distances to an accuracy of 1 cm it is required that the clocks in the localizers are accurate to 30 picoseconds over times on the order of the time for propagation of radio waves between localizers. A typical separation distance is 300 meters, so a typical propagation time is 1 microsecond. The clock rates must also be stable to times on the order of tens of picoseconds over the length of a pulse sequence, which is on the order of 10 microseconds. This represents a required stability of one part in one million. Pairs of localizers of the preferred embodiment prearrange when their next communication will occur, and listen for the communication during a time window of approximately 100 nanoseconds centered around the prearranged time. Times between localizer communications can be on the order of one tenth of a second, and so the clocks must also be stable to about 100 nanoseconds over periods on the order of one tenth of a second, representing a required stability of one part in one million to maintain synchronization.

Inexpensive quartz oscillators are normally not considered accurate enough for this task due to the difference between their actual frequency and their nominal frequency. But their stability (i.e., the rate at which the frequency may wander with time) is sufficient for use with the localizers of the present invention. Because localizers have on-board processors, each processor can monitor the clocks of other localizers and calculate the ratios of their clock rates to its own. This allows each localizer of the present invention to correct for differences between its clock rate and those of the localizers it is communicating with. Therefore, the localizers of the present invention can provide a highly accurate clock timebase from a network of inexpensive, inaccurate oscillators.

Ranging protocols which determine the relative clock rates as well as the distances between localizers may be implemented. If a network of communicating localizers includes at least one localizer having a very precise timebase, the other localizers can determine the deviations of their timebases from the precise timebase using such protocols. Similarly, a known accurate distance between two localizers can be used to provide an accurate timebase, and other localizers can determine the deviations of their timebases from the precise timebase using ranging protocols. It is advantageous in terms of size, cost and power to use protocols which determine relative clock rates to provide a network with a highly accurate timebase, rather than providing each localizer with a timebase of comparable accuracy.

A transmission from a localizer is composed of the following events: (i) a sequence generator is programmed to produce a code sequence; (ii) the power to the antenna is adjusted to compensate for the expected distance the signal must travel; (iii) a set of event registers is armed to trigger the transmission circuitry at a pre-arranged time; and (iv) when the transmission event is triggered the transmitter uses the code sequence to generate a series of positive and negative currents through the antenna to transmit a non-sinusoidal spread spectrum (NSS) radio signal composed of doublets of Gaussian impulses. Each doublet consists of an impulse of a first polarity and an impulse of a second polarity opposite the first. During a time period surrounding and including the transmission, the CPU and any other non-essential circuitry is shut down to prevent the transmissions from interfering with the functioning of the circuitry.

The reception of a code sequence consists of a similar sequence of operations, namely: (i) a sequence generator is programmed to produce an internally-generated integration sequence which resembles the expected code sequence of the received signal; (ii) the receiver antenna and integrator amplifiers are adjusted to compensate for the distance the received signal is expected to have traveled and the length of the code sequence; (iii) a set of event registers is armed to trigger reception processing circuitry at a pre-arranged time; (iv) the CPU and other nonessential circuitry is turned off during a time period surrounding and including the reception time to decrease noise; (v) during the reception event the received signal is multiplied by integration sequences delayed by thirty-two (in the preferred embodiment) different time offsets; (vi) during the reception event the products of the received signal and the delayed integation sequences are integrated and the outputs are stored in thirty-two analog bins; and (vii) after the reception event the CPU, which has been reactivated, converts these thirty-two analog bins to digital values and analyzes these values to calculate the precise arrival time of the communication.

OVERVIEW OF THE PSEUDO-AUTOCORRELATION FUNCTION

According to the present invention the time when an impulse sequence is received is determined from the location of the peak and other features of the correlation between the received antenna signal a(t) and a set of delayed internally-generated integration sequences $\psi_i(t)$. (For simplicity of notation the following discussion will assume that only one bit of information is transmitted via a single pseudorandom sequence, i.e., $\psi(t)=\Phi(t)$.) It will be assumed that the received antenna signal has been encoded on an externally-generated pseudorandom sequence $\Phi_e(t)$ at a remote transmitter. The externally-generated pseudorandom sequence $\Phi_e(t)$ consists of a series of externally-generated chip waveforms $\psi_e(t)$, i.e., $$a(t)=\Phi_e(t)=\sigma_e[t/\delta t]*\gamma_e(t \bmod \delta t).$$

Similarly, the internally-generated pseudorandom sequence $\Phi_i(t)$ consists of a series of internally-generated chip waveforms $\gamma_i(t)$, i.e., $$\Phi_i(t)=\sigma_i[t/\delta t]*\gamma_i(t \bmod \delta t),$$

where $\gamma_i t$ resembles, but is not equal to, $\gamma_e(t)$. The correlation function $\Lambda$ between the received signal $\Phi_e(t)$ and the internally-generated "integration" sequence $\Phi_i(t)$ is $$\Lambda(t)=-\Phi_i(\tau-t)*\Phi_e(\tau)d\tau,$$

or $$\Lambda(t)=-\sigma_i[(T-t)/\delta t]*\sigma_e[t/\delta t]* \gamma_i((\tau-t) \bmod \delta t)*\gamma_e(\tau \bmod \delta t)d\tau.$$

The correlation function $\Lambda(t)$ is termed the pseudo-autocorrelation function, since for the special case $\sigma_i=\sigma_e$ and $\gamma_i=\gamma_e$ the function is the autocorrelation function. The family of pseudorandom code sequences $\sigma(i)$ is chosen such that the values of $\Lambda(t)$ are small if $\sigma_i(i)$ is not equal to $\sigma_e(i)$. If the internally- and externally-generated code sequences $\sigma_i(i)$ and $\sigma_e(i)$ are the same (i.e., $\sigma_i=\sigma_e=\sigma$), then $$\Lambda(t)=-\sigma[t/\delta t]*\sigma[(\tau-t)/\delta t]* \gamma_i(\tau-t) \bmod \delta t)*\gamma_e(\tau \bmod \delta t) \, d\tau,$$

and the substitution $\tau \to \tau+t$ shows that the pseudo-autocorrelation function is symmetric about t=0. For t=0 and $\sigma_i=\sigma_e=\sigma$, $$\Lambda(0) = \int \gamma_i(\tau \bmod \delta t)^* \gamma_e(\tau \bmod \delta t) d\tau$$

$$= L \int_0^{\delta t} \gamma_i(\tau)^* \gamma_e(\tau) d\tau$$

since $(\sigma(i))^2=1$ for all values of i, where L is the number of chips in the pseudorandom sequence. Thus $\gamma_i(t)$ must resemble $\gamma_e(t)$ to an extent sufficient to make the integral relatively large, i.e., $$\frac{[\int \gamma_i(\tau)^* \gamma_e(\tau) d\tau]^2}{[\int \{\gamma_i(\tau)\}^2 d\tau]^*[\int \{\gamma_e(\tau)\}^2 d\tau]}$$

must be on the order of unity, if the pseudo-autocorrelation $\Lambda(t)$ is to have a strong peak.

Values of the pseudo-autocorrelation at a number of discrete times is determined by a time-integrating correlator circuit. Although the correlator output resembles a time sampling of the pseudo-autocorrelation $\Lambda(t)$, it should be noted that the pseudo-autocorrelation as a function of time is never actually determined by the circuit, and therefore it cannot be sampled. The values of pseudo-autocorrelation function at a number of discrete times will be termed the discrete-time pseudo-autocorrelation function, or DTPAC function, and notated as $\Lambda(n)$, where the argument n takes on integer values. The times at which values of the DTPAC function are determined are referred to as the "time bins."

OVERVIEW OF THE DOUBLET CHIP FUNCTIONS

Whereas other radio systems using impulses radiate sequences of single electromagnetic impulses with a minimum of radiation between impulses, the present invention is directed to radio transmissions comprised of sequences of pairs of impulses, termed "doublets." As will be discussed below, switching on a current through the antenna produces a first electromagnetic impulse having an electric field vector in a first direction, and switching off the current produces a second electromagnetic impulse having an electric field vector in a second, opposite direction. As discussed above, the received signal $\Phi_e(t)$ and the internally-generated integration sequence $\Phi_i(t)$ are of the form $\sigma[t/\delta t]^* \gamma(t \bmod \delta t)$.

In the preferred embodiments of the present invention the doublet chip waveform $\gamma(t)$ has a first section with a first polarity and a second section with a second polarity opposite the first polarity. As before, $\sigma(i)$ is a pseudorandom code sequence of the values plus and minus one, i takes on integer values, $\delta t$ is the length of the chips, and the square brackets indicates the greatest integer less than or equal to the value of the argument within the brackets.

Applying this doublet chip waveform to the transmitted signal and the impulse sequence provides the advantage that the central positive peak of the pseudo-autocorrelation function is bracketed by two negative peaks, as well as additional positive and negative peaks in the wings of the function. As will be discussed in the Detailed Description of the Preferred Embodiments, the positive and negative peaks of the pseudo-autocorrelation function make the shape of the discrete-time pseudo-autocorrelation (DTPAC) function particularly sensitive to small time displacements between the received signal $\Phi_e(t)$ and the integration sequence $\Phi_i(t)$ when the time between bins $\Delta t$ is on the order of half of the chip length. In the preferred embodiment an expert system algorithm, such as a set of neural networks, is used to recognize changes in the shape of the DTPAC function to determine the temporal relationship between the antenna signal $\Phi_e(t)$ and the integration sequence $\Phi_i(t)$ to a time less than the separation between time bins.

Different placements of time bins and different internally-generated chip doublet functions $\gamma_i(t)$ provide different advantages. A general form for the doublet waveform $\gamma_i(t)$ is $\gamma_i(t) = +k \quad 0 < t < h^*\delta t$ $\gamma_i(t) = -k \quad \delta t/2 < t < \delta t/2 + h^*\delta t$ $\gamma_i(t) = 0 \quad \text{otherwise,}$ where h is a width factor, and k is a constant. When the doublet waveform $\gamma_i(t)$ is normalized, the constant k will be set to one. A general expression for the delay between integration sequences is given by $(\delta t/2 - g^*\delta t)$, where g is a shift factor.

In a first preferred embodiment depicted in FIG. 14a, the separation $\Delta t$ between time bins is $(\delta t/4)$, and the doublet waveform $\gamma_i(t)$ is $\gamma_i(t) = +1 \quad 0 < t < \delta t/2$ $\gamma_i(t) = -1 \quad \delta t/2 < t < \delta t$ $\gamma_i(t) = 0 \quad \text{otherwise,}$ (i.e., h=½ and g=¼). Once the integration sequence $\Phi_i(t)$ and the received signal $\Phi_e(t)$ are substantially aligned, this system is useful in determining the exact arrival time of the antenna signal since the shape of the pseudo-autocorrelation function changes substantially for small time shifts between the integration sequence $\Phi_i(t)$ and the received signal $\Phi_e(t)$.

In a second preferred embodiment depicted in FIG. 14b, the separation $\Delta t$ between time bins is $(\delta t/4)$, and the doublet waveform $\gamma_i(t)$ is $\gamma_i(t) = +1 \quad 0 < t < \delta t/4$ $\gamma_i(t) = -1 \quad \delta t/2 < t < 3\delta t/4$ $\gamma_i(t) = 0 \quad \text{otherwise,}$ (i.e., h=¼ and g=¼). This system provides a higher signal-to-noise ratio than the first preferred embodiment since for the peak time bin the integrations are only performed when the received signal $\Phi_e(t)$ is relatively large. This second embodiment is useful for the communication of data once a good time alignment has been achieved between localizers. In a generalization of this second preferred embodiment the doublet waveform $\gamma_i(t)$ is $\gamma_i(t) = +1 \quad 0 < t < h^*\delta t$ $\gamma_i(t) = -1 \quad \delta t/2 < t < \delta t/2 + h^*\delta t$ $\gamma_i(t) = 0 \quad \text{otherwise,}$ where small values of h produce narrow nonzero regions of the doublet waveform $\gamma_i(t)$. The optimum value of h produces peaks of the doublet waveform $\gamma_i(t)$ of approximately the same width as the peaks of the received doublet waveforms $\gamma_e(t)$ In a third preferred embodiment depicted in FIG. 14c, the separation $\Delta t$ between time bins is $(\delta t/2)$, and the doublet waveform $\gamma(t)$ is $$\gamma_i(t) = +1 \quad 0 < t < \delta t/2$$
$$\gamma_i(t) = -1 \quad \delta t/2 < t < \delta t$$
$$\gamma_i(t) = 0 \quad \text{otherwise,}$$

(i.e., h=½ and g=0). This system is useful for scanning for a signal when the time of arrival is uncertain because the reception window is twice as long as either of the two previous techniques. In a generalization of the third preferred embodiment, the shift factor g is a small value to insure that sharp peaks in the received signal are detected. There is a finite time required for the doublet waveform $\gamma_i(t)$ to change values between positive and negative unity and if an impulse in the received signal occurs during a zero crossing of the doublet waveform it may not be detected.

OVERVIEW OF THE RANGING COMMUNICATIONS

The distance between two localizers, localizer A and localizer B, is determined by measuring signal propagation times in cooperative ranging transactions. Unless otherwise stated, it will be assumed in the following discussions that localizers A and B have an approximate knowledge of their separation and relative clock rates.

In a first ranging protocol shown in FIG. 2, localizer A sends a first ranging communication to localizer B at a prearranged time. Localizer B listens for the first communication during a time window centered around the time the first communication is expected to arrive. After the time window is over, localizer B processes the reception data to determine the actual time of arrival of the first communication. The processing time at localizer B is on the order of a millisecond. A prearranged delay time after the actual arrival time of the first communication, the delay time being greater than the processing time, localizer B sends a second communication back to localizer A. Localizer A listens for the second communication during a reception time window centered around an estimate of when the second communication should be received. After the reception time window is over, localizer A processes the reception data to determine the arrival time of the second communication. Knowing the time at which the first communication was sent, the time at which the second communication was received, and the agreed upon delay between when localizer B received the first communication and sent the second communication, and having an estimate of the relative clock rate of localizer B, localizer A can calculate the distance between the localizers. A disadvantage of this method is that the actual time for the propagation of the electromagnetic radio communications between the localizers is small compared to the delay time at localizer B and the time difference between transmission and reception at localizer A. The delay time is on the order of a millisecond and the signal propagation time is on the order of 100 nanoseconds. In this protocol large times must be subtracted to determine a small time, so the calculation is sensitive to inaccuracies in the clocks of localizers A and B.

In a modification of the above method, which increases the accuracy of the estimate of the distance but still suffers from the sensitivity to inaccuracies of the clocks, the localizers perform a second series of ranging communications a prearranged time after the first series of ranging communications. In the second series of ranging communications the center times of the reception windows are adjusted according to the offsets of the reception times from the centers of the reception windows in the first series of communications, so that the transmissions in the second series of communications arrive closer to the center of the reception windows. When the localizers can position the peak in the center of a bin near the center of the reception, this indicates the localizers have achieved the goal of accurately determining the separation distance. Since, as discussed below, features of the DTPAC function $\Lambda(n)$, including the central peak and the peaks in the "wings" of the function, provide information about the time of arrival of a communication, positioning the time of arrival of a communication in the center of a bin near the center of the reception windows increases the accuracy of the estimate of the time of arrival.

To circumvent this disadvantage of the first ranging protocol (and its modification discussed above), a second ranging protocol, shown in FIG. 4, uses a much shorter delay at localizer B. In the second ranging protocol localizer A sends a first ranging communication to localizer B at a prearranged time. Localizer B listens for the first communication during a time window centered around the time the first communication is expected to arrive. After the time window is over, but before processing the reception data to determine when the first communication arrived at localizer B, localizer B sends a second communication back to localizer A a prearranged delay time after the center of localizer B's reception time window. Localizer A listens for the second communication during a reception time window centered around an estimate of when the second communication should be received. Only after the transmission of the second communication does localizer B process the reception data to determine the actual time of arrival of the first communication. After the reception time window of localizer A is over, localizer A processes the reception data to determine the arrival time of the second communication. After localizer B determines the actual reception time of the first communication, localizer B sends a series of correction bits to localizer A. The correction bits communicate the time difference between the actual reception time of the first communication at localizer B and the center of localizer B's reception time window. Knowing the time at which the first communication was sent, the time at which the second communication was received, the agreed upon time delay between the center of localizer B's reception time window and transmission time window, and the correction time between the center of the reception time window and when the first communication was received at localizer B, and having an estimate of the relative clock rate of localizer B, localizer A can calculate the distance between the localizers. Because localizer B sends a signal back to localizer A before processing to determine the actual arrival time of the first communication, the delay time can be much shorter than that of the first protocol, and the accuracy of the calculation is much less sensitive than the first protocol to the inaccuracies of the clock rates of the localizers.

In a modification of the above method, which further increases the accuracy of the estimate of the distance, the localizers perform a second series of ranging communications at a prearranged time difference from the first series of ranging communications. In the second series of ranging communications the transmission time at localizer A and the second reception window time at localizer A are adjusted according to the offsets of the reception times from the centers of the reception windows in the first series of communications, so that the transmissions in the second series of communications arrive closer to the center of the reception windows. When the localizers can position the peak in the center of a bin near the center of the reception, this indicates the localizers have achieved the goal of accurately determining the separation distance. Since, as discussed below, features of the DTPAC function A(n), including the central peak and the peaks in the "wings" of the function, provide information about the time of arrival of a communication, positioning the time of arrival of a communication in the center of a bin near the center of the reception windows increases the accuracy of the estimate of the time of arrival.

A third possible ranging protocol shown in FIG. 7a uses a similar approach to the second protocol, but involves a second round-trip communication from localizer B to localizer A and back to localizer B, before localizer B sends a series of correction bits to localizer A. In particular, in the third ranging protocol, localizer A sends a first ranging communication to localizer B at a prearranged time. Localizer B listens for the first communication during a time window centered around the time the first communication is expected to arrive. After the time window is over, but before processing the reception data to determine when the first communication arrived at localizer B, localizer B sends a second communication back to localizer A a prearranged delay time after the center of localizer B's reception time window. Localizer A listens for the second communication during a reception time window centered around an estimate of when the second communication should be received. After the transmission of the second communication, localizer B processes the reception data to determine the actual time of arrival of the first communication. After the reception time window at localizer A, localizer A processes the reception data to determine the arrival time of the second communication. Then, the roles of localizers A and B in first round of communications are reversed for a second round of communications. Localizer B sends a third ranging communication to localizer A at a prearranged time. Localizer A listens for the third communication during a time window centered around the time the third communication is expected to arrive. After the reception time window is over, but before processing the reception data to determine when the third communication arrived at localizer A, localizer A sends a fourth communication back to localizer B a prearranged delay time after the center of localizer A's reception time window. Localizer B listens for the fourth communication during a reception time window centered around an estimate of when the fourth communication should be received. After the transmission of the fourth communication, localizer A processes the reception data to determine the actual time of arrival of the third communication. After the reception time window at localizer B, localizer B processes the reception data to determine the arrival time of the fourth communication. After localizer B determines the actual reception time of the fourth communication, localizer B sends a series of correction bits to localizer A. The correction bits communicate the time difference between the actual reception time of the first communication at localizer B and the center of localizer B's first reception time window, and the time between the transmission of the third communication and the reception of the fourth communication at localizer B. Knowing the round trip times for the first pair of communications and the second pair of communications, and the prearranged delay times at localizers B and A respectively, localizer A can calculate both the distance between the localizers, and the ratio of the clock rates of the localizers. Because the localizers send signals back to each other in the first pair of communications and the second pair of the communications before processing to determine the actual arrival time of the communications, the delay times are much shorter than in the first method, and the accuracy of the calculation is much less sensitive to the accuracies of the clock rates of the localizers. After localizer B sends the correction bits to localizer A, localizer A may send its results for the separation distance and the ratio of the clock rates explicitly to localizer B. Alternatively, localizer A could send a set of correction bits to localizer B representing the round trip time for the first pair of communications, and the time difference between the center of the reception window and the time of arrival of the third communication at localizer A, so that localizer B may also calculate the separation distance and the ratio of the clock rates. In another alternative of this method the second and third communications from localizer B could be replaced with a single communication, i.e., the time between the second and third communications is effectively reduced to zero. Localizer B would then have to determine the arrival time of the first communication after receiving both the first and third communications from localizer A.

These ranging methods may also be adapted to an iterative procedure where, rather than sending the actual values of time delays between localizers, a localizer only communicates one bit of data per round of communications. This one bit of data could represent the side of a reception window in which a previous communication arrived. For instance, localizer A could send a first communication to localizer B, and localizer B would respond with a second communication back to localizer A after a prearranged time delay which is much shorter than the time it takes for localizer B to determine the actual arrival time of the communication from localizer A. After localizer B responds to localizer A, it would then determine the actual arrival time of the first communication from localizer A. Localizer A would then send a third communication to localizer B after a prearranged wait, and localizer B would again respond with a fourth communication to localizer A after the prearranged time delay. If the first communication arrived in the earlier half of localizer B's reception window, localizer B's fourth communication would have a first polarity, and if the first communication arrived in the later half of the reception window, the fourth communication would have a second polarity. ("Polarization" refers to the plane of the electric field in a plane-polarized electromagnetic transmission, and "polarity" refers to the direction of the electric field in the plane of polarization. In other words, the polarization may be controlled by the orientation of the antenna, and the polarity may be controlled by the direction of current through the antenna.) Localizer A would then modify the transmission time of its next communication (the fifth communication) based on the information conveyed from localizer B in the fourth communication by a first amount so that its communication would arrive nearer the center of localizer B's reception window than previously. Localizer A would also modify the central time of its reception window so that the next communication from localizer B (the sixth communication) would arrive nearer the center of localizer A's reception window. Similarly, localizer B's next communication (the sixth communication) would reflect the arrival time of the third communication (from localizer A), and localizer A would modify the transmission and reception times of the next pair of communications (the seventh and eighth communications) based on this information by a second amount which is half as large as the first amount. The size of the time corrections made by localizer A decrease by a factor of two in each pair of the communications, and the arrival times of the communications converge rapidly on the centers of the reception windows. Knowing the prearranged delay time at localizer B and the time between a transmission and a reception at localizer A, localizer A may then determine the separation between the localizers.

It may also be desirable to provide protocols where a localizer can determine the locations of other localizers while not divulging its own location. A first localizer may hide its location by offsetting its communications with other localizers with time delays of random sign and magnitude. In this case, it will be apparent to the other localizers that the first localizer is not divulging its location. Alternatively, the first localizer may offset its communications in a controlled manner so that other localizers would determine an incorrect location for the first localizer. For instance in a modification of the third ranging protocol of FIG. 7a, localizer A sends a first communication to localizer B, and after a prearranged delay time localizer B sends a second communication back to localizer A. Then localizer B determines the exact arrival time of the communication from localizer A. Next, after a prearranged waiting time, localizer B sends a third communication to localizer A. Although localizers A and B have agreed on a delay time between receiving and sending communications, localizer A does not hold to this arrangement. Instead, localizer A purposefully modifies the delay time before sending its response (the fourth communication) so that localizer B receives a false impression of the separation distance. Similar modifications of the first ranging protocol of FIG. 2 or the second ranging protocol of FIG. 4 may also be implemented to preserve the location privacy of a localizer.

All of the protocols above require that at least one of the localizers has a first approximation of the distance. Once a distance estimate has been obtained, localizers can use any of the ranging methods described above to update their estimates of the distance and the ratios of the clock rates. To obtain an initial estimate of the separation distance and the ratio of clock rates, the localizers may start out in electrical contact.

In an alternate synchronization protocol not requiring electrical contact, localizer B attempts to initiate contact with other localizers by transmitting a beacon signal on a regular periodic basis. To find this beacon, localizer A must do an exhaustive search of the time period until the beacon is detected. This search could be on the order of 5 to 10 seconds. When localizer A finds the beacon, it begins broadcasting a reply. Localizer B could in turn do an exhaustive search looking for a response from localizer A, doubling the length of time necessary to get into synchronization.

The time for localizer B to do the search could be drastically reduced if localizer A broadcasts the reply at a known time delay after receiving each beacon. Localizer B would only have to search a small time period after the beacon for the reply. This allows localizer B to rapidly find nearby localizers, and to simultaneously acquire an approximate distance to them. Alternately, localizer B could continuously attempt to receive a communication from localizer A at a small fixed time delay before each beacon. Then localizer A would have to do the fast search backwards from the beacon to find the approximate distance to localizer B. In this case localizer A would acquire an approximate distance. In either case, the localizers indicate the beginning of communication by modifying the beacon or reply communication. Once in synchronization, the localizers can begin to exchange digital messages, requests, and start doing ranging protocols as described above.

Overview of the Hardware

Since electromagnetic radiation travels 1 cm in only about 33 picoseconds, a clock with a period of about 33 picoseconds, i.e., a 30 GHZ clock, is required to measure distances as small as 1 cm by measuring the time of propagation of radio waves by counting clock pulses. If this clock was also required to measure times on the order of one day, $2.6*10^{15}$ of these 30 GHZ pulses would have to be counted, requiring a 52-bit counter.

Unfortunately, CMOS logic cannot operate in the tens of gigahertz, though a clock as high as 200 MHz is practicable. (A 200 MHz clock has a period of 5 nanoseconds and can resolve distances down to 1.5 meters.) Therefore, in a first embodiment 2410 shown in FIG. 24a, pulses from a 200 MHz clock 2412 are placed to a resolution of 30 picoseconds by delaying the clock pulses through a programmable delay generator 2050 in stage "S0" of the clock. The delay generator 2050 must select between one of about 150 different delay times, requiring eight bits of binary storage. The remaining 48 bits required for the counter of the clock 2410 are located in a stage S1 counter 2414. This clock 2410 has the drawback that all 48 bits of the stage S1 counter 2414 must use low-noise circuitry so the S1 counter 2414 can run without producing power line noise and electromagnetic noise during reception and transmission events.

In actuality, the 200 MHz clock 2412 is problematic since it has a high power consumption and produces significant power line noise. So in a second embodiment 2420 shown in FIG. 24b a stage S1 phase-lock loop (PLL) circuit 2010/2020/2030 is used to increase the speed of a readily available crystal oscillator 130 with a frequency of an approximately 6.25 MHz clock to the 200 MHz required. The PLL circuit 2010/2020/2030 has a 5-bit counter to divide the 200 MHz pulses down to phase lock to the 6.25 MHz clock pulses. The output from the 6.25 MHz clock oscillator 130 is also are counted by a 43-bit stage S2 counter 2422. Since the 6.25 MHz crystal oscillator 130 produces many clock pulses during a reception event, the S2 counter 2422 must use low-noise circuitry.

Since the most-significant bits of the S2 counter 2422 do not change very often, a portion of the S2 counter 2422 can be separated into stage S3 counter 2434 implemented in software in a processor 140, as shown in the third embodiment 2430 depicted in FIG. 24c. This allows the total number bits in the clock 2420 to be arbitrarily large so that periods longer than a day can be counted. The number of bits remaining in the stage S2 counter 2432 should be large enough that the processor 140 does not get interrupts more frequently than it can handle, or during transmission or reception events when only low-noise circuitry can operate. In a preferred embodiment the processor 140 receives an interrupt every 100 microseconds, so the S2 stage 2432 has a 14-bit counter, and the counter in the processor 140 handles the remaining 29 bits. In the preferred embodiment even more bits are implemented in the software counter in the processor 140, since this is not difficult and allows the processor 140 to schedule events in human time scales such as days and months.

In a fourth embodiment 2440 depicted in FIG. 24d, the stage S2 counter 2432 of FIG. 24c becomes a counter 2442 having two stages, CMOS stage S3 and low-noise stage S2. As before, the crystal oscillator 130 provides a clock with a frequency of approximately 6.25 MHz, the stage S1 PLL circuit 2010/2020/2030 produces a clock signal of approximately 200 MHz from the 6.25 MHz signal, and the programmable delay unit 2050 provides delays with a placement of 30 picoseconds. The S3 portion of the counter 2442 counts bits that change infrequently during a single reception or transmission event, and therefore can be implemented in standard CMOS logic. The S2 stage of the counter 2442, as well as the S1 and S0 stages, count bits which change value during transmission and reception events, and must be implemented in low-noise logic to prevent the production of power supply noise and electromagnetic noise. In the preferred embodiment the chip length is approximately 10 nanoseconds and the number of chips in a code sequence is around 1024, so the time for one reception event is about 10 microseconds. This requires that the S2 stage has a 6-bit counter, and the S3 stage has an 8-bit counter. To allow for longer codes, the S2 and S3 stages could both have 8-bit counters.

In a fifth embodiment shown as a block diagram in FIG. 24e, the S2 stage uses both low-noise circuitry in a low-noise S2B stage and standard logic in a CMOS S2A stage. The S2 clock is only required to use the low-noise S2B stage during reception and transmission events, and can use the CMOS S2A stage otherwise to conserve power. As before, the crystal oscillator 130 provides a clock with a frequency of approximately 6.25 MHz, the stage S1 PLL circuit 2010/2020/2030 produces a clock signal of approximately 200 MHz from the 6.25 MHz signal, the programmable delay unit 2050 provides delays with a placement of 30 picoseconds, the processor 140 maintains a count of the most-significant digits of the time, and the low-frequency clock 119 is separated into a CMOS S3 stage and an S2 stage.

In summary, the number of stages in which the clock is divided is a function of the power requirements. For instance, if power consumption is not an issue, the S2 and S3 counters of the low-frequency clock 119 of the preferred embodiment 100 of FIG. 24e could be combined and use low-noise circuitry. If power consumption is to be minimized, the timebase has a counter for the most-significant bits in the processor 140, the low-frequency clock 119 has a CMOS S3 stage for the next most-significant bits and the S2 stage for the next most-significant bits is separated into a low-noise S2B stage which is active during transmission and reception events and a CMOS S2A stage which is active between transmission and reception events. The detailed description below corresponds to the preferred embodiment of FIG. 24e which is designed to minimize power consumption.

The timebase of the transceivers measures time differences used to calculate locations, and acts as an alarm clock to trigger transmissions and listening periods for receptions. As discussed above, the time base of a localizer of the preferred embodiment is divided into five stages of clocks, the stages being numbered from zero to four in order of increasingly large time graduations between clock ticks (a clock tick is the time between rising edges of a clock signal). The fourth, third and second stages are considered to compose the low-frequency clock. The second stage counts clock impulses directly from a crystal oscillator. The first stage counts clock impulses from a phase-lock loop circuit which increases the frequency of the crystal oscillator clock, and the zeroth stage is a programmable delay which provides timing control to an accuracy of 30 picoseconds. The first and zeroth stages are considered to compose the high-frequency clock. Between transmissions when low power consumption is required, only the fourth stage, the third stage and a low-power-consumption portion of the second stage are active. During transmissions when highly accurate time keeping and low-noise emissions are required, the zeroth stage, first stage, and a low-noise portion of the second stage are active. The timebase is designed to insure that in the switching between the low-frequency clock and the high-frequency clock no clock impulses are lost and there is no phase error.

The first, third and fourth stages each have a single counter, while the second stage has two counters: a low-noise counter which operates during transmission and reception, and a low-power standard-circuitry counter which operates between localizer communications. The system is designed so that any transmission or reception impulse sequence is shorter than the time required for the second-stage counters to count from zero to a terminal count. At the terminal count of the second-stage standard-circuitry counter immediately prior to a transmission or reception time window, the second-stage low-noise counter will be activated and the second-stage standard-circuitry counter will be inactivated. The second-stage low-noise counter continues counting until it reaches its terminal count, and at that point there is a check as to whether the transmission or reception time window is over. If the system is still receiving or transmitting, the second-stage low-noise counter will count again to its terminal count, at which point the transmission or reception will be complete and the second-stage standard-circuitry counter will be activated and the second-stage low-noise counter will be inactivated.

When the counter of the first stage reaches its terminal count it resets to zero and at approximately the same time the 6.25 MHz clock causes the counter in the second stage to be incremented by one. When either of the counters of the second stage reaches its terminal count it resets to zero and increments the counter of the third stage by one, and when the counter of the third stage reaches its terminal count it resets to zero and increments the counter of the fourth stage by one. In other words, the counter in the first stage holds a set of least-significant (highest-frequency) clock bits, the counter in the fourth stage holds a set of most-significant (lowest-frequency) clock bits, and the counters in the second and third stages hold clock bits of intermediate significance. Therefore, a triggering clock time C is a concatenation of bit segments, i.e., $C=(C_4, C_3, C_2, C_1, C_0)$, where $C_n$ is the count of the nth stage (n=1, 2, 3 and 4) and $C_0$ is the delay generated by the zeroth stage.

The first, second and third stages each have a transmitter event register, a transmitter event comparator, a receiver event register and a receiver event trigger. (The receiver and transmitter sections of the stages work in exactly the same manner, except where otherwise noted, so the discussion of the receiver section which follows may also be applied to the transmitter section.) To trigger a reception event, bit segments corresponding to the triggering time are loaded in event registers in stages one through three, and a delay is selected for the programmable delay of stage zero. This is referred to as "arming" the event registers. When a comparator determines that there is a correspondence between the event register value and the counter value of that stage a "triggering" of the comparator occurs and it enables the comparator of the next stage (the stage having the next finer time graduations). If a transmission is to occur at a time ($C_4$, $C_3$, $C_2$, $C_1$, $C_0$), event registers in the third, second and first stages are armed with the values $C_3-1$, $C_2-1$, and $C_1-1$, respectively. Arming the event registers with the values $C_3-1$, $C_2-1$, and $C_1-1$, rather than $C_3$, $C_2$, and $C_1$, makes the circuit design less demanding by providing additional time for events associated with triggering to occur. When the counter in the third stage reaches the value $C_3-1$, the comparator in the third stage triggers, and enables the comparator in the second stage. At this point the low-noise components of the second stage are activated and the standard-circuitry components of the second stage are deactivated. Similarly, when the second-stage counter reaches the value $C_2-1$, the second-stage comparator enables the first-stage comparator, and the low-noise components of the first stage are also activated. When the first-stage comparator determines that the count in the first-stage counter is equal to $C_1-1$, on the next increment of the first-stage counter the high-frequency clock impulses from the first stage are sent to the programmable delay where they are delayed by $C_0$. For reception events the high-frequency clock impulses from stage zero are directed to a pseudorandom sequence generator and a time-integrating correlator. For transmission events the high-frequency clock impulses are directed to a transmitter code-sequence generator and a transmitter antenna driver.

The time offsets at which values of the discrete-time pseudo-autocorrelation (DTPAC) function are determined are referred to as the "time bins." The time bins are located at times $(t_0+n\Delta t)$, where $t_0$ is the time of the central time bin, n is an integer (between negative fifteen and positive sixteen in the preferred embodiment), and $\Delta t$ is the time difference between neighboring bins. The correlator circuit has an integrator for each time bin. The internally-generated integration sequence $\Phi_i(t)$ may be produced by a linear feedback shift register (and associated circuitry) and delayed by shifting it through a series of flip-flops. (It should be noted that the delay of the analog antenna signal rather than the digital impulse sequence signal would require using an analog delay means such as a surface acoustic wave delay, or lengths of coaxial cable or optical fiber, and would therefore not be compatible with the above-mentioned size and technology requirements of the transceivers.) The flip-flops provide taps for the integrators, and each of the integrators calculates the integral of the product of a delayed integration sequence $\Phi_i(t-t_0-n\Delta t)$ and the received signal $\Phi_e(t)$, so that the value at the nth bin is $$\Lambda(n) = -\sigma[(\tau-t-t_0-n\Delta t)/\delta t]^* \sigma[\tau/\delta t]^* \gamma_i((\tau-t-t_0-n\Delta t) \bmod \delta t)^* \gamma_e(\tau \bmod \delta t) d\tau.$$

The time bin which delays the integration sequence $\Phi_i(t)$ so that it overlaps most closely with the received signal $\Phi_e(t)$ is termed the "peak" time bin since it produces the maximum value in the DTPAC function $\Lambda(n)$.

In each integrator the product of a delayed internally-generated integration sequence $\Phi_i(t)$ and the received differential voltage signal $\Phi_e(t)$ from the antenna is produced by directly applying the received voltage to the input of a transconductance amplifier when the value of the integration sequence $\Phi_i(t)$ is positive unity, and inverting the polarity of the antenna voltage to the input of the transconductance amplifier when the value of the integration sequence $\Phi_i(t)$ is negative unity. When the delayed integration sequence $\Phi_i(t)$ has a value of zero (prior to the beginning of the sequence, and subsequent to the end of the sequence) the differential inputs to the transconductance amplifier are shorted. The transconductance amplifier provides a very rapid response time since it takes advantage of the natural mode of field effect transistors, namely the conversion of input voltages to output currents, and does not utilize negative feedback, as do op-amps. However, since the response of the transconductance amplifier is rapid the output impedance of the transconductance amplifier is not large, and the voltage on a capacitor connected across the output of the transconductance amplifier decays ("droops") with a characteristic time on the order of milliseconds (which, as mentioned above, is on the order of the time it takes to calculate the arrival time of an impulse sequence). Therefore, the output of the transconductance amplifier is directed to a switched-capacitor sample-and-hold circuit, i.e., the capacitor across the amplifier output is partially discharged across sampling capacitors, the sampling capacitors are disconnected from the output capacitor, and the voltage across the sampling capacitors is then sampled by a differential amplifier which has a large input impedance. The switched-capacitor sample-and-hold circuit provides a droop time on the order of seconds. However, if the droop time is slow relative to the time required for conversion from analog to digital, a sample-and-hold circuit may not be needed.

In the preferred embodiment, impulse sequences are transmitted and received using a loop antenna. As disclosed in U.S. Pat. No. 4,506,267 issued to Henning F. Harmuth, current-mode loop antennas are well suited to NSS transmissions since their operation is not based on an electromagnetic resonance in the antenna. The far field components of the radiated electric and magnetic fields vary as the product of the length of a single unshielded arm of the loop and the time derivative of the current. Therefore, a device which uses a loop antenna can be made very small since the relatively lower power transmitted by a smaller antenna can be compensated for by producing a larger current derivative. In contrast with the disclosures of Harmuth, it has been found that it is not necessary to shield the loop antenna for it to transmit effectively.

An alternate preferred embodiment of the present invention uses a bi-loop antenna consisting of a substantially square radiating plate with a first pair of leads connected across one pair of opposite sides of the plate, and a second pair of leads connected across the other pair of opposite sides of the plate. Currents across the first pair of leads generate electromagnetic waves with a first electric field polarization, and currents across the second pair of leads generate electromagnetic waves with a second electric field polarization orthogonal to the first. Using the bi-loop antenna, transmissions along both axes can be produced, and the amount of information communicated between localizers can be increased. Another advantage of the bi-loop antenna is that the angular orientation of the plate about its normal vector is irrelevant, the plate need only face the incoming radiation to provide reception when the polarization of the incoming radiation is unknown.

With single-loop transmission and reception antennas there are orientations where the polarization of a transmitted signal is orthogonal to the reception antenna and the signal cannot be detected. However, it should be noted that if both the transmission and reception antennas are bi-loop antennas, it is always possible to communicate between the antennas regardless of their relative position and orientation.

Driving the antenna are a plurality of H-bridge switches, each H-bridge switch being connected to a cascade of pairs of staged-gain CMOS buffers. The cascade allows a large switching current to be developed, ensuring a rapid switching time. Variable delay units are placed at the beginning of each cascade to correct for any inadvertent differences in the delays of the cascades. The variable delay units can also be used to control the shapes of the transmitted impulses. By varying the number of operating H-bridges, the current, and therefore the power, to the antenna may be controlled to compensate for the distance between localizers.

An H-bridge is a switch configuration which allows the voltage across either lead to be switched from high to low, or low to high, while never creating an open circuit while current is flowing. A current pulse through the antenna generates two electromagnetic impulses—the first electromagnetic impulse corresponding to the beginning of the current pulse has a first polarization, and the second electromagnetic impulse corresponding to the end of the current pulse has an opposite polarization. Terminating current pulses through the antenna by returning both leads to high, both leads to low, or alternating both leads high and both leads low, allows the shapes, and therefore the spectra, of transmitted impulses to be controlled. In the preferred embodiment, all the switches in the H-bridge are opened when the antenna is not in use.

SUMMARY OF THE INVENTION

The present invention is directed to a transceiver for nonsinusoidal spread spectrum (NSS) radio communications. During a time window in which a signal is expected to be received, a code-sequence generator produces an integration sequence which is directed to a correlator circuit. The correlator circuit calculates integrals of the product of the received signal and delayed integration sequences to produce a correlation function. After the time window, a processor determines the time of arrival of the received signal from the correlation function.

The present invention is also directed to a method for determining the distance between a pair of radio transceivers. A first transceiver emits a first communication signal at a prearranged time. The second transceiver emits a second communication signal after a prearranged delay time from the time it expects to receive the first communication signal. After transmitting the second communication signal the second transceiver determines the time it received the first communication signal. After receiving the second communication signal the first transceiver determines the time it received that signal. The two transceivers then determine the distance therebetween based on the transmission and arrival times.

It is therefore an object of the present invention to provide a system of transceivers ("localizers") which can accurately determine their relative positions.

Further objects of the present invention are to provide localizers that are small, inexpensive and have low power consumption, particularly localizers that can be battery powered.

It is another object of the present invention to provide localizers which can operate without a clear view of the sky.

It is another object of the present invention to provide a system of localizers which do not include planetary satellites.

It is another object of the present invention to provide localizers which use nonsinusoidal spread spectrum (NSS) radio transmissions.

It is another object of the present invention to provide localizers which use low-noise logic during transmission and/or reception to increase the signal-to-noise ratio.

It is another object of the present invention to provide a very stable real-time clock counter with low power consumption, low-noise emissions during reception and transmission, a wide dynamic range and high resolution.

It is another object of the present invention to provide a very stable low-noise high-frequency clock which substitutes for a standard-circuitry low-frequency clock during transmission and/or reception with no loss of phase or clock impulses.

It is another object of the present invention to provide a highly stable and accurate timebase for a system of communicating units generated from a small number of highly accurate clocks or accurately known distances between units, where the majority of the units have low-accuracy clocks.

It is another object of the present invention to provide ranging protocols which determine the separation distances and relative clock rates of localizers, including iterative converging protocols.

It is another object of the present invention to provide ranging protocols which provide a degree of location privacy.

It is another object of the present invention to provide protocols for initiating communications between localizers.

It is another object of the present invention to provide antennas compatible with NSS transmissions and receptions.

It is another object of the present invention to provide an NSS antenna which can transmit electromagnetic waves with multiple polarizations.

It is another object of the present invention to provide an antenna which is relatively insensitive to its orientation with respect to incoming NSS radiation.

It is another object of the present invention to provide means for rapid switching of large currents through an NSS antenna.

It is another object of the present invention to provide circuitry for calculating the correlation between extremely rapidly varying signals, particularly the cross-correlation of a received analog signal and an internally-generated digital version of the analog signal.

It is another object of the present invention to determine the location of the maximum of the correlation function between a received analog signal and an internally-generated digital version of the analog signal, by integrating the received analog signal and versions of the internally-generated signal delayed by a number of time offsets.

It is another object of the present invention to provide circuitry for calculating the integral of an extremely rapidly varying analog signal, particularly that of an analog signal formed by the product of an analog signal and a digital signal having values of positive unity, negative unity and zero.

It is another object of the present invention to provide a chip function which causes the pattern of values in the correlation time bins to vary strongly with small time shifts of the received input waveform, i.e., which causes the shape of a pseudo-autocorrelation function examined at a series of discrete time intervals to vary strongly with small shifts of the arrival time of the received input waveform.

It is another object of the present invention to provide internally-generated chip waveforms and time bin locations useful in determining the exact arrival time of an NSS communication over a large span of time, locating the approximate arrival time of an NSS communication, and/or increasing the signal-to-noise ratio.

In addition, other objects, features and advantages of the present invention will become apparent from the following detailed description when taken in conjunction with the accompanying drawings.

BRIEF DESCRIPTION OF THE DRAWINGS

FIG. 6 is a flow chart depicting another iterative ranging method based on the method depicted in FIG. 4.

FIG. 7b diagrams a modification of the method for cooperative ranging of FIG. 7a, where a single communication is substituted for the second and third communications of FIG. 7a.

FIG. 10 shows a set of waveforms and the absolute value of corresponding Fourier spectra.

FIG. 11 and FIGS. 11-0 through 11-16 illustrate that the discrete pseudo-autocorrelation (DTPAC) function is equal to the product of a received signal $\Phi_e(t)$ and an internally-generated integration signal $\Phi_i(t)$.

FIGS. 12-1 through 12-5 show five pairs of graphs illustrating the relationship between a discrete-time pseudo-autocorrelation function $\Lambda(n)$ and time samplings of the analog pseudo-autocorrelation function $\Lambda(t)$, and illustrating the dependence of the shape of the discrete-time pseudo-autocorrelation function $\Lambda(n)$ on shifts in the bin times.

FIGS. 13-1 through 13-5 show five pairs of graphs illustrating the relationship between a discrete-time pseudo-autocorrelation function $\Lambda(n)$ and a time sampling of the analog pseudo-autocorrelation function $\Lambda(t)$, and illustrating the dependence of the shape of the discrete-time pseudo-autocorrelation function $\Lambda(n)$ on shifts in the bin times, the bin times of FIG. 13 being shifted by smaller amounts than the shifts of FIG. 12.

FIG. 15 is a schematic diagram of a low-frequency clock portion of the timebase circuitry of a localizer.

FIG. 16 is a schematic diagram of a high-frequency clock portion of the timebase circuitry of a localizer.

FIG. 17b is a timing diagram of signals in the receiver code-sequence generator of FIG. 17a.

FIG. 20 is a timing chart for signals in the integrator circuit.

FIG. 22 is a schematic diagram of a transmitter antenna driver.

GLOSSARY

Figure 1:
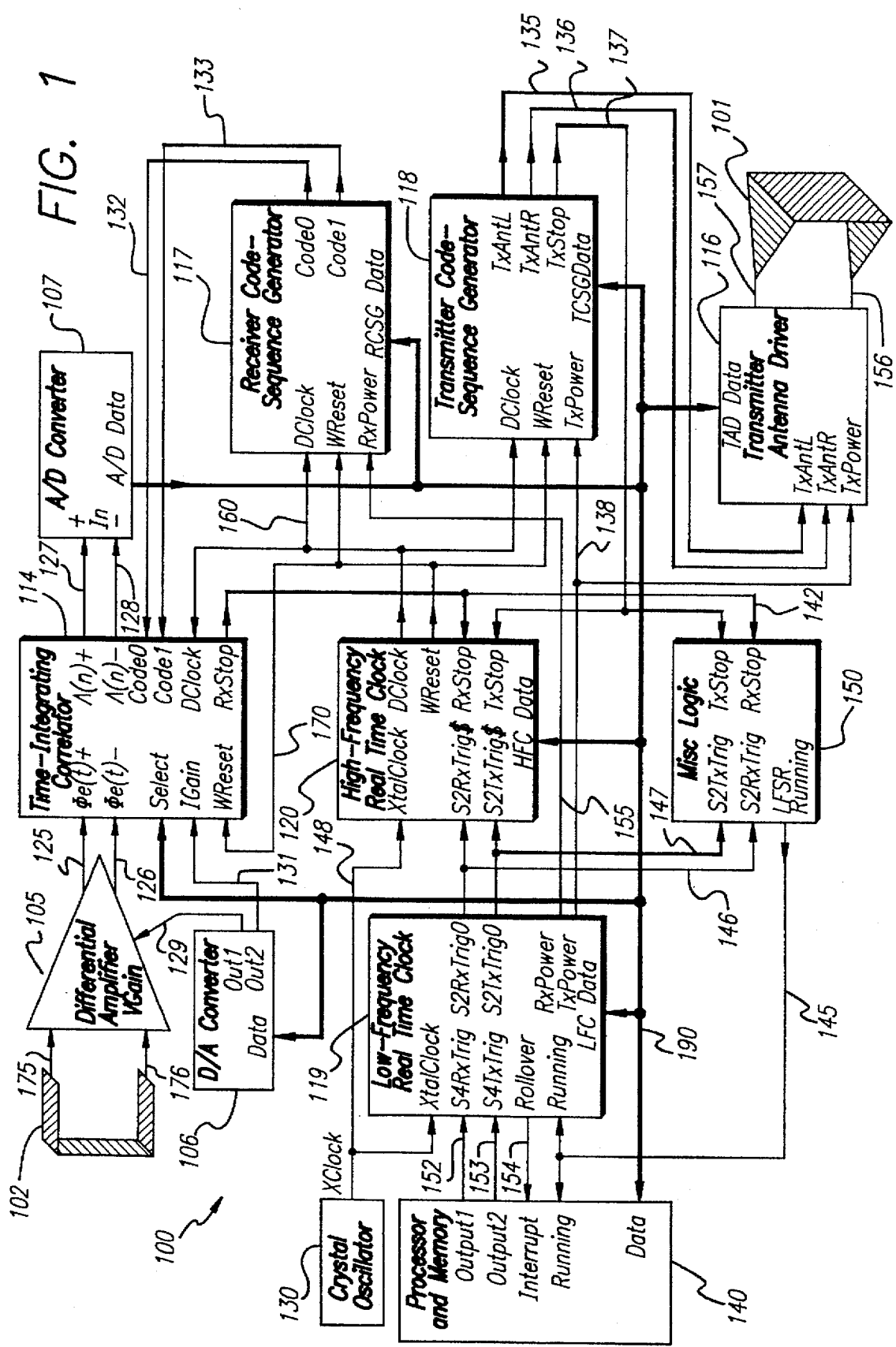
FIG. 1 shows a schematic diagram of the circuitry of a localizer according to the present invention.

The following symbols are used in the present specification:

| Symbol | Definition |
|---|---|
| $\alpha, \beta$ | dummy variables for letters |
| $\gamma(t)$ | chip waveform |
| $\gamma_i(t)$ | internally-generated chip waveform |
| $\gamma_e(t)$ | received chip waveform |
| $\Delta t$ | delay time between time bins |
| $\delta t$ | time length of a chip |
| $\theta$ | phase of a sinusoidal carrier |
| $\Lambda(n)$ | value of discrete-time pseudo-autocorrelation function at the nth bin |
| $\Lambda(t)$ | pseudo-autocorrelation function |
| $\omega$ | angular frequency of a sinusoidal carrier |
| $\sigma(i)$ | pseudorandom code sequence |
| $\sigma^*(i)$ | data modulated pseudorandom code sequence |
| $\tau$ | dummy variable for time |
| $\Phi(t)$ | pseudorandom chip sequence |
| $\Phi_i(t)$ | internally-generated pseudorandom integration sequence |
| $\Phi_i^{(n)}(t)$ | delayed internally-generated pseudorandom integration sequence directed to the $n^{th}$ integrator circuit |
| $\Phi_e(t)$ | transmitted or received chip sequence |
| $\psi(t)$ | communication consisting of a string of pseudorandom sequences $\Phi(t)$ |
| $a(t)$ | received or transmitted signal |
| A,B,D | reference letters for particular localizers |
| c | speed of light |
| Code0 | low-order bit of two-bit reception command sequence |
| Code1 | high-order bit of a two-bit reception command sequence |
| $C_n$ | count of the nth clock stage |
| f | frequency of a sinusoidal carrier ($2\pi\omega$) |
| G(t) | waveform of a Gaussian impulse |
| g | shift factor for spacing between bins |
| h | width factor for pulses in $\gamma(t)$ |
| i,n | dummy variables for integers |
| $k_A, k_B$ | ratio of actual time to clock time for localizers A and B |
| L | number of chips in a pseudorandom sequence $\Phi(t)$ |
| M | number of pseudorandom sequences $\Phi(t)$ in a communication $\psi(t)$ |
| N | number of integrators in the time-time integrating correlator |
| $R_A, R_B$ | time for round trip communication A→B→A and B→A→B |
| t | time |
| $t_0$ | time of central time bin |
| $t_c$ | time between ticks of the system clock |
| $t_m$ | time of peak of Gaussian impulse |
| $t_s$ | time length of an chip sequence (=L$\delta t$) |
| $\Delta T_c$ | delay time between ranging communications and the transmission of correction bits |
| $\Delta T_d$ | turnaround time between reception and transmission of communications |
| $\Delta T_e$ | time difference between expected and actual arrival times of a communication |
| $\Delta T_r$ | time delay between beacon and reception window |
| $\Delta T_s$ | spoofing time delay |
| $\Delta T_x$ | shift in transmission time $T_1$ |
| $\Delta T_x(min)$ | minimum shift in transmission time $T_1$ |
| $\Delta T_w$ | length of reception time window (=N$\delta t$) |
| $T_1, T_2, T_3, \ldots$ | central times of reception windows or beginning times of transmissions |
| $T_{2a}, T_{4a}$ | arrival times of communications |
| X | distance between localizers |
| X(n) | nth estimate of distance between localizers |

DETAILED DESCRIPTION OF THE PREFERRED EMBODIMENTS

Detailed Overview of Transceiver Circuitry

A schematic of a localizer circuit 100 according to the present invention is shown in FIG. 1. In all the figures, including FIG. 1, components which utilize low-noise circuitry are shown in shadowed boxes. Such low-noise components include a time-integrating correlator 114, a low-frequency real time clock 119, a high-frequency real time clock 120, a receiver code-sequence generator 117, a transmitter code-sequence generator 118, and miscellaneous logic 150. The miscellaneous logic 150 must operate during transmission and reception and cannot be delegated to a standard-logic processor 140. The only components which are composed entirely of standard-logic circuitry are the processor and memory unit 140. Many components are analog in nature, and have no digital logic that produces power supply switching noise or electromagnetic noise. Analog components include: a differential amplifier 105, a digital-to-analog (D/A) converter 106, and an analog-to-digital (A/D) converter 107, and the crystal oscillator 130. The D/A converter 106 and A/D converter 107 have a logic back end, but this can be constructed of standard-logic since they are only used between reception events. The transmitter antenna driver 116 does not need to use low noise logic, since it only operates when the transmission antenna 101 is generating large noise-like signals. Reception and transmission antennas 102 and 101 are specifically designed to be used for nonsinusoidal spread-spectrum radio communications.

The time base of the circuit 100 is based on a crystal oscillator 130 which, in the preferred embodiment, generates an approximately 6.25 MHz crystal clock signal XClock on crystal clock output line 148. The crystal clock signal XClock is directed to the XtalClock inputs of the low-frequency and high-frequency real time clocks 119 and 120. The high-frequency clock 120 is activated only for transmission and reception events to provide additional precision to the timebase. When the counters in the low-frequency clock 119 reach their maximum value a rollover bit is sent from the Rollover output to the Interrupt input of the processor 140 via line 154 to increment a counter in the processor 140, and the counter in the low-frequency clock 119 resets to zero and continues counting.

The low-frequency clock 119 operates both during and between communications. Since low-noise circuitry uses more power than standard logic circuitry, in applications that must run for long time periods on small portable batteries, the low-frequency clock 119 may be divided into stages that run on standard logic between communications and low-noise logic during communications. However, when adequate power is available, for example in a permanent installation, the low-frequency clock 119 could be designed using entirely low-noise circuitry. A low-power low-frequency clock 119 is presented as the preferred embodiment in the following discussion. The low-power low-frequency clock 119 has a CMOS-logic stage, termed the "S3 stage," which only operates between communications, since the operation of CMOS logic produces power line noise and electromagnetic radiation which may interfere with communications. The preferred embodiment low-frequency clock 119 also has a stage with a combination of standard and low-noise circuitry, termed the "S2 stage," which holds time bits of less significance than a counter in the S3 stage, and each rollover of the S2 counter increments the S3 counter. The S2 stage switches from operation with the standard circuitry to the low-noise circuitry on the rollover of a standard-circuitry S2 counter before each communication. The S2 stage switches back from operation with the low-noise circuitry to the standard circuitry on the rollover of the low-noise S2 counter after each communication. In an alternate embodiment where low power consumption is not as much an issue, the S2 stage could be composed entirely of low-noise circuitry.

The time accuracy required for accurate ranging necessitates that no clock ticks are lost or gained in switching between the standard and low-noise circuitry of the low-frequency clock 119. Triggering times for receptions and transmissions are provided by the processor 140 via data bus 190 to the LFC Data input of the low-frequency clock 119. The triggering times are stored in event registers in the low-frequency clock 119. The reception triggering circuitry and the transmission triggering circuitry are enabled by signals from the Output1 and Output2 terminals of the processor 140, which are directed via lines 152 and 153 to the S4RxTrig and S4TxTrig inputs of the low-frequency clock 119, respectively. When the time of a transmission event is reached to the accuracy of the S3 counter in the low-frequency clock 119, the transmission triggering circuitry of the S2 stage is activated, and the power of the transmitter code-sequence generator 118 and the transmitter antenna driver 116 is turned on by signals to their TxPower inputs from the TxPower output of the low-frequency clock 119 via a transmission enable line 138. Because the TxPower output from the S3 stage is asserted prior to the triggering of the S2 stage and the stages in the high-frequency real time clock 120, this provides the transmitter code-sequence generator 118 and the transmitter antenna driver 116 circuits time to stabilize before beginning a transmission event. Similarly, when the time of a reception event is reached to the accuracy of the S3 counter in the low-frequency clock 119, the reception triggering circuitry of the S2 stage is activated, and the power to the receiver code-sequence generator 117 is turned on by a signal to its RxPower input from the RxPower output of the low-frequency clock 119 via a reception enable line 155. Because the RxPower output from the S3 stage is asserted prior to the triggering of the S2 stage and the stages in the high-frequency real time clock 120, this provides the receiver code-sequence generator 117 time to stabilize before beginning a reception event.

When the time of a transmission event is reached to the accuracy of the S2 counter in the low-frequency clock 119, a triggering signal is passed from the transmission triggering output S2TxTrig0 of the low-frequency clock 119 to the transmission triggering input S2TxTrig$ of the high-frequency clock 120 via line 147 to enable transmission triggering circuitry in the high-frequency clock 120. Similarly, when the time of a reception event is reached to the accuracy of the S2 counter in the low-frequency clock 119, a triggering signal is passed from the reception triggering output S2RxTrig0 of the low-frequency clock 119 to the reception triggering input S2RxTrig$ of the high-frequency clock 120 on line 146 to enable reception triggering circuitry in the high-frequency clock 120. The high-frequency clock 120 includes a phase-lock loop circuit which uses the crystal clock signal XClock 148 at its XtalClock input to produce a high-frequency clock signal with a clock rate of about 200 MHz. The high-frequency clock signal is delayed by a programmable delay (not shown in FIG. 1) controlled by data provided to the HFC Data input by the processor 140 to generate a delayed high-frequency clock signal DClock, hereinafter referred to as the system clock signal DClock. The system clock signal DClock is supplied via line 160 to the DClock inputs of the time-integrating correlator 114, receiver code-sequence generator 117, and transmitter code-sequence generator 118.

When the time-integrating correlator 114 determines that a reception event is completed, it asserts a signal at its RxStop output which is directed to the RxStop input of the high-frequency clock 120 via reception-stop line 142. Similarly, when the transmitter code-sequence generator 118 determines that a transmission event is completed, it asserts a signal at its TxStop output which is directed to the TxStop input of the high-frequency clock 120 via transmission-stop line 137. Shortly after the high-frequency clock 120 receives a TxStop or RxStop signal, a signal asserted at the WReset output terminal of the high-frequency clock 120 is directed via reset line 170 to the WReset inputs of the time-integrating correlator 114, the receiver code-sequence generator 117, and the transmitter code-sequence generator 118 to reinitialize these components.

The miscellaneous logic block 150 monitors the status of communications to insure that the standard-logic circuitry of the low-frequency clock 119 and the processor 140 are not activated, and thus not creating noise, while communications are in progress. If a communication extends past the rollover time of the S2 counter, the signal asserted at the LFSR Running output of the miscellaneous logic block 150 and directed to the Running inputs of the low-frequency clock 119 and the processor 140 via LFSR running line 145 prevents the standard-logic circuitry from activating until another rollover from the S2 counter occurs. To determine when communications begin, the trigger outputs S2RxTrig0 and S2TxTrig0 from the low-frequency clock 119 are directed via lines 147 and 146 to the S2RxTrig$ and the S2TxTrig$ inputs of the miscellaneous logic block 150, respectively. To determine when communications are completed, the RxStop and TxStop outputs from the time-integrating correlator 114 and the transmitter code-sequence generator 118 are directed to the RxStop and Txstop inputs of the miscellaneous logic block 150 via reception-stop line 142 and transmission-stop line 137, respectively.

When an electromagnetic signal is incident on the reception antenna 102, the received signal $\Phi_e(t)$ is directed via reception antenna leads 175 and 176 to the inputs of a differential amplifier 105. The amplification of the analog differential amplifier 105 is controlled by the processor 140 which supplies data via the data bus 190 to the D/A converter 106. The D/A converter 106 converts the digital data to an analog signal at the Out1 terminal of the D/A converter 106 which is directed via voltage gain control line 129 to the VGain input of the differential amplifier 105. The D/A converter 106 also provides a current gain control signal at its Out2 terminal which is directed to the IGain input of the time-integrating correlator 114 via a current gain control line 131. The voltage gain of the differential amplifier 105 is controlled to compensate for the inverse-square decay in the power of the received signal $\Phi_e(t)$ with distance between the communicating localizers. Differential output lines 125 and 126 from the differential amplifier 105 are directed to inputs $\Phi_e(t)^+$ and $\Phi_e(t)^-$ of the time-integrating correlator 114.

When the receiver code-sequence generator 117 is activated by having the signal to the WReset input go low and receiving a clock signal at the system clock input DClock, it generates a two-bit command sequence, the Code1 and Code0 outputs on lines 132 and 133 each providing one bit of the two-bit sequence to the Code1 and Code0 inputs of the time-integrating correlator 114, respectively. The particular command sequence Code1/Code0 is determined by the data directed from the processor 140 via data bus 190 to the RCSG Data input of he receiver code-sequence generator 117. The system lock DClock provided by the high-frequency clock 120 is directed via system clock line 160 to the clock input DClock of the receiver code-sequence generator 117. A reset signal directed to the WReset input of the receiver code-sequence generator 117 forces the Code1/Code0 outputs to zero between reception events.

Figures 1, 18:
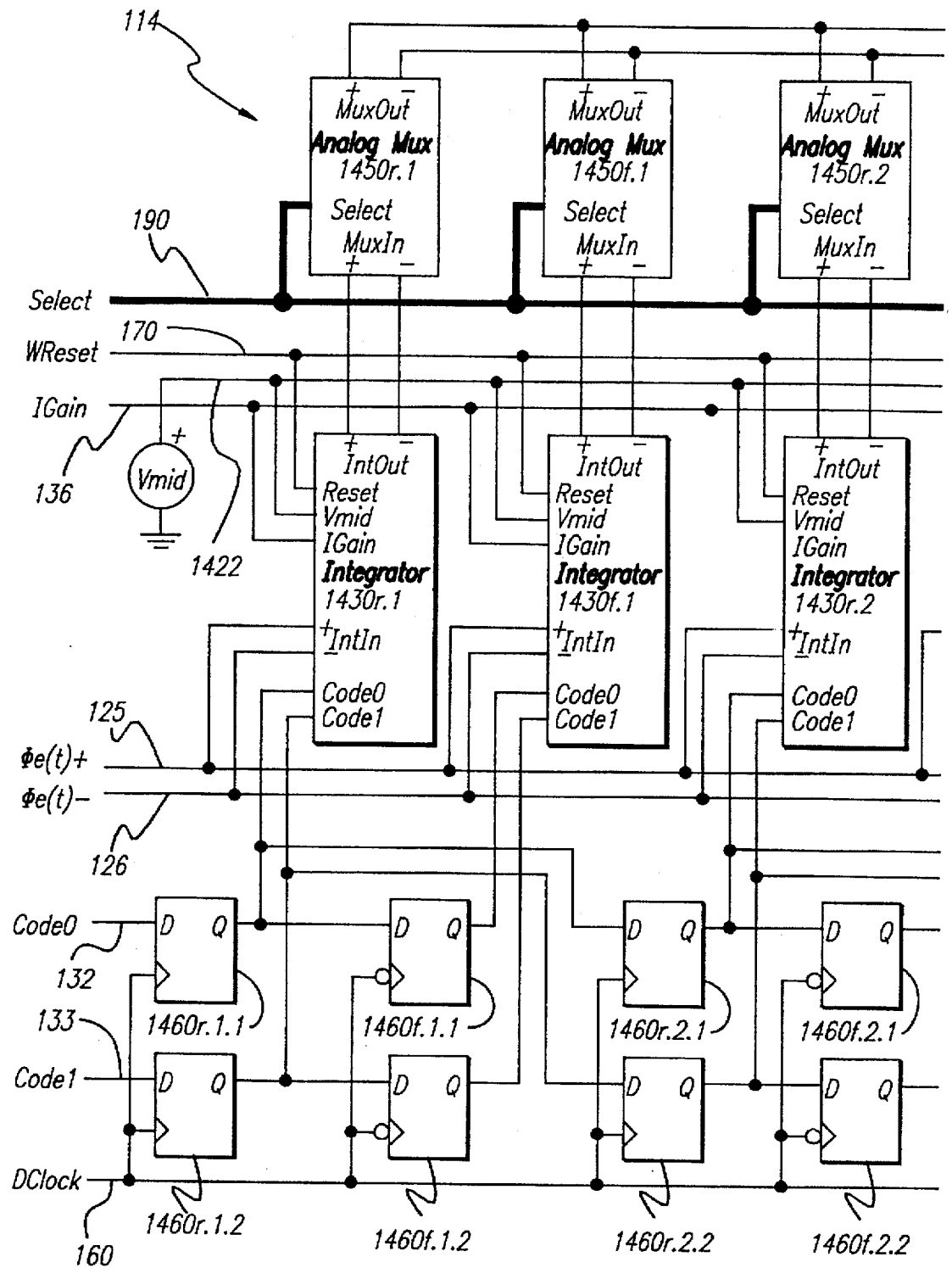
FIG. 18 is a schematic diagram of a time-integrating correlator for providing the discrete-time pseudo-autocorrelation function $\Lambda(n)$.

The time-integrating correlator 114 provides the discrete-time pseudo-autocorrelation (DTPAC) function $\Lambda(n)$ as a differential analog output at terminals $\Lambda(n)^+$ and $\Lambda(n)^-$. The DTPAC function $\Lambda(n)$ is equal to the integral of the product of the received signal $\Phi_e(t)$ directed to the $\Phi_e(t)^+$ and $\Phi_e(t)^-$ input terminals and an integration sequence $\Phi_i(t)$ encoded on the two-bit command sequence supplied to the Code1 and Code0 inputs. As shown in FIG. 18, the time-integrating correlator 114 includes a plurality of integrator circuits 1430 (similar components which have the same initial four-digit portion of their reference numerals will be referred to collectively by that portion of the reference numeral). The two-bit command sequence Code1/Code0 is delayed by a chain of flip-flops 1460 which are tapped by the integrators 1430. The rate at which the command sequence Code1/Code0 passes through the delay chain 1460 is controlled by the system clock DClock on line 160. The $n^{th}$ integrator circuit 1430 calculates the integral of the product of the received signal $\Phi_e(t)$ and a delayed integration signal $\Phi_i(t)^{(n)}$, where the delayed integration signal $\Phi_i(t)^{(n)}$ is encoded on the delayed two-bit command sequence Code1/Code0 directed to the Code1 and Code0 inputs of the $n^{th}$ integrator 1430. The preferred embodiment has thirty-two (sixteen pairs) integrators and rising edges of the 200 MHz system clock DClock are separated by 5 nanoseconds, so the delay between the time the command sequence Code1/Code0 is directed to the first pair of integrators 1430 and the last pair of integrators 1430 is 80 nanoseconds, i.e., the reception time window has a length of 80 nanoseconds.

After a reception event the time-integrating correlator 114 sends a signal from its RxStop output via reception-stop line 142 to the RxStop inputs of the high-frequency clock 120 and the miscellaneous logic block 150, as mentioned above. Also, after a reception event the reactivated processor 140 sends selection signals via the data bus 190 to the Select input of the time-integrating correlator 114. The selection signals control the multiplexing of the outputs from the integrators 1430 to the output terminals $\Lambda(n)^+$ and $\Lambda(n)^-$ of the time-integrating correlator 114. Also, after a reception event a reset signal from the high-frequency clock 120 is asserted at the WReset input of the time-integrating correlator 114 to reset the integrators 1430.

The signals at the $\Lambda(n)^+$ and $\Lambda(n)^-$ outputs of the time-integrating correlator 114 are analog signals which are converted to digital by directing them to the In$^+$ and In$^-$ inputs of the A/D converter 107 via lines 127 and 128. The digital DTPAC function $\Lambda(n)$ from the A/D converter is directed from the A/D Data output via data bus 190 to the Data input of the processor 140. The processor 140 processes the digital DTPAC function $\Lambda(n)$ to determine the arrival time of the received signal $\Phi_e(t)$.

For a transmission event the transmitter code-sequence generator 118 is activated by having the signal via line 170 to the WReset input go low and receiving a clock signal at the system clock input DClock from the high-frequency real time clock 120. The system clock DClock provided by the high-frequency clock 120 is directed via the system clock line 160 to the clock input DClock of the transmitter code-sequence generator 118. The transmitter code-sequence generator 118 then produces a two-bit transmission command sequence, the TxAntL and the TxAntR outputs on lines 135 and 136 each providing one bit of the two-bit command sequence to the TxAntL and TxAntR inputs of the transmitter antenna driver 116. The particular transmission command sequence TxAntL/TxAntR is determined by the data directed from the processor 140 via data bus 190 to the TCSG Data input of the transmitter code-sequence generator 118. A reset signal directed to the WReset input of the transmitter code-sequence generator 117 from the WReset output of the high-frequency clock 120 forces the command sequence outputs TxAntL and TxAntR to zero after a transmission event.

A signal to the TxPower input of the transmitter antenna driver 116 from the TxPower output of the low-frequency clock 119 via transmission power line 138 turns on the power to the transmitter antenna driver 116 in preparation for transmission events. The two-bit transmission command sequence TxAntL and TxAntR from the transmitter code-sequence generator 118 is directed to the TxAntL and TxAntR inputs of the transmitter antenna driver 116 to control transmissions via lines 135 and 136. The transmission command sequence TxAntL and TxAntR controls the switching of current through a plurality of H-bridge switches (shown in FIG. 22) to the transmission antenna 101 via transmission antenna leads 156 and 157. The particular activated H-bridge switches are controlled by data from the processor 140 directed via data bus 190 to the TAD Data input of the transmitter antenna driver 116 to compensate for the inverse-square decay of signal power with the distance of separation between localizers, and to adjust transmission levels so as not to interfere with other nearby communicating localizers.

Detailed Description of the Ranging Transactions

The distance X between two localizers, A and B, is determined by measuring signal propagation times in cooperative ranging transactions. It will be assumed in the following discussion that the relative velocity of localizer A to localizer B is small enough to be insignificant during the time of a single ranging transaction. Furthermore, for ease of discussion it will initially be assumed that the localizers are synchronized and localizer A has an approximate knowledge of its distance X from localizer B, and the relative clock rate $k_B$ of localizer B. The first approximations to the values X and $k_B$ are determined during synchronization operations when localizers first begin communications. Synchronization operations are described later.

There are a number of communication protocols that can be used to determine the propagation times. In a first ranging method 200 depicted in FIG. 2, localizers A and B have previously arranged that localizer A will send a first communication to localizer B at a time $T_1$. The transmission by localizer A is represented by the first positive pulse 220 in the timeline 210 of localizer A. Localizer B schedules to receive the first communication 222 during a reception time window 224 that is centered around time $T_2$ and has width $\Delta T_w$, represented by the first negative pulse 224 in the timeline 212 of localizer B. The reception time window 224 is centered about the time when the first communication 222 is expected to arrive. After the reception time window 224 ends, localizer B analyzes the reception data during a processing period 230 and determines the precise time $T_{2a}$ that the first communication 222 actually arrived.

After a prearranged delay time $\Delta T_c$ from the actual reception time $T_{2a}$, localizer B schedules a transmission event 240, represented by the positive pulse at time $T_3$ in the timeline 212 of localizer B, and sends a second communication 242 back to localizer A. The delay $\Delta T_c$ is chosen to give localizer B sufficient time to determine the precise arrival time $T_{2a}$ of the first communication 222. Localizer A arranges to receive the second communication 242 in a reception time window 244, represented by the negative pulse on the timeline 210 of localizer A, that is centered around a time $T_4$, where $T_4$ is equal to the initial transmission time $T_1$ plus delay time $\Delta T_c$ plus an estimate of the propagation time for a signal to go from localizer A to localizer B and back. Then, localizer A analyzes the reception data during a processing period 250 and determines the precise time $T_{4a}$ that the communication 242 arrived. Localizer A now has all the information necessary to calculate the round trip distance 2*X, i.e., $$2*X = (T_{4a} - T_1 - k_B * \Delta T_c) * c,$$

where c is the speed of light and $k_B$ is the ratio of localizer A's clock rate to localizer B's clock rate. (Localizer A's clock rate is assumed to be correct, i.e., $k_A=1$.) This method provides an updated measurement of the separation distance X between the two localizers.

Unfortunately, this first ranging method 200 is sensitive to drifting of the relative clock rates over the long time required to perform the distancing communications. Assuming that a typical microprocessor can execute one million instructions per second, and assuming it will take 1000 instructions to analyze the correlator values to determine the first reception time $T_{2a}$, the delay time $\Delta T_c$ between the first reception 224 and the second transmission 240 will have to be on the order of one millisecond. The propagation time of electromagnetic radiation over a distance of 30 meters is only 100 nanoseconds. Thus, the time period we wish to determine, namely the propagation time of the communication between the localizers, is one hundred parts per million of the time period that is measured, namely $T_{4a} - T_1$.

Figure 3:
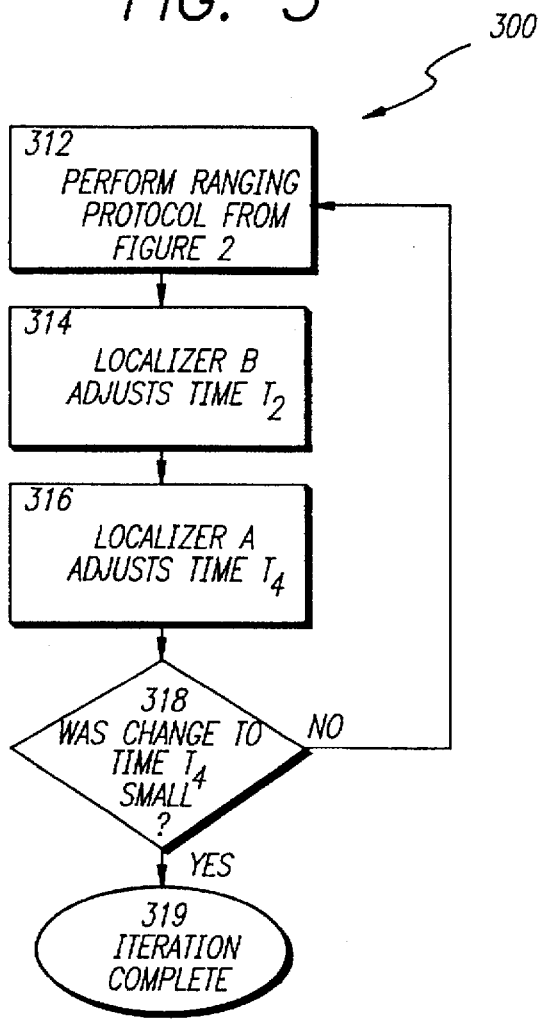
FIG. 3 is a flow chart depicting an iterative ranging method based on the method depicted in FIG. 2.

In a modification of this procedure, localizers A and B could iterate and converge on the correct arrival times of the communications as shown in the iterative procedure 300 in the flowchart of FIG. 3. In a first step 312 the two localizers perform the ranging protocol as described above for FIG. 2. In the next step 314 localizer B modifies its value of the central time $T_2$ of its next reception window 224 by an amount $(T_{2a} - T_2)$ so that the next communication should arrive in the middle of the reception time window 224. In the step 316 localizer A modifies the central time $T_4$ of its next reception window 244 so that the next arrival time $T_{4a}$ should occur in the middle of its reception window 244. In the testing step 318 localizer A tests the accuracy of the most recent ranging transaction by checking to see if the value of central time $T_4$ of its reception window 244 was changed in the previous step 316. If the central time $T_4$ did need adjusting, then control returns back to the initial step 312 and another iteration of the ranging protocol of FIG. 2 occurs. If the change to time $T_4$ in step 316 was zero, or some reasonably small prearranged amount, then the iterative procedure 300 is complete. After a few iterations, the actual reception times $T_{2a}$ and $T_{4a}$ will converge to the centers of the reception windows 224 and 250, and the iterative procedure 300 is complete. Before the iterations converge, localizer A has information concerning the actual arrival time $T_{4a}$, but does not know localizer B's reception time $T_{2a}$. After the iterations are complete in step 319, the value of actual arrival time $T_{2a}$ is assumed to have converged on central time $T_2$ of localizer B's reception window 224, and localizer A can calculate the round trip distance 2X from the round trip transit time $T_{4a} - T_1 - \Delta T_c$.

Figure 4:
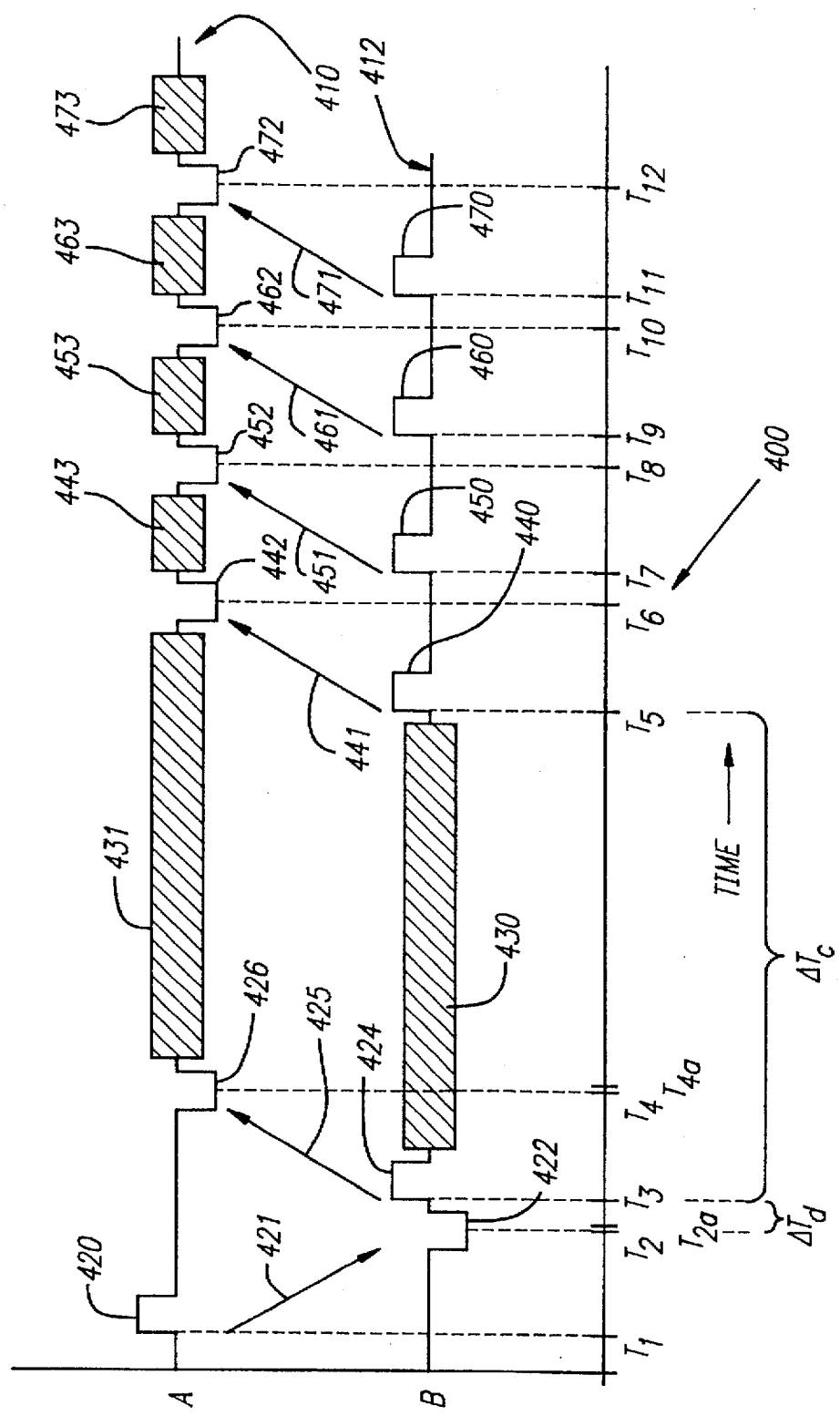
FIG. 4 diagrams a method for cooperative ranging between two localizers which is more accurate than the method depicted in FIG. 2.
Figures 2, 18:
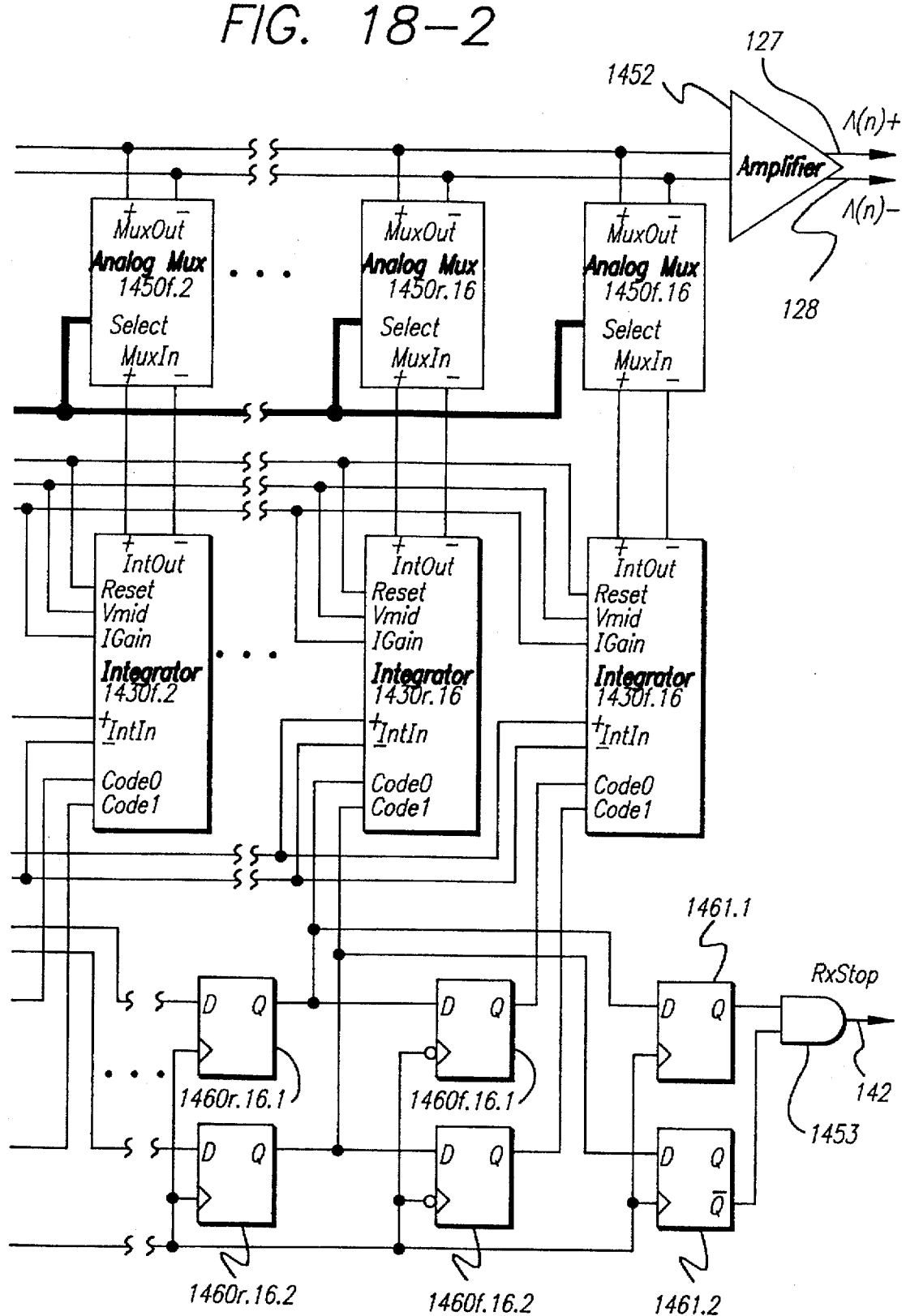
FIG. 2 diagrams a method for cooperative ranging between two localizers.

An improvement on the first ranging method 200 of FIG. 2 is a second ranging method 400 shown in FIG. 4. In this second method 400 localizer A sends a first communication 421 during a transmission event 420, represented by the first positive pulse in the timeline 410 of localizer A, beginning at prearranged time $T_1$. Localizer B expects the first communication 421 to arrive during a reception time window 422 centered around time $T_2$, represented in FIG. 4 by the first negative pulse in the timeline 412 of localizer B. Without waiting to calculate the precise arrival time $T_{2a}$ of the first communication 421, localizer B sends a second communication 425 back to localizer A in a transmission event 424, represented by the first positive pulse in the timeline 412 of localizer B. The transmission event 424 begins at time $T_3$ after a short delay time $\Delta T_d$ from the center $T_2$ of the reception time window 422. The only limit on the shortness of $\Delta T_d$ being that localizer B must have a chance to finish receiving the communication 421 from localizer A, i.e., $\Delta T_d$ must be greater than about 10 microseconds. (Alternatively, $\Delta T_d$ may be negative and the first and second communications 421 and 425 will cross in the space between the localizers.) Localizer A arranges to receive the second communication 425 during a reception time window 426, represented by the first negative pulse in the timeline 410 of localizer A, centered around time $T_4$. The time $T_4$ at which localizer A's reception time window 426 is centered takes into account the approximate round trip propagation time of the radio communications and the time delay $\Delta T_d$. After transmission 424, localizer B then calculates the precise arrival time $T_{2a}$ of the first communication 421 during a processing period 430. In the figures, such processing periods are represented by shaded boxes 430, 431, 443, 453, 463, and 473 along the timelines 410 and 412. After the second reception window 426, localizer A calculates the precise arrival time $T_{4a}$ of the second communication 425 during a processing period 431. After a second prearranged time delay $\Delta T_c$ from the beginning of localizer B's transmission time 424, localizer B sends a set of correction bit communications 441, 451, 461, and 471 during transmission time windows 440, 450, 460, and 470, beginning at times $T_5$, $T_7$, $T_9$ and $T_{11}$, respectively. The correction bit communications 441, 451, 461, and 471 are received by localizer A during reception time windows 442, 452, 462, and 472, centered at times $T_6$, $T_8$, $T_{10}$ and $T_{12}$, and processes during processing periods 443, 453, 463 and 473, respectively. In the preferred embodiment, there may be more or less than four correction bits sent. The correction bits 441, 451, 461, and 471 communicate the difference $\Delta T_e$ between the central time $T_2$ of localizer B's reception time window 422 and the actual arrival time $T_{2a}$ of the first communication signal 421 at localizer B. This provides localizer A with enough information to calculate the separation distance X, i.e., $$2*X=(T_{4a}-T_1-k_B*(\Delta T_d-\Delta T_e))*c.$$

The accuracy of this calculation is superior to that of the first method 200 since in this case the time $T_{4a}-T_1$ between localizer A's first transmission 420 and localizer A's first reception 426 is on the order of tens of microseconds. Therefore, the value to be ascertained, a propagation time on the order of 100 nanoseconds, is only one part in 100 of the time period measured, an improvement of two orders of magnitude from the first method 200. This second method 400 is also inherently more accurate than the first method 200 because the time difference $\Delta T_e$ between the expected arrival time $T_2$ and the actual arrival time $T_{2a}$ of the first communication 421 at localizer B is communicated from localizer B to localizer A and taken into account in every round trip time calculation.

Figure 5:
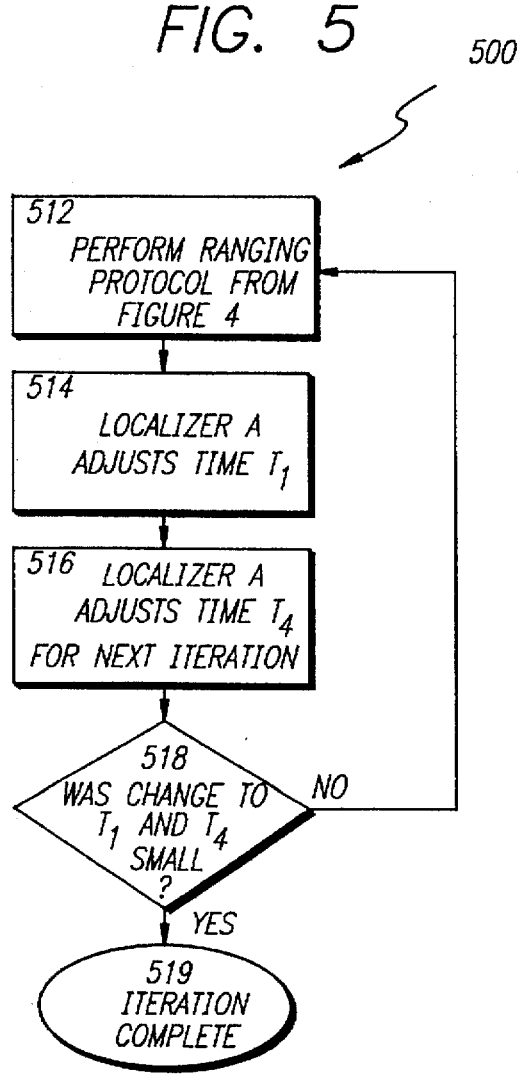
FIG. 5 is a flow chart depicting an iterative ranging method based on the method depicted in FIG. 4.

An iterative modification of the method 400 of FIG. 4 is shown in the flowchart of FIG. 5 where a series of communications between the two localizers provides a converging estimate of the separation X between the two localizers. In a first step 512, the two localizers perform the ranging method 400 of FIG. 4 described above. Localizer A has enough information at the next step 514 to modify the initial transmission time $T_1$ for the next iteration so that the first communication 421 arrives in the center of localizer B's next reception time window 422. Note that localizer B does not have to change the expected arrival time $T_2$; rather, localizer A shifts the transmission time $T_1$ by $\Delta T_e$. In the next step 516 localizer A modifies its reception time $T_4$ so the communication 425 from localizer B arrives in the center of localizer A's reception time window 426. $T_1$ and $T_4$ are modified according to the following formula:

$$T_1'=T_1-k_A*\Delta T_e,$$

$$T_4'=T_{4a}.$$

In the following step 518, localizer A determines if another iteration of the method 400 of FIG. 4 is necessary by checking to see if $T_1$ and $T_4$ were actually changed in the previous steps 514 and 516. If the changes were too large, control is returned to the initial step 512 for another iteration. If the changes were sufficiently small, the iterations are terminated 519. The iterative method 500 of FIG. 5 is superior to that of the iterative method 300 of FIG. 3, since only one of the localizers (localizer A) modifies its transmit and receive times, thereby decreasing the possibility of losing synchronization by one localizer transmitting at a time such that the transmission arrives outside the reception window of the other localizer.

Another iterative modification of the method 400 of FIG. 4 is shown in FIG. 6. In this modification 600 the number of correction bits is drastically decreased, at the cost of requiring a number of iterations of the ranging method 400 of FIG. 4 to provide a final distance estimate. In this case the correction bits 441, 451, etc. are replaced with a single correction bit which alters the polarity of the communication 425 from localizer B to localizer A to indicate whether the transmission 421 from localizer A arrived in the earlier half or the later half of the reception window in the previous round of communications. Since the communication 425 is part of the ranging transaction and must be sent anyway, none of the correction bits 441, 451, etc. are required. As described in detail below, the information in this single-bit return communication 425 allows localizer A to modify the time $T_1$ of its transmission 420 on successive iterations to converge on the correct time using an efficient, logarithmic, binary search technique.

In an initial step 610, a time step variable $\Delta T_x$ is initialized to a value of +20 nanoseconds. This value $\Delta T_x$ is chosen to be no more than one quarter of the width $\Delta T_w$ of the reception window 422. In a first ranging step 612, the two localizers perform the ranging protocol 400 of FIG. 4, without sending correction bits 441, 451, etc. from localizer B to localizer A. In a second ranging step 614, the localizers perform the ranging protocol 400 of FIG. 4, with the second communication 425 being modulated by a correction bit value, i.e., if the correction bit is positive the polarity of the return communication 425 is unaffected, and if the correction bit is negative the polarity of the return communication 425 is inverted. As discussed above, the ranging protocol of FIG. 4 consists of: a first communication 421 transmitted from localizer A during a transmission event 420 beginning at a first transmission time $T_1$ and received by localizer B in a reception window 422 centered at a first reception time $T_2$; a second communication 425 transmitted from localizer B during a transmission event 424 beginning at a second transmission time $T_3$ and received by localizer A in a reception window 426 centered at a second reception time $T_4$; and computation periods 431 and 430 where localizers A and B determine the actual reception times $T_{2a}$ and $T_{4a}$ of the second and first communications 425 and 421, respectively. In the method 400 of FIG. 4 there are also a number of correction bits 441, 451, etc. sent back to localizer A from localizer B representing the difference between the actual arrival time $T_{2a}$ of the first communication 421 and the central time $T_2$ of localizer B's reception window 422. However, in the modification 600 diagrammed in FIG. 6, localizer B calculates only the sign of the correction value, and sends it in communication 425 of the following ranging transaction.

In a first testing step 616 of the method 600, localizer A tests the sign of the correction bit to see if it matches the sign of the step variable $\Delta T_x$. If the signs match, this means the transmission time $T_1$ is to be moved in the direction of the sign of the time step $\Delta T_x$, and control passes to a time incrementation step 624 where the time step $\Delta T_x$ is added to the first transmission time $T_1$. If the signs do not match, control passes to a reverse direction step 618 since the $\Delta T_x$ value is assumed to have just been incremented past the correct first transmission $T_1$ time. In this step 618 the sign of the step variable $\Delta T_x$ is reversed and the step variable $\Delta T_x$ is also divided in half, so as to converge on the correct first transmission time $T_1$ in a binary search fashion. After reversing direction in step 618, a second testing step 620 is performed to see if the absolute value of $\Delta T_x$ is less than the smallest possible change in transmission time $\Delta T_x(min)$. In this case the iterative ranging 600 is complete and the value of the first transmission time $T_1$ is known to within the required accuracy. If the accuracy has reached the desired limit, control passes to a final step 622 where the first transmission time $T_1$ is updated a final time. Localizer A now uses the round trip time $(T_{4a}-T_1-\Delta T_d)$ to calculate the distance to the desired accuracy. If the required accuracy was not reached in the second testing step 620, then control again passes to the time incrementation step 624, and the time step $\Delta T_x$ is added to localizer A's next transmission time $T_1$. This will have the effect of moving the next communication 421 of localizer A so that it lands closer to the middle of localizer B's reception window 422. From this step 624, control passes back to the ranging step 614.

Because the correction bit of the $n^{th}$ communication indicates the offset between the arrival time $T_{2a}$ and the central time $T_2$ of the reception window 422 of the $(n-1)^{th}$ communication and affects the first transmission time T1 of the $(n+1)^{th}$ communication, the ranging protocol 600 will occasionally step too far in one direction before reversing the sign of the time step variable $\Delta T_x$. The time step $\Delta T_x$ is initialized to no more than one quarter of the length of the reception window 422, since then an extra step past the correct location can never result in stepping out of the reception window 422. This effect could be circumvented by looping back from the incrementing step 624 to the first ranging step 612 instead of the second ranging step 614, but this would result in two ranging transactions for every iteration, rather than one.

Figure 7A:
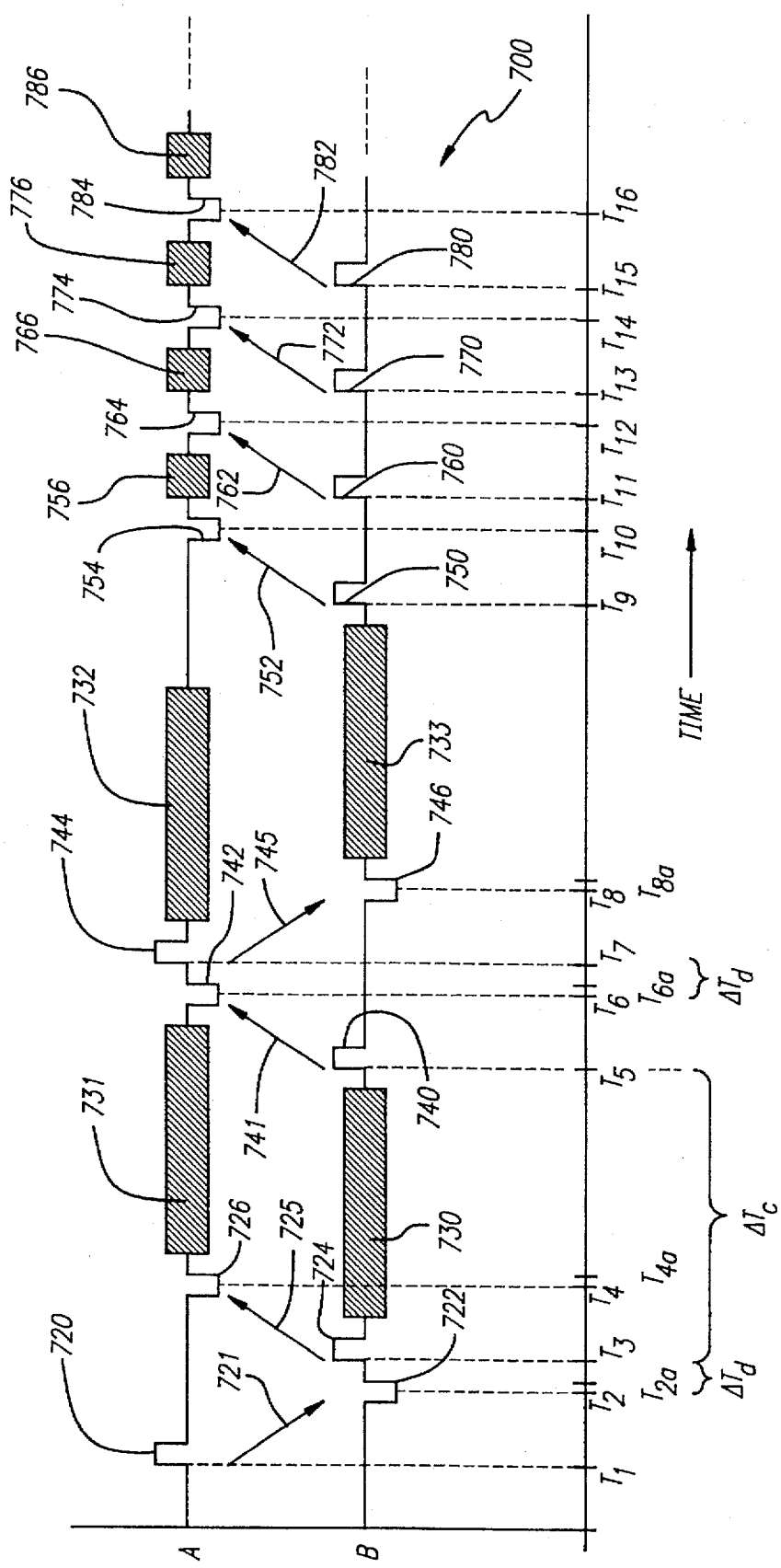
FIG. 7a diagrams a method for cooperative ranging which allows for determination of the separation distance and the ratio of the clock rates of two localizers.

A third ranging method 700, illustrated in FIG. 7a, determines the ratio of the clock rates of the two localizers, as well as the distance between the localizers. Let $k_a$ be the ratio of actual time T to the time as measured by localizer A, and $k_b$ be the ratio of the actual time T to the time as measured by localizer B. In this method 700 localizer A does a first ranging transaction with localizer B, as in the first portion of the second method 400 consisting of the first two communications 421 and 425. Localizer A sends a first communication 721 in a transmission event 720 beginning at prearranged time $T_1$. Localizer B expects the first communication 721 to arrive during a reception time window 722 centered around time $T_2$. Localizer B sends a second communication 725 back to localizer A in a transmission event 724 which begins at a tranmssion time $T_3$ equal to a short delay time $\Delta T_d$ from the center $T_2$ of the reception time window 722. Localizer A arranges to receive the second communication 725 during a reception time window 726 centered around time $T_4$. After transmitting to localizer A, localizer B then determines the precise arrival time $T_{2a}$ of the first communication 721 during a processing period 730. After receiving the second communication 725 localizer A determines the precise arrival time $T_{4a}$ of the second communication 725 during a processing period 731. Then localizers A and B switch roles and do a second ranging transaction as in the first portion of the second method 400, i.e., localizer B sends a third communication 741 in a transmission event 740 beginning at time $T_5$, which is at a prearranged time $\Delta T_c$ after localizer B's previous transmission event 724. Localizer A expects the communication 741 to arrive during a reception time window 742 centered at time $T_6$. Localizer A then sends a fourth communication 745 back to localizer B in a transmission event 744 at a transmission time $T_7$ which begins after a short delay time $\Delta T_d$ from the center $T_6$ of localizer A's recent reception time window 742. Localizer B arranges to receive the communication 745 during a reception time window 746 centered at time $T_8$. After transmitting to localizer B, localizer A then calculates the precise arrival time $T_{6a}$ of the previous communication 741 during a processing period 732. After receiving the communication 745 from localizer A, localizer B calculates the precise arrival time $T_{8a}$ of the communication 745 during a processing period 733. Then, the localizers calculate the following quantities:

| | |
|---|---|
| $R_a = T_{4a} - T_1$ | The round trip time of the first transaction on A's clock. |
| $D_b = T_3 - T_{2a}$ | The turn-around time of the first transaction on B's clock. |
| $R_b = T_{8a} - T_5$ | The round trip time of the second transaction on B's clock. |
| $D_a = T_7 - T_{6a}$ | The turn-around time of the second transaction on A's clock. |

Localizer B then transmits the values of $R_b$ and $D_b$ to localizer A as a series of correction bits according to a prearranged protocol. For ease of display, only four of the correction-bits are shown and labeled in FIG. 7a. The correction bits 752, 762, 772, and 782 are sent in a series of transmission events 750, 760, 770, and 780 at times $T_9$, $T_{11}$, $T_{13}$, and $T_{15}$, respectively. To receive the correction bits 752, 762, 772, and 782, localizer A schedules reception time windows 754, 764, 774, and 784, centered around times $T_{10}$, $T_{12}$, $T_{14}$, and $T_{16}$, and does calculations during computation periods 756, 766, 776, and 786 to detect the values of the bits, respectively. To send the values of $R_b$ and $D_b$, more than four bits may actually need to be sent. Transmission event 750, reception window 754, and calculation 756 comprise the steps necessary to send just one bit starting at time $T_9$.

After receiving all the correction bits 752, 762, 772 and 782, localizer A now has the information necessary to solve two equations for two unknowns, the separation distance X, and the ratio of the clock rates $k_A/k_B$. The two equations are:

$$X = c^*(R_a*k_A - D_b*k_B)/2,$$

and $$X = c^*(R_b*k_B - D_a*k_A)/2,$$

where c is the speed of light. If localizer A assumes that its clock is the correct one, the value of $k_A$ is assumed to be unity, and the only remaining unknowns are $k_B$ and X. Solving for X and $k_B$ provides:

$$X = c^*(R_a*R_b - D_b*D_a)/(2*(R_b + D_b))$$

and $$k_B = (R_a + D_a)/(R_b + D_b).$$

At a later pre-arranged time, localizer A can transmit the values of localizer A's roundtrip and turn-around times $R_a$ and $D_a$ to localizer B so that localizer B can calculate the distance X and relative clock rate $k_A$ of localizer A (assuming $k_B$ to be unity). Alternately, localizer A can transmit the computed distance and the ratio of the clock rates and localizer B would then not have to perform the calculations.

Figure 7B:
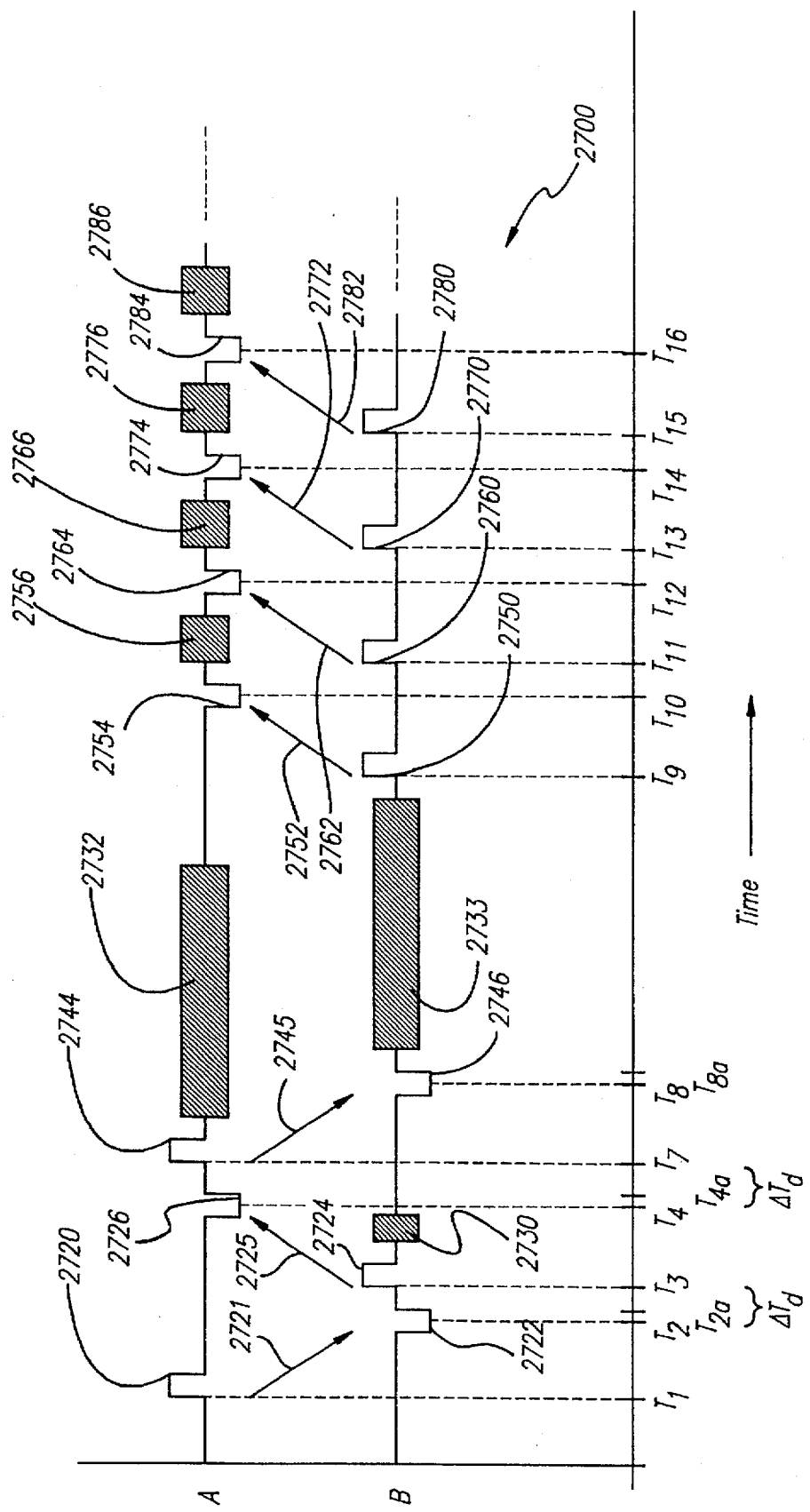

FIG. 7b shows a modification 2700 of the third ranging method 700 illustrated in FIG. 7a, where again the ratio of the clock rates of the two localizers, as well as the distance between the localizers is determined. In this modification 2700 the two sequential communications 725 and 741 transmitted by localizer B are combined into a single communication 2725, the processing periods 731 and 732 of localizer A are combined into a single processing period 2732, and the majority of the time devoted by localizer B to processing is also combined into a single processing period 2733. The localizers A and B still have two round trip communications since the first and second transmission may be considered a first round trip pair and the second and third communications may be considered a second round trip pair. From measurements of the two round trip times the ratio of the clock rates $k_a/k_b$ and the distance X between the localizers A and B can be determined. Since the total elapsed time for the ranging communications of FIG. 7b is reduced in comparison with the method of FIG. 7a, the accuracy of the measurements in improved.

As shown in FIG. 7b, localizer A sends a first communication 2721 in a transmission event 2720 beginning at prearranged time $T_1$. Localizer B expects the first communication 2721 to arrive during a first reception time window 2722 centered around time $T_2$. Localizer B sends a second communication 2725 back to localizer A in a transmission event 2724 which begins at a transmission time $T_3$ equal to a short delay time $\Delta T_d$ from the center $T_2$ of the first reception time window 2722. Localizer A arranges to receive the second communication 2725 during a second reception time window 2726 centered around time $T_4$.

After the first transmission to localizer A, localizer B then prepares to receive a third communication 2745 from localizer A by either A/D converting the values in the correlator bins and storing them in memory, or initializing a second correlator circuit, during a processing period 2730. Localizer A then sends a third communication 2745 to localizer B beginning at a transmission time $T_7$ equal to a short delay time $\Delta T_d$ from the center $T_4$ of the second reception time window 2725. Localizer B arranges to receive the third communication 2745 during a third reception time window 2746 centered around time $T_8$.

After transmitting to localizer B, localizer A then calculates the precise arrival time $T_{4a}$ of the second communication 2725 during a processing period 2732. After receiving the third communication 2745 from localizer A, localizer B calculates the precise arrival times $T_{2a}$ and $T_{8a}$ of both the first and third communications 2721 and 2745 during a processing period 2733. Then, the localizers determine the following quantities:

| | | |
|---|---|---|
| $R_a = T_{4a} - T_1$ | | The round trip time of the first pair of communications on A's clock. |
| $D_b = T3 - T_{2a}$ | | The turn-around time of the first pair of communications on B's clock. |
| $R_b = T_{8a} - T_3$ | | The round trip time of the second pair of communications on B's clock. |
| $D_a = T_7 - T_{4a}$ | | The turn-around time of the second pair of communications on A's clock. |

Localizer B then transmits the values of $R_b$ and $D_b$ to localizer A as a series of correction bits according to a prearranged protocol. For ease of display, only four of the correction-bits are shown and labeled in FIG. 7b. The correction bits 2752, 2762, 2772, and 2782 are sent in a series of transmission events 2750, 2760, 2770, and 2780 at times $T_9$, $T_{11}$, $T_{13}$, and $T_{15}$, respectively. To receive the correction bits 2752, 2762, 2772, and 2782, localizer A schedules reception time windows 2754, 2764, 2774, and 2784, centered around times $T_{10}$, $T_{12}$, $T_{14}$, and $T_{16}$, and does calculations during computation periods 2756, 2766, 2776, and 2786 to determine the values of the bits, respectively. To send the values of $R_b$ and $D_b$, more than four bits may actually need to be sent. Transmission event 2750, reception window 2754, and calculation 2756 comprise the steps necessary to send just one bit starting at time $T_9$.

After receiving all the correction bits 2752, 2762, 2772 and 2782, localizer A now has the information necessary to solve two equations for two unknowns, the separation distance X, and the ratio of the clock rates $k_A/k_B$. As before, $$X = c^*(R_a*R_b - D_b*D_a)/(2*(R_b + D_b))$$

and $$k_B = (R_a + D_a)/(R_b + D_b).$$

At a later pre-arranged time, localizer A can transmit the values of localizer A's roundtrip and turn-around times $R_a$ and $D_a$ to localizer B so that localizer B can calculate the distance X and relative clock rate $k_A$ of localizer A (assuming $k_B$ to be unity). Alternately, localizer A can transmit the computed distance and the ratio of the clock rates and localizer B would then not have to perform the calculations.

Detailed Description of Synchronization Protocols

Before two localizers can begin any of the above ranging algorithms, it is assumed that the pair of localizers are synchronized, i.e., that each localizer has determined a time when it can send a communication that the other localizer will be able to detect, and a time when it can listen and receive a communication from the other localizer. Once synchronized, these transmission and reception times are repeated on a regular or pseudorandom basis. In the process described below, one of the localizers acquires an approximate distance in the process of developing the synchronization. However, it is possible for two localizers to become synchronized, and even to exchange digital information, without either localizer determining the distance to the other localizer.

Figure 8:
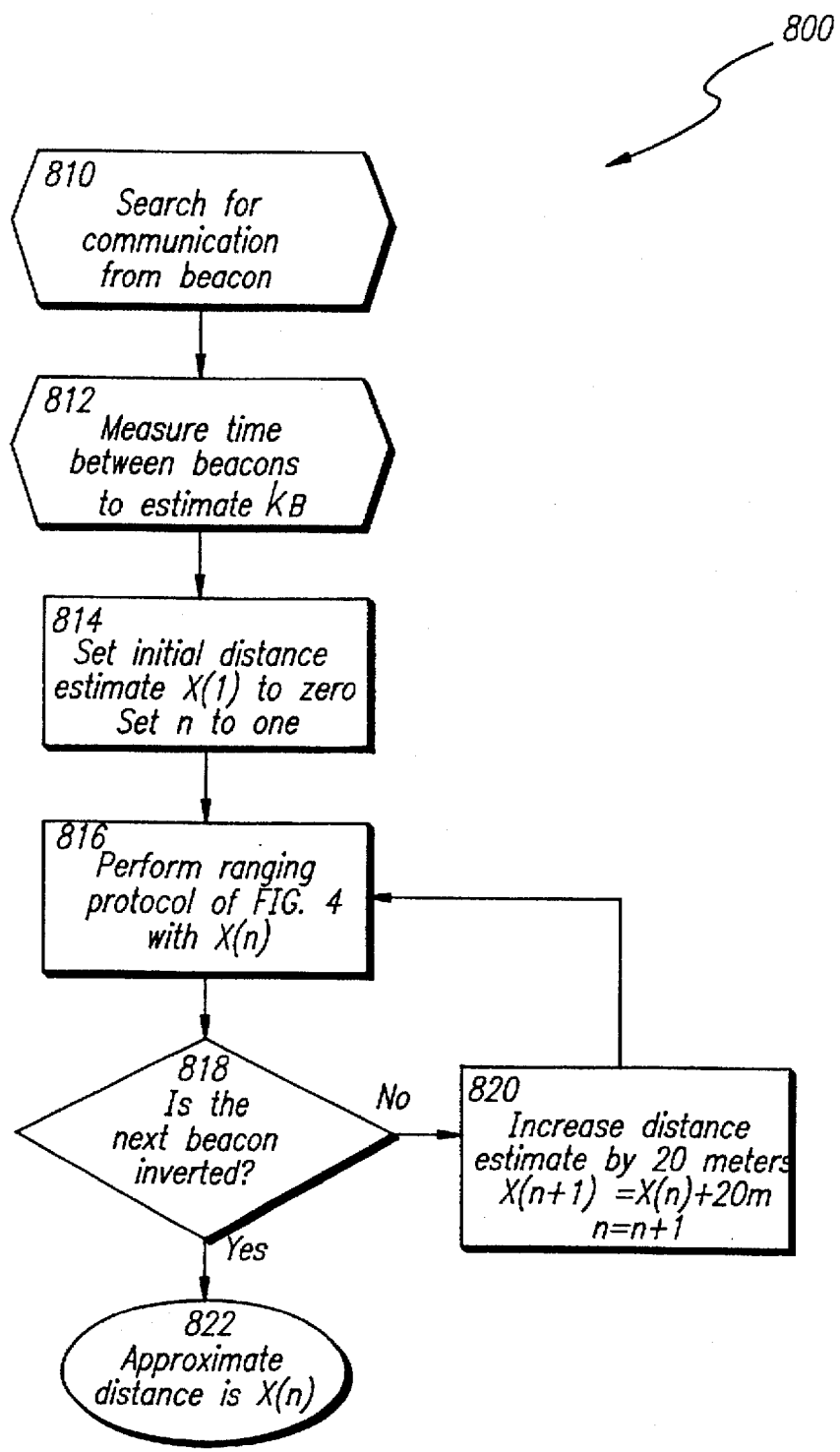
FIG. 8 is a flow chart depicting a method for two localizers to initiate communications.

In a synchronization procedure 800 according to the preferred embodiment shown in FIG. 8, localizer A executes the procedure 800 while localizer B produces a beacon for localizer A to find. This beacon could be a unique communication code produced on a regular or pseudorandom time basis. For the purpose of discussion it will be assumed that the beacon will be regularly broadcast once every millisecond.

In the first step 810 of the synchronization procedure 800, localizer A locates one of these communications. There are a number of algorithms localizer A could use to find the beacon, such as a linear search or a random search of all times (modulo the one millisecond re-broadcast time). If localizer A does a linear search, each of localizer A's reception windows are separated by one millisecond plus a small offset. The offset must be no larger than the width of a reception window in order to guarantee that every time slot is checked, and should be less than the width of a reception window to prevent the beacon escaping noticing by arriving too near the edge of a reception window. Localizer A continues listening at different offsets until a beacon communication is received. With a one millisecond re-broadcast time and a 100 nanosecond reception window, this search takes an average of 5 seconds. It should be noted that if the clocks drift by 100 parts per million, the drift per beacon is on the order of the length of a reception window and a linear search may be unsuccessful. This problem can be reduced by intermixing a forward and backward linear search, or by searching in a pseudorandom pattern.

In the second step 812 of the synchronization algorithm 800, localizer A determines the relative clock rate of localizer B. The ratio of the time measured by localizer A between beacons to the expected one millisecond time generates a first approximation to the clock rate ratio $k_B/k_A$. If the clocks have a constant ratio, this ratio can be determined by measuring the time between a pair of beacons; if the clock rate ratio varies this behavior must be determined by sampling more than two beacons. When localizer A has determined the relative clock rate of localizer B, localizer A can then receive beacons indefinitely.

To complete the synchronization process, localizer A must now determine times at which return transmissions from localizer A will be receivable by localizer B. Localizer B listens for return transmissions a predetermined fixed delay time before or after each beacon transmission. (In this example it will be assumed that localizer B listens for a return transmission a fixed delay time $\Delta T_r$ after the beacon signal.) When a communication is successfully received in one of these reception events, localizer B acknowledges the reception by inverting the polarity of the next beacon transmission a millisecond later. So in the next step 814 of the synchronization procedure 800, localizer A initializes a counting integer n to one and a first estimate $X_1$ of the separation distance to zero, in preparation for an iterative search for a transmission time such that the communication will arrive while localizer B is listening. This first estimate $X_1$ of the separation distance is used in the ranging step 816 to determine the delay between the reception of a beacon at localizer A and a return transmission by localizer A. In particular, the delay is equal to $(\Delta T_r - X_1/c)$. If the distance estimate $X_1$ is close to correct then the return transmission by localizer A will arrive during the reception window of localizer B, and localizer B will invert the polarity of the next beacon to localizer A. (In the preferred embodiment the reception windows are approximately 80 nanoseconds long, and so distance estimates must be correct to within plus or minus approximately ten meters, and the distance estimates are incremented by twenty meters.) If in the testing step 818 localizer A determines that the polarity of the beacon has been inverted, then an approximate separation distance has been determined and the synchronization process is complete 822.

However, if in the testing step 818 localizer A determines that the polarity of the beacon has not been inverted, then in update step 820 the estimated distance $X_n$ of the recently transmitted communication is assumed to be too small, a new estimate $X_{n+1}$ of the separation distance is set equal to the previous estimate $X_n$ plus twenty meters, the counting integer n is incremented by one, and control is returned back to the ranging step 816. Because localizer A alters its distance estimates $X_n$ in twenty meter increments, it will rapidly find the correct distance in a small number of attempts since the range of the localizers is on the order of one thousand meters. Finally, when the distance estimate $X_n$ is correct to within plus or minus ten meters, the inverted beacon is received by localizer A and control passes to the final step 822 where the distance estimate $X_n$ is saved for future ranging transactions. Once the two localizers A and B are in synchronization, they may wish to exchange digital information or perform ranging transactions as described in FIGS. 4 through 7 to determine their separation distance to greater accuracy.

The synchronization procedure of FIG. 8 allows localizer A to calculate initial approximations to the distance and relative clock rate of localizer B. In an alternate method, localizer A transmits a return communication at a fixed time after receiving the beacon, and localizer B searches for localizer A's return communication. Although synchronization using this method takes longer than in the method previously described, this allows localizer B to determine the approximate separation distance, while localizer A can only determine the relative clock ratio. In another alternate method, the fixed delays used by localizers A and B would be unknown to the other localizer, and the approximate distance $X_n$ would be incorrect. But this technique allows the two localizers to get into synchronization without divulging their relative locations.

Detailed Description of Protocols which Permit Privacy

There are several techniques a first localizer can use to find its distance from a second localizer without giving such information away. This ability may be required in situations where divulging the precise location of a localizer would be considered an invasion of privacy. It may also be required in, for example, a military situation where giving away a localizer's precise location would be dangerous. In the methods 200 and 400 transactions described in FIGS. 2 and 4, localizer A determines its distance from localizer B without giving any information away. Unfortunately these methods 200 and 400 are not as accurate as the method 700 diagrammed in FIG. 7a, since in that method 700 both the distance and the ratio of the clock rates $k_A/k_B$ are determined. The method 900 diagrammed in FIG. 9 is a modification of the method 700 described by FIG. 7a which provides localizer A with accurate distance information, but gives localizer B an erroneous or obviously wrong distance.

Figure 9:
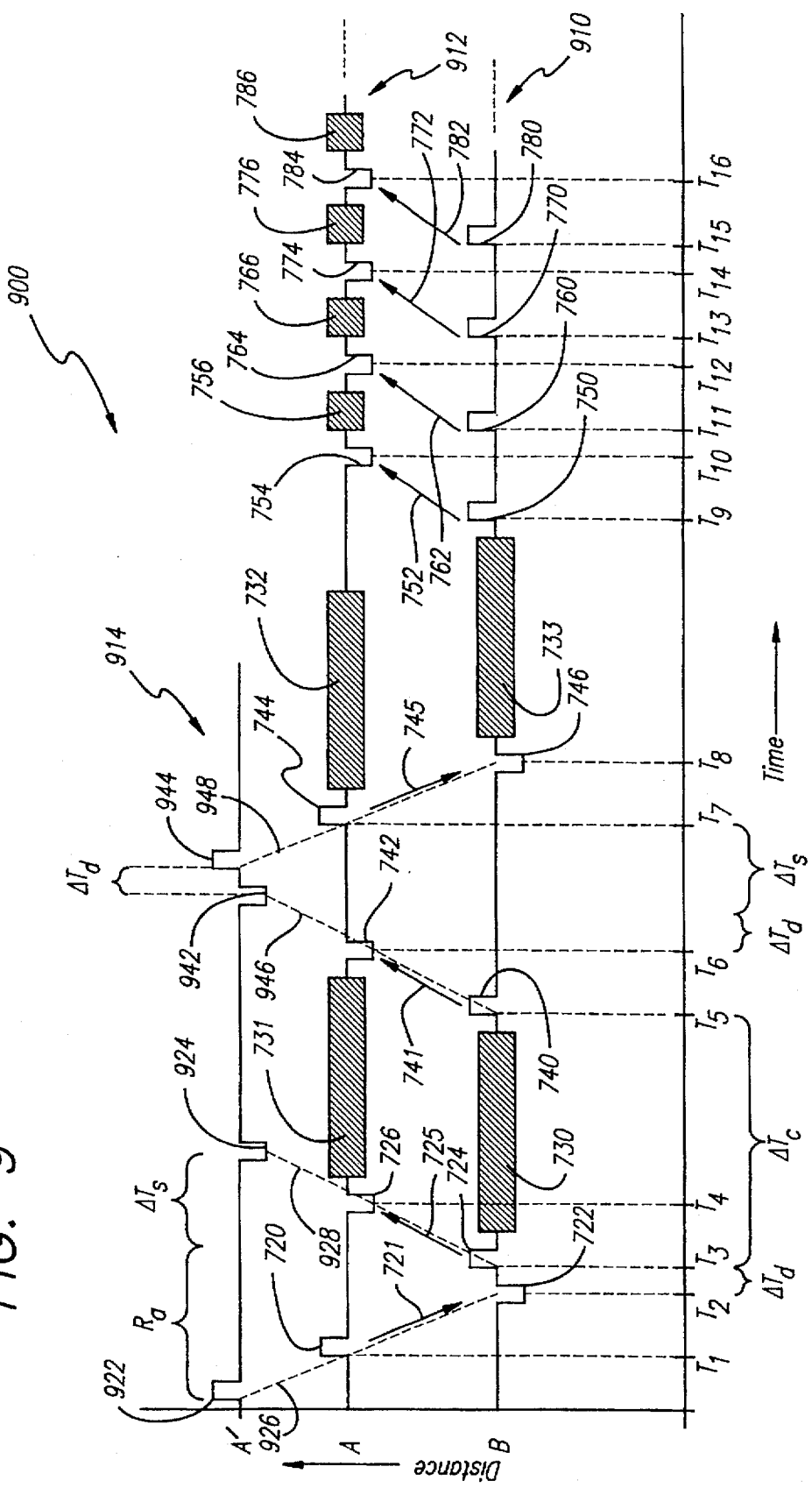
FIG. 9 diagrams a method for cooperative ranging communications where one localizer provides false information about its location.

This ranging method 900 is similar to the ranging protocol 700 diagrammed described in FIG. 7a, but in the method 900 diagrammed in FIG. 9 a spoofing delay $\Delta T_s$ is chosen by localizer A to give the appearance that it is farther away or closer to localizer B than it actually is. Localizer A may choose the values of the spoofing delay $\Delta T_s$ randomly to cause its position to appear in random positions over a large area. Or, localizer A can choose the spoofing delay $\Delta T_s$ to give a fixed, but incorrect, location. If the spoofing delays $\Delta T_s$ are randomly chosen then it will be obvious that localizer A is hiding its location. If the spoofing delays $\Delta T_s$ are chosen to give a fixed but incorrect location, a different spoofing delay $\Delta T_s$ would have to be chosen and used for each localizer that localizer A is in communication with, and the network of surrounding localizers will not know that it does not have the correct location of localizer A.

In the protocol shown in FIG. 9, events occurring at localizer B are shown on the bottom time line 910, events occurring at localizer A are shown on the middle timeline 912, and the events at localizer A as they are made to appear to localizer B are shown on the top timeline 914. As shown in FIG. 9, in this method 900 localizer A sends a first communication 721 during a transmission event 720 beginning at prearranged time $T_1$. Localizer B expects the first communication 721 to arrive during a reception time window 722 centered around time $T_2$. Localizer B sends a second communication 725 back to localizer A in a transmission event 724 which begins at a transmission time $T_3$ equal to a short delay time $\Delta T_d$ from the center $T_2$ of the reception time window 722. Localizer A arranges to receive the second communication 725 during a reception time window 726 centered around time $T_4$. After transmitting to localizer A, localizer B then calculates the precise arrival time $T_{2a}$ of the first communication 721 during a processing period 730. After receiving the second communication 725 localizer A calculates the precise arrival time $T_{4a}$ of the second communication 725 during a processing period 731.

Then localizers A and B switch roles and do a second ranging transaction. Localizer B sends a third communication 741 during a transmission event 740 beginning at time $T_5$, which is at a prearranged time $\Delta T_c$ after localizer B's previous transmission event 724. Localizer A expects the communication 741 to arrive during a reception time window 742 centered around time $T_6$. Localizer A then sends a fourth communication 745 back to localizer B in a transmission event 744 which begins at a transmission time $T_7$ equal to the short delay time $\Delta T_d$ plus the spoofing delay $\Delta T_s$ from the center $T_6$ of localizer A's recent reception time window 742. Localizer B arranges to receive the communication 745 during a reception time window 746 centered around time $T_8$. After transmitting to localizer B, localizer A then calculates the precise arrival time $T_{6a}$ of the previous communication 741 during a processing period 732. After receiving the communication 745 from localizer A, localizer B calculates the precise arrival time $T_{8a}$ of the communication 745 during a processing period 733.

Dashed lines 946 and 948 show how the reception and transmission windows 742 and 744 appear as reception and transmission windows 942 and 944 to localizer B since localizer B expects localizer A to only wait a delay time $\Delta T_d$ after the center of its reception window 942 to begin the transmission 944. Therefore, localizer B also expects that the initial transmission 720 occurred as an earlier transmission 922, and that localizer A received the second communication 725 at a reception event 924 which occurred later than the actual reception event 726. Next, the localizers calculate the following quantities:

| | |
|---|---|
| $R_a = T_{4a} - T_1$ | The round trip time of the first pair of communications on A's clock. |
| $D_b = T_3 - T_{2a}$ | The turn-around time of the first pair of communications on B's clock. |
| $R_b = T_{8a} - T_5$ | The round trip time of the second pair of communications on B's clock. |
| $D_a = T_7 - T_{6a}$ | The turn-around time of the second transaction on A's clock. |

Localizer B then transmits the values of $R_b$ and $D_b$ to localizer A as a series of correction bits 752, 762, 772, and 782 in transmission events 750, 760, 770, and 780 at transmission times $T_9$, $T_{11}$, $T_{13}$, and $T_{15}$, respectively, according to a prearranged protocol. For ease of display, only four correction-bit communications are shown and labeled in FIG. 9. To send the values of $R_b$ and $D_b$, more than four bits may actually need to be sent. To receive the communications 752, 762, 772, and 782, localizer A schedules reception time windows 754, 764, 774, and 784, centered around times $T_{10}$, $T_{12}$, $T_{14}$, and $T_{16}$, and does calculations during computation periods 756, 766, 776, and 786 to detect the values of the bits, respectively.

After receiving all the correction bits 752, 762, 772, and 782, localizer A now has the information necessary to solve two equations for two unknowns, the separation distance X and the ratio of the clock rates $k_A/k_B$. The two equations are:

$$X = c^*(R_a^* k_A - D_b^* k_B)/2,$$

and $$X = c^*(R_b^* k_B - D_a^* k_A)/2,$$

where c is the speed of light. If localizer A assumes that its clock rate is correct, the value of $k_A$ is unity, and the only remaining unknowns are $k_B$ and X. Solving for X provides:

$$X = c^*(R_a^* R_b - D_b^* D_a)/(2^*(R_b + D_b));$$

and solving for $k_B$ provides:

$$k_B = (D_a + R_a)/(D_b + R_b).$$

Localizer A now has an accurate measure of the distance to localizer B, while localizer B has an incorrect value equal to $X + (\Delta T_s/c)$. If localizer A communicates round trip and turn-around times $R_a$ and $D_a$ to localizer B, localizer A must correct the values to be consistent with the spoofing delay $\Delta T_s$ it used. Although localizer B uses $R_a$ and $D_a$ to calculate an incorrect X value, when localizer B calculates the value of $k_A$, it gets the accurate result:

$$X = c^*(R_a^* R_b - D_b^* D_a)/(2^*(R_b + D_b));$$

and solving for kB provides:

$$k_A = (D_b + R_b)/(D_a + R_a).$$

Dashed line 926 shows how adding $\Delta T_s$ to $R_a$ makes the time and distance of transmission event 720 appear in the position shown by transmission event 922. Similarly, dotted line 928 shows how adding $\Delta T_s$ to $R_a$ makes the time and distance of reception window 726 appear in the position shown by reception window 924.

Although localizer A can use a different random spoofing delay $\Delta T_s$ value with every localizer it communicates with, once communication is initiated, the value of the spoofing delay $\Delta T_s$ cannot change by more than about 40 nanoseconds between communications to the same localizer. This is because the reception window 746 is only about 80 nanoseconds wide. If the $\Delta T_s$ value caused communication 745 to miss reception window 746, the localizers would loose contact with each other, and have to re-synchronize.

Detailed Description of Spectra of Nonsinusoidal Transmissions

In contrast with sinusoidal-carrier spread spectrum techniques, the transceivers of the present invention generate transmissions whose spectra cover a broad range of frequencies by transmitting sequences of short impulses. In general, the width of the Fourier spectrum of the impulse sequence is inversely proportional to the width of the individual impulses in an impulse sequence.

Consider a single Gaussian impulse G(t), as is shown in FIG. 10a.1, described by the equation $G(t) = G_0 \exp[-4\pi((t-t_m)/d)^2]$.

For simplicity, we will set the amplitude $G_0$ to one. Then, the Fourier transform of the impulse $G(t)$ is $$\begin{aligned}F[G] &= \int \exp[-4\pi((t-t_m)/d)^2] * \exp[i\omega t] dt\\ &= \exp[-\omega^2 d^2/16\pi] * \exp[i\omega t_m] *\\ &\quad \int \exp[-(4\pi/d^2)\{t-(i\omega d^2/8\pi)\}^2] dt\\ &\propto \exp[-\omega^2 d^2/16\pi] * \exp[i\omega t_m],\end{aligned}$$

and the magnitude of F[G] is $\exp[-\omega^2 d^2/16\pi]$. Therefore, as shown in FIG. 10a.2, the $1/e^\pi$ width, d, of the Gaussian impulse G(t) is inversely proportional to the $1/e^\pi$ width $\omega=4\pi/d$ (f=2/d) of the Frourier spectrum F[G] of the impulse.

The shape of the Fourier spectrum of a transmitted code sequence $\Phi_e(t)$ can be manipulated by controlling the placement of the impulses in the chips $\gamma_e(t)$. In particular, the location of zeroes in the magnitude of the spectrum can be controlled so that localizer transmissions provide a minimum of noise in particular frequency bands. For instance, it is desirable to minimize the interference provided by localizers to the commercial AM and FM radio frequency bands at 0.525–1.7 MHz and 88–108 MHz, respectively.

The chip function $\gamma_e(t)$ of the preferred embodiment is a doublet function consisting of a positive impulse G(t) and a delayed negative impulse $-G(t-t_0)$, where $t_0$ is the delay time, as shown in FIG. 10b.1. The Fourier transform of the chip function is $$\begin{aligned}F[\gamma_e] &= F[G(t)] - F[G(t-t_0)]\\ &= \int \exp[-4\pi(t/d)^2] * \exp[i\omega t] dt -\\ &\quad \int \exp[-4\pi(t-t_0/d)^2] * \exp[i\omega t] dt\\ &\propto \exp[-\omega^2 d^2/16\pi] * \{1-\exp(i\omega t_0)\}.\end{aligned}$$

As shown in FIG. 10b.2, the magnitude of the Fourier transform, $|F[\gamma_e]|$, has an envelope equal to the Fourier transform of a single impulse F[G], and has zeroes at multiples of $\omega=2\pi/t_0$ (f=1/$t_0$). The zeroes in the spectrum include one at zero frequency (DC) since the integral of the pair of impulses is zero. If the spacing between the impulses is reduced to $t_1$ as shown in FIG. 10e.1, then the distance between zeros in the magnitude of the Fourier spectrum is increased to $\omega=2\pi/t_1$ (f=1/$t_1$) as shown in FIG. 10e.2.

The simplest transmitted impulse sequence $\Phi_e(t)$ larger than a single chip $\gamma_e(t)$ is a pair of chips. As shown in FIG. 10c.1, one possibility for a pair of chips is a positive polarity chip $\gamma_e(t)$ followed by a negative polarity chip delayed by the time length $\delta t$ of a chip, i.e., $-\gamma_e(t-\delta t)$. The Fourier transform of this pair of chips is $$\begin{aligned}F[\gamma_e(t)-\gamma_e(t-\delta t)] &= F[\gamma_e(t)] - F[\gamma_e(t-\delta t)]]\\ &\propto \exp[-\omega^2 d^2/16\pi] * \{1-\exp(i\omega t_0)\} *\\ &\quad \{1-\exp(i\omega\delta t)\}.\end{aligned}$$

The magnitude of the spectrum F is equal to the product of the magnitudes of the factors $\exp[-\omega^2 d^2/16\pi]$, $\{1-\exp(i\omega t_0)\}$, and $\{1-\exp(i\omega\delta t)\}$. Therefore, the magnitude of a spectrum of the pair of chips is equal to the magnitude of the spectrum of a single chip $\gamma_e(t)$ modulated by the factor $|\{1-\exp(i\omega\delta t)\}|$. As shown in FIG. 10c.2, the magnitude of the spectrum of the pair of chips has an envelope equal to that of a single impulse G(t), zeroes at multiples of $\omega=2\pi/t_0$ (f=1/$t_0$), and zeroes at multiples of $\omega=2\pi/\delta t$ (f=1/$\delta t$).

In general, a transmitted impulse sequence $\Phi_e(t)$ consists of a string of L chips with polarities determined by a pseudorandom (or some other type of) code sequence $\sigma(i)$ as shown in FIG. 10d.1, i.e., $\Phi_e(t) = \gamma_e(t \bmod \delta t) * \sigma[t/\delta t]$, or equivalently, $\Phi_e(t) = \sum_{0 \leq j \leq L} \gamma_e(t-j\delta t) * \sigma(j)$, where the square brackets around the argument of the pseudorandom code sequence $\sigma$ indicates the largest integer less than or equal to the argument. Assuming that $\delta t = 2t_0$, the Fourier transform of the transmitted impulse sequence $\Phi_e(t)$ is then given by $$\begin{aligned}F[\Phi_e(t)] &= \sum_{0 \leq j \leq L} F[\gamma_e(t-j\delta t)] * \sigma(j)\\ &\propto \exp[-\omega^2 d^2/16\pi] * \{1-\exp(i\omega t_0)\} *\\ &\quad \left\{\sum_{0 \leq j \leq L} \sigma(j)\exp(i\omega j\delta t)\right\}.\end{aligned}$$

Therefore, the amplitude of the spectrum for an impulse sequence $\Phi_e$ is equal to the amplitude of the spectrum for a single chip $\gamma_e$, as shown in FIG. 10b.2, modulated by the function $|\Sigma\sigma(j)*\exp(i\omega j\delta t)|$, as shown in FIG. 10d.2. Although the modulation by $|\Sigma\sigma(j)*\exp(i\omega j\delta t)|$ provides additional structure to the spectrum, the spectrum still has zeroes at multiples of $\omega=2\pi/t_0$ (f=1/$t_0$). As mentioned above, the envelope of the spectrum of the impulse sequence $\Phi_e$ is equal to the spectrum of a single impulse G(t), so narrow impulses create an impulse sequence spectrum which is "spread."

Similarly, if the transmitted impulse sequence $\Phi_e(t)$ consists of a string of chips with impulses separated by $t_1$, as shown in FIG. 10f.1, then the Fourier spectrum is proportional to $\exp[-\omega^2 d^2/16\pi] * \{1-\exp(i\omega t_1)\} * \left\{\sum_{0 \leq j \leq L} \sigma(j)\exp(i\omega j\delta t)\right\}$.

Therefore, the amplitude of the spectrum for an impulse sequence $\Phi_e$ is equal to the amplitude of the spectrum for a single chip $\gamma_e$, as shown in FIG. 10e.2, again modulated by the function $|\Sigma\sigma(j)*\exp(i\omega j\delta t)|$, as shown in FIG. 10f.2. Although the modulation by $|\Sigma\sigma(j)*\exp(i\omega j\delta t)|$ provides additional structure to the spectrum, the spectrum still has zeroes at multiples of $\omega=2\pi/t_1$ (f=1/$t_1$) and an envelope equal to the spectrum of a single impulse G(t).

Detailed Description of the Discrete-Time Pseudo-Autocorrelation Function

FIG. 11 is a graphical illustration of the discrete-time pseudo-autocorrelation (DTPAC) function of an internally-generated integration sequence $\Phi_i(t)$ and a received impulse sequence $\Phi_e(t)$. For ease of discussion and display, the impulse sequences $\Phi_i(t)$ and $\Phi_e(t)$ each consist of two doublets and the DTPAC function has seventeen bins. As shown in the top left-hand graph of FIG. 11, from left to right the internally-generated integration sequence $\Phi_i(t)$ consists of a first positive rectangular impulse 1014, followed immediately by two negative rectangular impulses 1012 and 1016, following finally by a second positive rectangular impulse 1018. The rectangular impulses 1012, 1014, 1016 and 1018 each have the same shape, i.e., the same width and magnitude. For convenience it will be assumed in the following discussion of FIG. 11 and FIGS. 11-0 through 11-16 that the absolute value of the magnitude of the impulses 1014, 1012, 1016 and 1018 is unity. The internally-generated integration sequence $\Phi_i(t)$ may be viewed as a pair of doublets—the first doublet 1013 consisting of the first positive and negative impulses 1014 and 1012, and the second doublet 1017 consisting of the second negative and positive impulses 1016 and 1018. The second doublet 1017 has a polarity opposite that of the first doublet 1013, i.e., $\sigma_i(1)=+1$ and $\sigma_i(2)=-1$.

Similarly, as shown in the lower left-hand graph of FIG. 11, from left to right the received signal $\Phi_e(t)$ consists of four equally spaced Gaussian impulses: a first positive Gaussian impulse 1024, followed by two negative Gaussian impulses 1022 and 1026, following finally by a second positive Gaussian impulse 1028. The received signal impulses 1022, 1024, 1026 and 1028 each have the same shape, i.e., the same width and magnitude. The received impulse sequence $\Phi_e(t)$ may also be viewed as a pair of doublets, the first doublet 1023 consisting of the first positive and negative impulses 1024 and 1022, and the second doublet 1027 consisting of the second negative and positive impulses 1026 and 1028. The second doublet 1027 has a polarity opposite the first doublet 1023, i.e., $\sigma_r(1)=+1$ and $\sigma_r(2)=-1$. For convenience it will be assumed in the following discussion of FIG. 11 and FIGS. 11-0 through 11-16 that the absolute value of the area under each of the impulses 1024, 1022, 1026 and 1028 is unity.

As discussed above (and in detail below), the internally-generated integration sequence $\Phi_i(t)$ is delayed by a chain of flip-flops 1460 in the time-integrating correlator 114 to provided a time-delayed integration sequence $\Phi_i^{(n)}(t)$ to the $n^{th}$ integrator 1430. The received signal $\Phi_e(t)$ is not delayed. The $n^{th}$ bin value of the DTPAC function $\Lambda(n)$ shown in the top right graph of FIG. 11 is equal to the integral of the product of received signal $\Phi_e(t)$ and the $n^{th}$ time-delayed integration sequence $\Phi_i^{(n)}(t)$. The zeroth bin (n=0) value of the DTPAC function, $\Lambda(o)$, is shown as zero, and corresponds to the product of a delayed internally-generated integration sequence $\Phi_i(t)$ and a received signal $\Phi_e(t)$ where there is no overlap of nonzero portions of the signals $\Phi_i(t)$ and $\Phi_e(t)$, as shown in FIG. 11-0. The n=1 bin of the DTPAC function, $\Lambda(1)$, has a small positive value and corresponds to the product of the delayed internally-generated integration sequence $\Phi_i^{(1)}(t)$ and the received signal $\Phi_e(t)$ where there is a partial overlap of the last positive impulse 1018 of the delayed integration sequence $\Phi_i^{(1)}(t)$ and the first positive impulse 1024 of the received signal $\Phi_e(t)$, as shown in FIG. 11-1. Similarly, the n=2 bin of the DTPAC function, $\Lambda(2)$, has a positive value of unity since it is equal to the product of a delayed integration sequence $\Phi_i^{(2)}(t)$ and the received signal $\Phi_e(t)$ where there is a complete overlap of the last positive impulse 1018 of the delayed integration sequence $\Phi_i^{(2)}(t)$ and the first positive impulse 1024 of the received signal $\Phi_e(t)$, as shown in FIG. 11-2. The DTPAC function $\Lambda$ changes sign in the n=3 bin, since it is equal to the product of the delayed integration sequence $\Phi_i^{(3)}(t)$ and the received signal $\Phi_e(t)$ where there is a partial overlap of the last positive impulse 1018 of the delayed integration sequence $\Phi_i^{(3)}(t)$ with the first negative impulse 1022 of the received signal $\Phi_e(t)$, and the first positive impulse 1024 of the received signal $\Phi_e(t)$ overlaps equally with both the last positive impulse 1018 and the last negative impulse 1016 of the delayed integration sequence $\Phi_i^{(3)}(t)$, as shown in FIG. 11-3.

The DTPAC function $\Lambda(n)$ again changes sign between the sixth and seventh bins and reaches a maximum value of four in the eighth bin. In the eighth bin the value of the DTPAC function $\Lambda(8)$ corresponds to the product of the delayed integration sequence $\Phi_i^{(8)}(t)$ and the received signal $\Phi_e(t)$ where both positive impulses 1014 and 1018 of the delayed integration sequence $\Phi_i^{(8)}(t)$ overlap completely with both positive impulses 1024 and 1028 of the received signal $\Phi_e(t)$, and both negative impulses 1012 and 1016 of the delayed integration sequence $\Phi_i(t)$ overlap completely with both negative impulses 1022 and 1026 of the received signal $\Phi_e(t)$, as shown in FIG. 11-8. When the received signal $\Phi_e(t)$ and the integration sequence $\Phi_i(t)$ are based on the same pseudorandom code sequence $\sigma(i)$, as is the case in FIG. 11, then the maximum value of the DTPAC function $\Lambda$ is equal to the number of impulses in the signals (again assuming that the absolute values of the magnitude of the impulses in the integration sequence $\Phi_i(t)$ and the area of the impulses in the received signal $\Phi_e(t)$ are equal to unity). As discussed in the Overview, the pseudo-autocorrelation function $\Lambda(t)$ is symmetric about the maximum value when the received signal $\Phi_e(t)$ and the integration sequence $\Phi_i(t)$ are based on the same pseudorandom code sequence $\sigma(i)$. Therefore, if the central bin of the DTPAC function $\Lambda(n)$ is perfectly centered to coincide with the maximum of the pseudo-autocorrellation function $\Lambda(t)$, as appears to be the case in the top right-hand graph of FIG. 11, then the DTPAC function $\Lambda(n)$ is symmetric about the central bin (n=8). In general, for longer code sequences the DTPAC function $\Lambda(n)$ will exhibit characteristics similar to the DTPAC function $\Lambda(n)$ of FIG. 11. For instance, all DTPAC functions $\Lambda(n)$ have a central maximum value, and oscillate in sign and decay to zero away from the maximum.

FIGS. 12-1 through 12-5 and 13-1 through 13-5 illustrate the sensitivity of the DTPAC function $\Lambda(n)$ to small shifts in the bins relative to the received signal $\Phi_e(t)$, when the time spacing between bins is of the order of one quarter of the chip length $\delta t$, i.e., half the width of central peak of the pseudo-autocorrelation function. (As mentioned in the Overview, although the DTPAC function $\Lambda(n)$ resembles a time sampling of the pseudo-autocorrelation function $\Lambda(t)$, the pseudo-autocorrelation function $\Lambda(t)$ is actually never produced by the circuitry and so it therefore cannot be sampled. However, some insight is provided by viewing the DTPAC function $\Lambda(n)$ as equivalent to a sampling of the pseudo-autocorrelation function $\Lambda(t)$ in the discussion that follows.) The left-hand graph 1100 of FIG. 12-1 shows a simple pseudo-autocorrelation function $\Lambda(t)$ (in general, a pseudo-autocorrelation function will have other minima and maxima, though there will always be a large central peak) and a series of equally spaced bin times 1101, 1102, . . . 1109, represented as sharp impulses, separated by 2.5 nanoseconds. The pseudo-autocorrelation function $\Lambda(t)$ has a central positive peak 2198 with surrounding negative peaks 2197 and 2196 of a smaller magnitude. In the left-hand graph 1100 of FIG. 12-1 the central bin 1105 is centered in the central peak 2198—this is termed a 0-phase delay.

The sampling by the central bin 1105 of the center of the central peak 2198 of the pseudo-autocorrelation function $\Lambda(t)$ provides a large positive value 1115 in the DTPAC function $\Lambda(n)$ 2110 shown in the right-hand graph 1110 of FIG. 12-1. The samplings by the bins 1104 and 1106 surrounding the central bin 1105 at times of −2.5 nanoseconds and +2.5 nanoseconds where the pseudo-autocorrelation function $\Lambda(t)$ has small positive values (and large positive and negative derivatives), provides small positive values of the DTPAC function $\Lambda(n)$ 2110 in the bins 1114 and 1116 on both sides of the central bin 1115. The samplings by the bins 1103 and 1107 at times of −5.0 nanoseconds and +5.0 nanoseconds well-centered in the negative peaks 2196 and 2197 of the pseudo-autocorrelation function A(t), respectively, provides negative values of the DTPAC function 2110 in the bins 1113 and 1117. Similarly, the other time bins 1101, 1102, 1108 and 1109 sample the pseudo-autocorrelation function A(t) at time positions farther from the central peak 2198 and provide bin values 1111, 1112, 1118 and 1119 corresponding to the values of the pseudo-autocorrelation function A(t).

The left-hand graph 1120 in FIG. 12-2 shows the pseudo-autocorrelation function A(t), and the bins 1121 through 1128 shifted by 0.5 nanoseconds from the positions of the bins 1101 through 1109 shown in the preceding left-hand graph 1100. Because the spacing between bins is 2.5 nanoseconds, this is termed a $\frac{1}{5}$-phase delay. The position of the central bin 1125 is offset by 0.5 nanoseconds from the center of the central peak 2198 of the pseudo-autocorrelation function A(t). However, since the central peak 2198 is substantially flat at the top, the central value 1135 of the DTPAC function A(n) 2130 in the second right-hand graph is approximately the same as the central value 1115 of the DTPAC function A(n) 1115 when the central bin 1105 is exactly centered in the central peak 2198. The bin 1126 immediately to the right of the central bin 1125 is now located in the right-hand negative peak 2197, to the right of the zero-crossing of the pseudo-autocorrelation function A(t). Therefore, as shown in FIG. 12-2 the value of the DTPAC function A(n) 2130 in the bin 1136 immediately to the right of the central bin 1135 is now negative. Furthermore, the bin 1124 immediately to the left of the central bin 1125 is now located well within the central peak 2198 of the pseudo-autocorrelation function A(t). Therefore, the value of the DTPAC function A(n) 2130 in the bin 1134 immediately to the left of the central bin 1135 is now large and positive. A comparison of the DTPAC function A(n) 2130 of graph 1130 of FIG. 12-2 and the DTPAC function A(n) 2110 from graph 1110 of FIG. 12-1 shows that a substantial change in the shape of the functions occurs. In general, when the time between bins $\Delta t$ is on the order of one-quarter of a chip length $\delta t$ the values of the DTPAC function in bins of a first parity (e.g., odd bins) change significantly while the values of the DTPAC function in bins of a second parity (e.g., even bins) remain relatively stable for small time shifts from when a bin is centered at the peak of the pseudo-autocorrelation function. Thus, the even bins describe the stable shape of the DTPAC function, while the sensitivity of the odd bins can be used to determine slight changes in the arrival time. Because the even bins are relatively stable, they can be used to calculate the gain of the input amplifier 105.

Similarly, the subsequent graphs 1140, 1160, and 1180 of FIGS. 12-3, 12-4, and 12-5 show $\frac{2}{5}$-, $\frac{3}{5}$-, and $\frac{4}{5}$-phase delays, i.e., the bins are shifted by 1.0 nanoseconds, 1.5 nanoseconds and 2.0 nanoseconds from the case shown in graph 1100 of FIG. 12-1 where the central bin 1105 is centered in the central peak 2198 of the pseudo-autocorrelation function A(t) respectively. Because the pseudo-autocorrelation function A(t) is evenly symmetric and the bins are uniformly spaced, the DTPAC function A(n) 2130 of FIG. 12-2 for a $\frac{1}{5}$-phase delay is equal to the time-reversed DTPAC function A(n) 2190 of FIG. 12-5 for a $\frac{4}{5}$-phase delay. Similarly, the DTPAC A(n) function 2150 of FIG. 12-5 for a $\frac{2}{5}$-phase delay is equal to the time-reversed DTPAC function A(n) 2170 of FIG. 12-4 for a $\frac{3}{5}$-phase delay. In general, if a pseudo-autocorrelation function A(t) is evenly symmetric and the bins are uniformly spaced, then the DTPAC function A(n) for a $\theta$-phase delay is equal to the time-reversed DTPAC function A(n) for a (1-$\theta$)-phase delay.

FIGS. 13-1 through 13-5 illustrate that the central region of the DTPAC function A(n) near the 0-phase delay is highly sensitive to small shifts in the locations of the bins since the bins 1104 and 1106 surrounding the central bin 1105 are located where the pseudo-autocorrelation function A(t) has small values and large magnitude derivatives. For clarity, graphs 1100 and 1110 from FIG. 12-1 are reproduced in FIG. 13-1. The left-hand graph 1220 of FIG. 13-2 shows the pseudo-autocorrelation function A(t) with the bins 1221 through 1228 shifted by 0.1 nanoseconds from the positions of the bins 1101 through 1109 shown in the left-hand graph 1100 of FIG. 13-1. Because the spacing between bins is 2.5 nanoseconds, this is a $\frac{1}{25}$-phase delay. The position of the central bin 1225 is offset by 0.1 nanoseconds from the center of the central peak 2198 of the pseudo-autocorrelation function A(t). However, since the central peak 2198 is substantially flat at the top, the central value 1235 of the DTPAC function A(n) 2230 of FIG. 13-2 is approximately the same as the central value 1115 of the DTPAC function A(n) 2110 of FIG. 13-1, where the central bin 1105 is exactly centered in the central peak 2198. Also, the bin 1226 immediately to the right of the central bin 1225 in FIG. 13-2 is now located where the central peak 2198 has a small positive value. Therefore, the value of the DTPAC function A(n) 2230 of FIG. 13-2 in the bin 1236 immediately to the right of the central bin 1235 is smaller than in FIG. 13-1. Furthermore, the bin 1224 immediately to the left of the central bin 1225 is located closer to the center of the central peak 2198 of the pseudo-autocorrelation function A(t). Therefore, the value of the DTPAC function A(n) 2230 in the bin 1234 immediately to the left of the central bin 1235 is larger than in FIG. 13-1. A comparison of the DTPAC function A(n) 2230 of FIG. 13-2 and the DTPAC function A(n) 2110 of FIG. 13-1 shows that a substantial change in the shape of the DTPAC functions A(n) 2110 and 2230 occurs for a small change in the positions of the bins 1101–1109 and 1221–1229.

Similarly, graph 1240 of FIG. 13-3 shows the pseudo-autocorrelation function A(t) with the bins shifted by 0.2 nanoseconds from the positions of the bins 1101 through 1109 shown in FIG. 13-1. Because the spacing between bins is 2.5 nanoseconds, this is a $\frac{2}{25}$-phase delay. Since the central peak 2198 is flat at the top, the central value 1255 of the DTPAC function A(n) 2250 of FIG. 13-3 is approximately the same as the central value 1115 of the DTPAC function A(n) 2110 of FIG. 13-1, where the central bin 1105 is exactly centered in the central peak 2198. However, the bin 1246 immediately to the right of the central bin 1245 is now located just within the right-hand negative peak 2197, and therefore the value of the DTPAC function A(n) 2250 in the bin 1256 immediately to the right of the central bin 1255 is small and negative. The bin 1244 immediately to the left of the central bin 1245 is located still closer to the center of the central peak 2198 of the pseudo-autocorrelation function A(t). Therefore, the value of the DTPAC function A(n) 2250 in the bin 1254 immediately to the left of the central bin 1255 is larger than in the graph 1230 of FIG. 13-2. Again, a comparison of the DTPAC function A(n) 2250 of FIG. 13-3 and 0-phase delay DTPAC function A(n) 2110 of FIG. 13-1 shows that a substantial change in the shape of the DTPAC functions A(n) 2110 and 2250 occurs for a small change in the positions of the bins 1101–1109 and 1241–1249.

FIGS. 13-4 and 13-5 show $\frac{3}{25}$- and $\frac{4}{25}$-phase delays, i.e., the bins are shifted by 0.3 and 0.4 nanoseconds from the case shown in FIG. 13-1 where the central bin 1105 is centered in the central peak 2198 of the pseudo-autocorrelation function $\Lambda(t)$. It may be noted that the graph 1280 of FIG. 13-5 is a ⅕-phase delay, and is therefore equivalent to the graph 1120 of FIG. 12-2.

In the preferred embodiment a neural network included in software in the processor 140 or in hardware (not shown) is utilized to differentiate between different patterns formed by the DTPAC function $\Lambda(n)$, to thereby determine the time of arrival of received communications $\Phi_e(t)$ The sensitivity of the shape of the DTPAC function $\Lambda(n)$ to small time shifts of the bins has been discussed in relation to the sampling of the central peak 2198 of the pseudo-autocorrelation function $\Lambda(t)$. However, it should be noted that the same type of argument may be applied to all of the peaks in the pseudo-autocorrelation function $\Lambda(t)$, since all of the peaks have similar shapes and approximately the same width as the central peak 2198. As mentioned above, it should also be noted that when the spacing between bins $\Delta t$ is approximately equal to one-quarter of a chip length $\delta t$ then DTPAC values for bins of a first parity will change much faster than DTPAC values $\Lambda(n)$ for bins of a second parity when a bin of the first parity is well-centered in the peak of the pseudo-autocorrelation function $\Lambda(t)$.

Detailed Description of Bin Times and Integration Functions

Figure 14A:
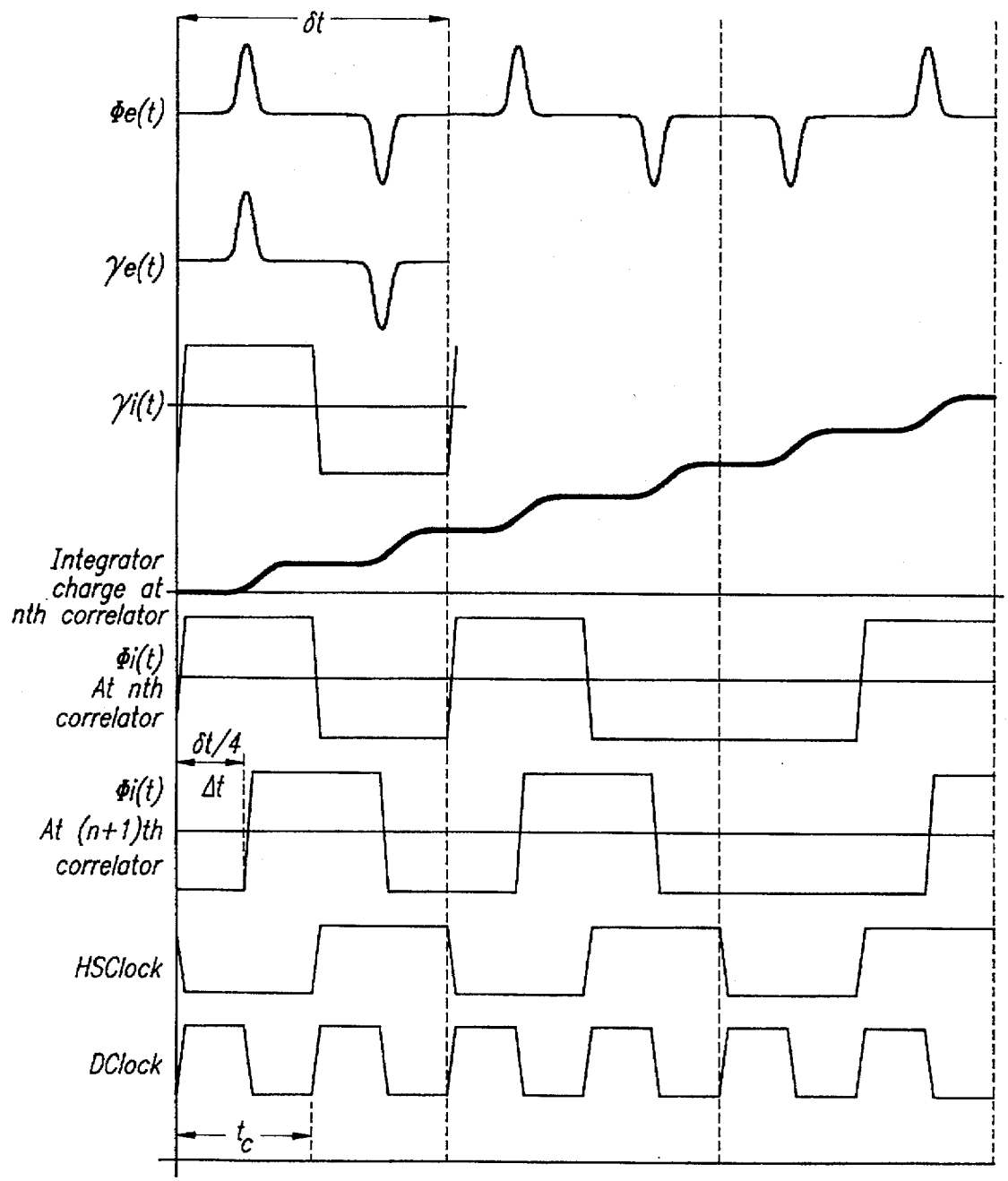
FIGS. 14a, 14b and 14c show several possible integration sequences $\Phi_i(t)$ and bin times $\Delta t$.

As mentioned above, different relationships between the internally-generated doublet functions $\gamma_i(t)$ and the bin time $\Delta t$ provide different advantages. The relationship between the bin time $\Delta t$ and the internally-generated doublets $\gamma_i(t)$ for the preferred embodiment of the time-integrating correlator 114 and the receiver code-sequence generator 118 is depicted in the timing chart of FIG. 14a. As shown in FIG. 14a, and as will be mentioned in the detailed discussion of the receiver code generator 117 of FIG. 17, a divide-by-two counter 1712 produces a half-speed clock signal HSClock with a time between clock ticks equal to twice the time between clock ticks $t_c$ of the system clock signal DClock. Also, the value of the integration sequence $\Phi_i(t)$ can change once per tick of the system clock DClock, i.e., on the rising edge of the DClock signal. The internally-generated doublet function $\gamma_i(t)$ consists of a series of doublets, the second value of each doublet being different from the first value. Ignoring the transient features of the signal, i.e., the time for the signal to change in value, the doublet waveform $\gamma_i(t)$ is $\gamma_i(t) = +1 \quad 0 < t < t_c$ $\gamma_i(t) = -1 \quad t_c < t < 2t_c$.

An exemplary integration sequence $\Phi_i(t)$ depicted in FIG. 14a consists of a first doublet of positive polarity (having a positive impulse followed by a negative impulse), followed by another doublet of positive polarity, and then a doublet of negative polarity. However, the actual values of the integration sequence $\Phi_i(t)$ are immaterial; only the times at which the values of the integration sequence $\Phi_i(t)$ change are relevant to the present discussion.

The system described above is designed for reception of a received signal $\Phi_e(t)$ consisting of a string of chips $\gamma_e(t)$ having a chip length $\delta t$ equal to the chip length of the internally-generated chips $\gamma_i(t)$, as shown in FIG. 14a. The received signal $\Phi_e(t)$ always consists of a sequence of impulse doublets; the second impulse of each doublet having an opposite polarity to that of the first impulse. The exemplary received signal $\Phi_e(t)$ shown in FIG. 14a. also consists of a first doublet of positive polarity (having a positive impulse followed by a negative impulse), followed by another doublet of positive polarity, and then a doublet of negative polarity (having a negative pulse followed by a positive pulse). However, the actual values of the exemplary received signal $\Phi_e(t)$ are immaterial; only the separation between the impulses is relevant to the present discussion. The length of time between the midpoints of impulses in the received signal $\Phi_e(t)$ and the integration sequence $\Phi_i(t)$ is the same. As discussed above, this insures a nonzero correlation between the received signal $\Phi_e(t)$ and the integration sequence $\Phi_i(t)$ when they are based on the same pseudo-random code sequence $\sigma(i)$. The integral as a function of time for the product of the integration sequence $\Phi_i(t)$ at the nth correlator and the received signal $\Phi_e(t)$ is also shown in FIG. 14a, where $$\text{Integral} = \int_0^t \Phi_e(\tau) * \Phi_i(\tau) d\tau.$$

Because the pseudorandom code sequence $\sigma(i)$ is the same for both signals $\Phi_i(t)$ and $\Phi_e(t)$ in FIG. 14a, the integral exhibits an increase in value when the received signal $\Phi_e(t)$ is nonzero, and is constant when the received signal $\Phi_e(t)$ is zero.

As will be discussed below in the discussion of the time-integrating correlator 114, in general the integration sequence $\Phi_i^{(n+1)}(t)$ directed to the $(n+1)^{th}$ integrator 1430 is delayed by $t_c/2$ (half a tick of the system clock Dclock) from the integration sequence $\Phi_i^{(n)}(t)$ directed to the $n^{th}$ integrator 1430, as shown in FIG. 14a, i.e., the bin time $\Delta t$ is $t_c/2$. Since the length of the reception window $\Delta T_w$ is equal to the bin time $\Delta t$ times the number N of integrators, in this case $\Delta T_w = Nt_c/2$.

The relation between the bin time $\Delta t$ and the functional form of the internally-generated chips $\gamma_i(t)$ of the preferred embodiment, as shown in FIG. 14a, is well-suited for the accurate determination of the arrival time of communications once an approximate arrival time has been determined. The integrator 1430 which receives a delayed integration sequence $\Phi_i(t)$ which begins closest to the time of arrival of the received chip sequence $\Phi_e(t)$ produces the largest output signal. This integrator 1430 is termed the "peak integrator." In FIG. 14a the $n^{th}$ integrator is the peak integrator since the polarity of each peak in the received chip sequence $\Phi_e(t)$ is the same as the polarity of each impulse in the integration sequence $\Phi_i^{(n)}(t)$ which occurs at the same time. The integration sequence $\Phi_i^{(n+1)}(t)$ from the $(n+1)^{th}$ integrator 1430 is shifted forward by one quarter of a chip length $\delta t$ (which in this case is equal to half the time $t_c$ between ticks from the system clock DClock) from that of the peak integrator 1430, producing a significant change in the overlap of the impulses in the integration sequence $\Phi_i(t)$ and the received chip sequence $\Phi_e(t)$. Therefore, the width of the peak of the pseudo-autocorrelation function is approximately equal to the bin time $\Delta t(=\delta t/4)$. As discussed above, when this is the case the bin values on either side of the peak value change extremely rapidly, with time shifts between the received chip sequence $\Phi_e(t)$ and the integration sequence $\Phi_i(t)$, providing a sensitive indicator of the displacement between the beginning times of the received sequence $\Phi_e(t)$ and the integration sequence $\Phi_i(t)$. Therefore, the bin time $\Delta t$ of $\delta t/4$ in this embodiment provides a means for accurately determining the arrival time of communications.

Figure 14B:
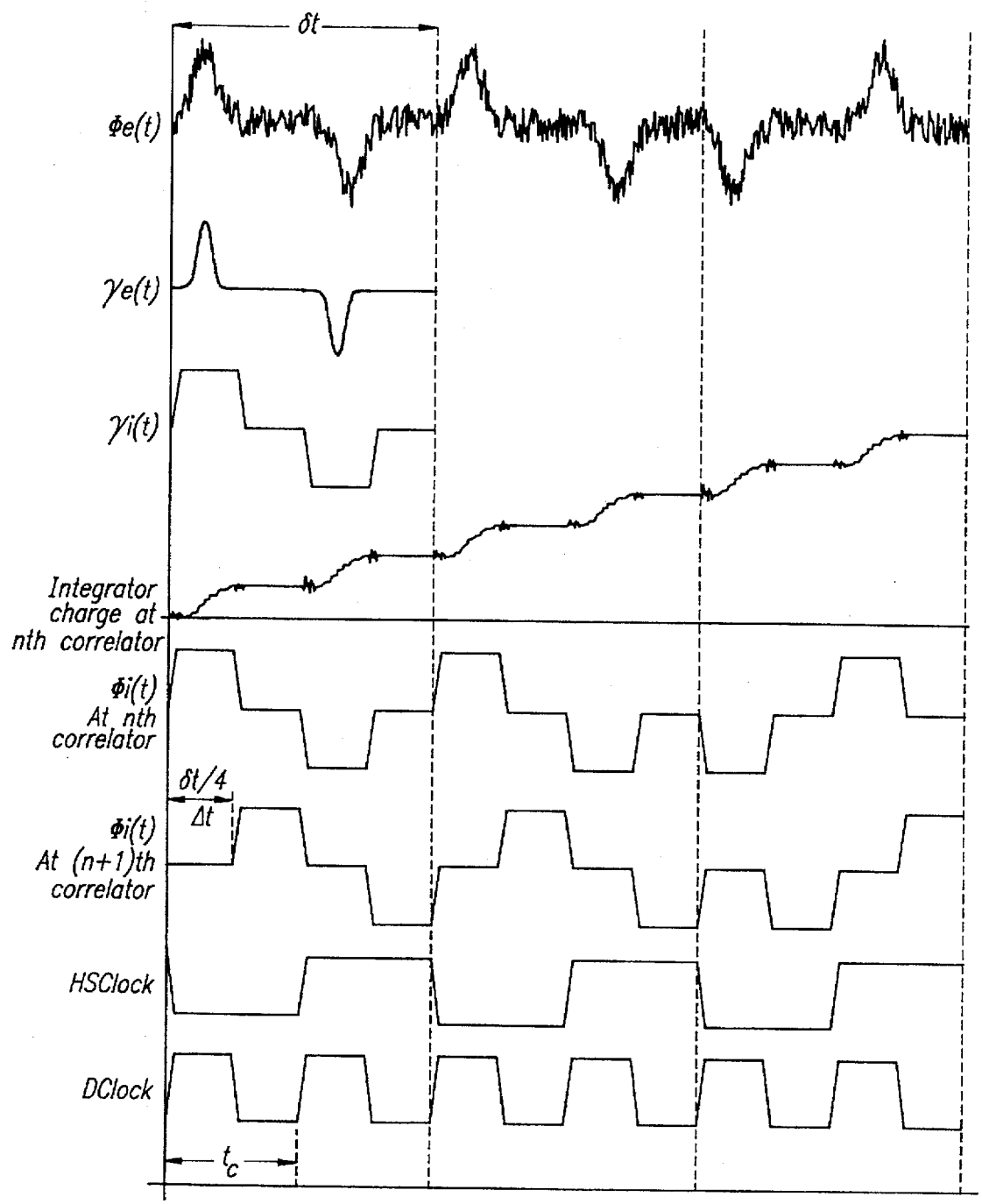

A first alternate embodiment of the relationship between the internally-generated chip function $\gamma_i(t)$ and the bin times $\Delta t$ (i.e., the time delays of the integration sequence $\Phi_i(t)$ to the integrators 1430) is depicted in FIG. 14b. It should be noted that the circuitry necessary to implement these relationships, although not explicitly depicted by the circuitry figures and discussed in the present specification, would be apparent to one skilled in the art as modifications of the circuitry presented herein. As in the previous embodiment, in this alternate embodiment the time delay between the integration sequence $\Phi_i^{(n)}(t)$ directed to the $n^{th}$ integrator 1430 and the integration sequence $\Phi_i^{(n)}(t)$ directed to $(n+1)^{th}$ integrator 1430 is one quarter of the time length $\delta t$ of a chip, i.e., one half of the time $t_c$ between ticks of the system clock DClock. Ignoring transients, in this alternate embodiment the internally-generated chip waveform $\gamma_i(t)$ is $\gamma_i(t) = +1 \quad 0 < t < \delta t/4$ $\gamma_i(t) = -1 \quad \delta t/2 < t < 3\delta t/4$ $\gamma_i(t) = 0 \quad \text{otherwise.}$ The internally-generated chip function $\gamma_i(t)$ consists of two square pulses and resembles a clipped version of the externally-generated chip function $\gamma_e(t)$. The received externally-generated chip sequence $\Phi_e(t)$ and the integration sequences $\Phi_i^{(n)}$ and $\Phi_i^{(n+1)}$ are depicted in FIG. 14b as a sequence of three chips, the first two chips having a positive polarity and the third chip having a negative polarity. In addition, the received chip sequence $\Phi_e(t)$ is depicted as having noise superimposed on the signal. The integral as a function of time for the product of the integration sequence $\Phi_i(t)$ at the nth correlator and the received signal $\Phi_i(t)$ is also shown in FIG. 14b, where $$\text{Integral} = \int_0^t \Phi_e(\tau) * \Phi_i(\tau) d\tau.$$

The integral changes in value when the integration sequence $\Phi_i(t)$ is nonzero. However, the integral is constant when the integration sequence $\Phi_i(t)$ is zero so that noise from the received signal $\Phi_e(t)$ during these periods does not perturb the value of the integral. Because the pseudorandom code sequence $\sigma(i)$ is the same for both the integration sequence $\Phi_i(t)$ and the received signal $\Phi_e(t)$ in FIG. 14b, each impulse in the received signal $\Phi_e(t)$ produces an increase in the value of the integral.

An advantage of the internally-generated chip function $\gamma_i(t)$ of FIG. 14b is that this alternate embodiment provides a higher signal-to-noise ratio than the embodiment of FIG. 14a. This is due to the fact that for the peak integrator the relatively noisy regions between the impulses of the received chip sequence $\Phi_e(t)$ do not contribute to the integral since the integration signal $\Phi_i(t)$ is zero over most of these regions.

As is shown in FIG. 14b, the $n^{th}$ integrator 1430 is the peak integrator since the locations of the positive and negative pulses of the integration sequence $\Phi_i^{(n)}(t)$ and the externally-generated chip sequence $\Phi_e(t)$ coincide. The integration sequence $\Phi_i^{(n+1)}(t)$ supplied to the $(n+1)^{th}$ integrator 1430 is shifted forward by one quarter of a chip length $\delta t$ (which in this case is equal to half the time $t_c$ between ticks from the system clock DClock) from that of the peak integrator 1430, i.e., the bin time $\Delta t$ is $\delta t/4$. The output from the $(n+1)^{th}$ integrator 1430 will be small since the pulses of the integration signal $\Phi_i^{(n+1)}(t)$ occur in-between the impulses of the externally-generated chip sequence $\Phi_e(t)$. Therefore, the width of the peak of the pseudo-autocorrelation function is again approximately twice a bin time $\Delta t$. In contrast with the previous embodiment, in this case the outputs of the $(n+1)^{th}$ and $(n-1)^{th}$ integrators 1430 to either side of the peak integrator 1430 (the $n^{th}$ integrator) are near zero and are relatively insensitive to a shift in the arrival time of the externally-generated chip sequence $\Phi_e(t)$. This embodiment is therefore less useful for accurate ranging than the previous embodiment. However, because this embodiment is less susceptible to noise, it is well-suited for the transmission of binary information between localizers. (In alternate embodiments the bin spacing $\Delta t$ is not fixed at a value exactly equal to one quarter of a chip length $\delta t$. For instance, the bin spacing $\Delta t$ could vary between a value approximately equal to the width of an impulse and less than one quarter of the chip length $\delta t$.)

Figure 14C:
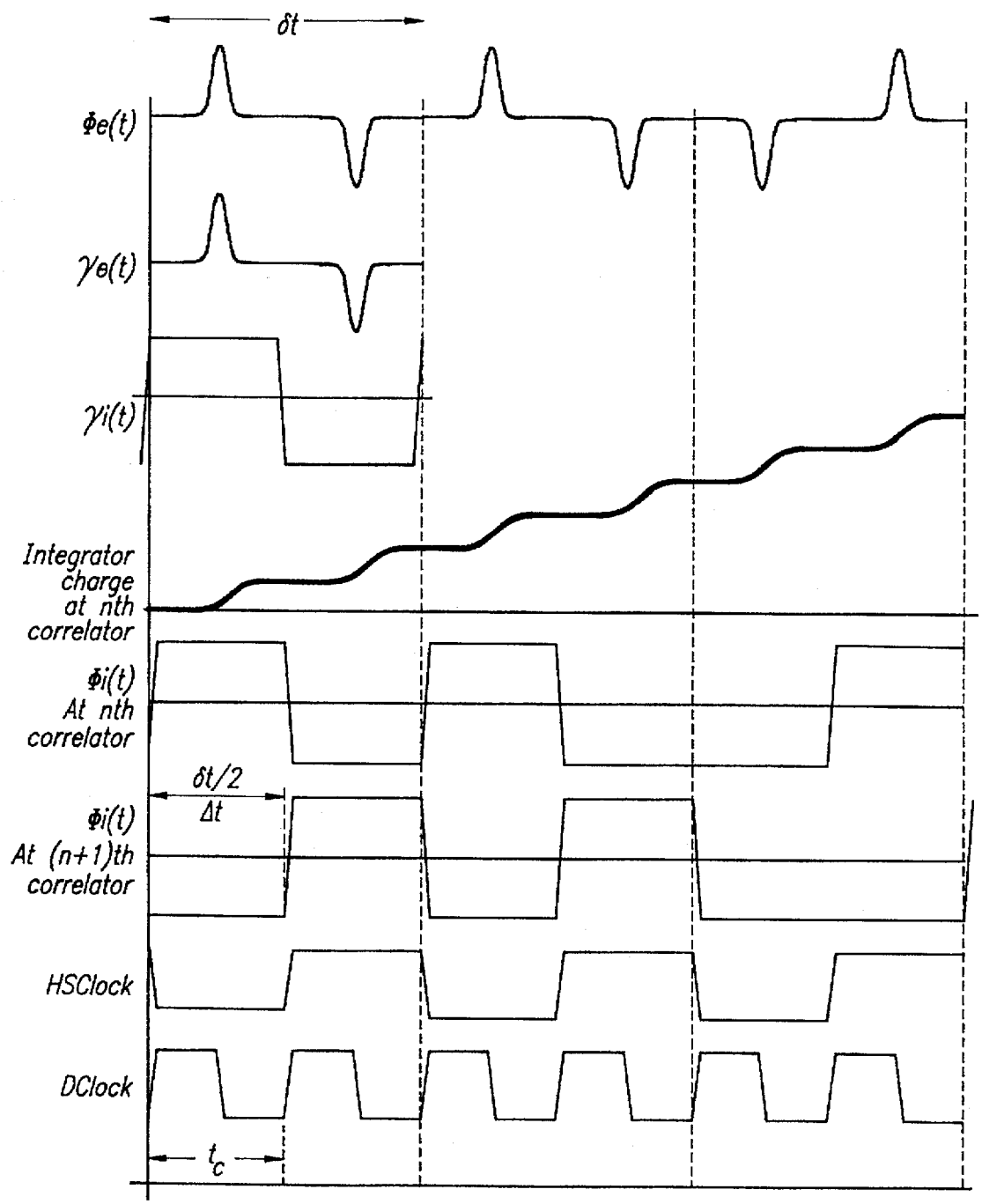
Figure 15:
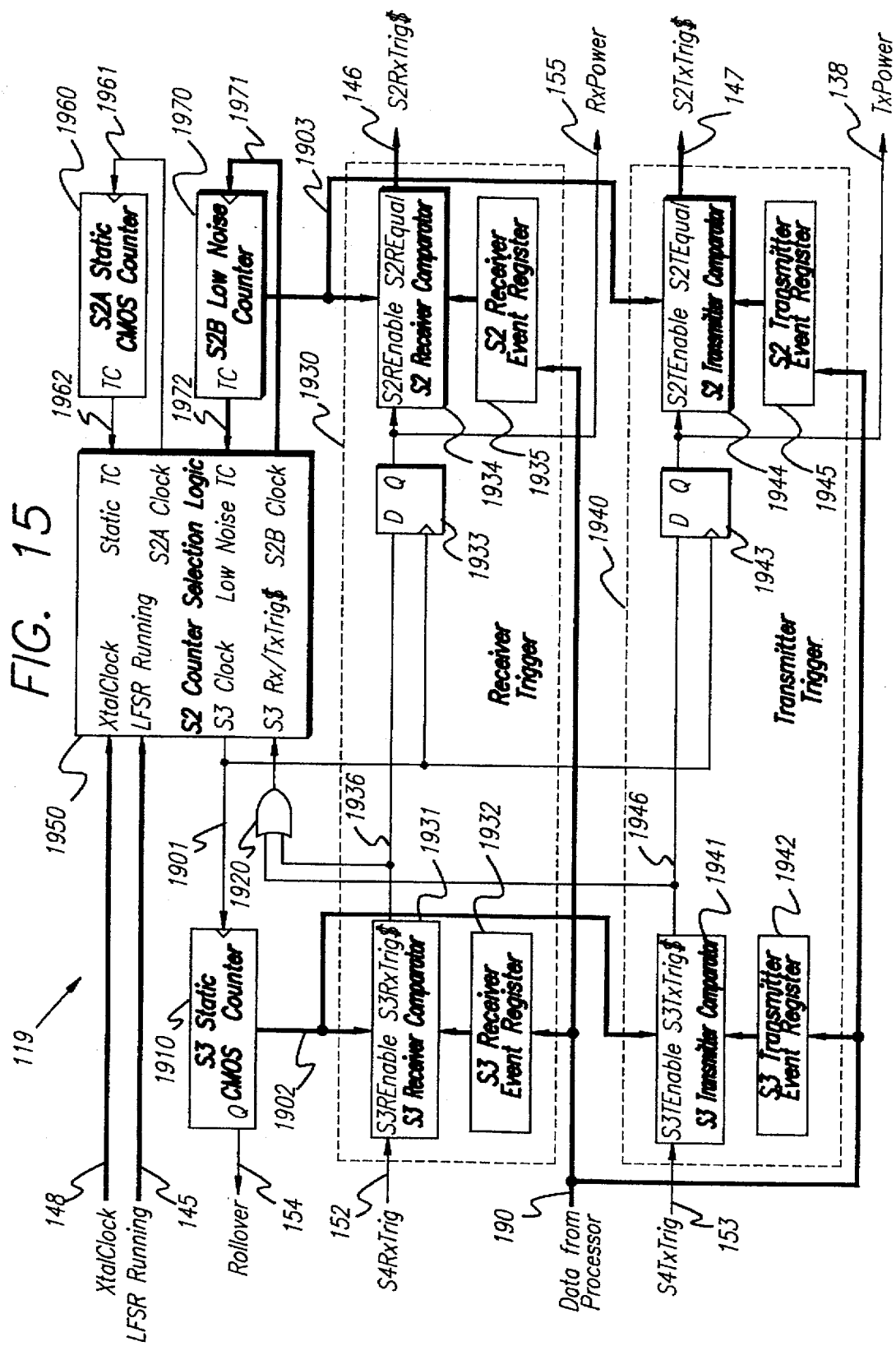

A second alternate embodiment of the relationship between the internally-generated chip function $\gamma_i(t)$ and the time delays of the integration sequence $\Phi_i(t)$ to the integrators 1430 is depicted in FIG. 14c. It should again be noted that the circuitry necessary to implement these relationships, although not explicitly depicted by the circuitry figures and discussed in the present specification, would be apparent to one skilled in the art as modifications of the circuitry presented herein. Ignoring transients, in this alternate embodiment the internally-generated chip function $\gamma_i(t)$ is the same as in the preferred embodiment, i.e., $\gamma_i(t) = +1 \quad 0 < t < \delta t/2$ $\gamma_i(t) = -1 \quad \delta t/2 < t < \delta t.$ The externally-generated chip sequence $\Phi_e(t)$ and the integration sequences $\Phi_i^{(n)}(t)$ and $\Phi_i^{(n+1)}(t)$ are depicted in FIG. 14c as a sequence of three chips $\gamma_e$, the first two chips having a positive polarity and the third chip having a negative polarity.

The $n^{th}$ integrator 1430 is the peak integrator since the locations of the positive and negative impulses of the integration sequence $\Phi_i^{(n)}(t)$ and the externally-generated chip sequence $\Phi_e(t)$ coincide. The integral as a function of time for the product of the integration sequence $\Phi_i(t)$ at the nth correlator and the received signal $\Phi_i(t)$ is shown in FIG. 14c, where $$\text{Integral} = \int_0^t \Phi_e(\tau) * \Phi_i(\tau) d\tau.$$

Because the pseudorandom code sequence $\sigma(i)$ is the same for both signals $\Phi_i(t)$ and $\Phi_e(t)$ in FIG. 14c, the integral exhibits an increase in value when the received signal $\Phi_e(t)$ is nonzero, and is constant when the received signal $\Phi_e(t)$ is zero. The integration sequence $\Phi_i^{(n+1)}(t)$ from the $(n+1)^{th}$ integrator 1430 is shifted forward by the time $t_c$ between ticks of the system clock DClock (i.e., one half of a chip length $\delta t$) from that of the peak integrator 1430, and the output from the $(n+1)^{th}$ integrator 1430 will be small since there will generally be no correlation between the impulses of the received externally-generated chip sequence $\Phi_e(t)$ and the shifted integration sequence $\Phi_i^{(n+1)}(t)$. As discussed above in reference to the embodiment of FIG. 14a, even a shift of the integration sequence $\Phi_i(t)$ of one quarter of a chip length $\delta t$ from the peak alignment produces a substantial drop in the correlation of the two signals $\Phi_e(t)$ and $\Phi_i(t)$. As also discussed above, the optimal bin time $\Delta t$ is approximately half the width of the peak of the pseudo-autocorrelation function. Therefore, this second alternate embodiment cannot determine the actual arrival time of the received chip sequence $\Phi_e(t)$ to the accuracy of the embodiment of FIG. 14a due to the increase in the bin size $\Delta t$. However, this alternate embodiment is useful in locating the approximate arrival time of communications, such as the beacon signal of FIG. 8, since the length $\Delta T_w$ of the reception window is twice as long as in the embodiment of FIG. 14a. The length of the reception window $\Delta T_w$ of this embodiment is equal to the bin time $\Delta t$ times the number N of integrators, in this case $\Delta T_{w=N t_c}$, whereas the length $\Delta T_w$ of the reception window for the embodiment of FIG. 14b is $N t_c/2$.

In alternate embodiments the bin spacing $\Delta t$ is not fixed at exactly half of a chip length $\delta t$, as in FIG. 14.c. For instance, the bin spacing $\Delta t$ could be equal to half the chip length $\delta t$ minus the rise time (fall time) of the square pulses in the internally-generated chip function $\gamma_i(t)$ to insure that received impulses do not escape detection, since when the bin spacing $\Delta t$ is exactly equal to half the chip length $\delta t$ a sharp impulse occurring during the rise time of one internally-generated integration sequence $\Phi_i(t)$ and the fall time of an internally-generated integration sequence $\Phi_i(t)$ form an adjacent bin may escape detection.

Detailed Description of the Low-Frequency Real Time Clock

As mentioned above, the real time clock 119 and 120 of the present invention may have as many as five separate stages so as to provide a high-speed low-power clock and an extended timebase. The most-significant bits of the clock are stored and managed by software in an "S4-stage" implemented in the processor 140. The second-most-significant bits of the clock are stored and managed by the low-frequency real time clock 119 shown in detail in FIG. 15. In the preferred embodiment presented in FIG. 15 and discussed in detail below, the low-frequency real time clock 119 is split into two stages, S3 and S2, and the S2 stage is further split into a standard-logic stage S2A and a low-noise stage S2B. However, in applications where power consumption is not an issue, the S2A and S2B stages may be combined into a single low-noise S2 stage. Furthermore, the S3 and S2 stages may also be combined into a single low-noise stage, though this alternative produces even greater power consumption.

The low-frequency real time clock 119 is responsible for triggering the high-frequency real time clock 120 shortly before a transmission or reception event, and for notifying the processor 140 when a counter 1910 in the S3 stage overflows. To allow the low-frequency real time clock 119 to run continuously, the S2 stage has two counters, an S2A static-CMOS counter 1960 and an S2B low-noise counter 1970. The S2B counter 1970 is designed using low-noise circuitry to produce very little power supply line noise or radio frequency radiation so as to minimize interference with other components of the circuit during transmission and reception events. The S2A counter 1960 is designed using standard CMOS logic, and so the S2A static-CMOS counter 1960 is noisier, but consumes much less power, than the low-noise S2B counter 1970. A selection logic block 1950 in the low-frequency clock 119 determines which of the S2 counters 1960 or 1970 to use, and switches back and forth between the two. The selection logic 1950 uses the signal XtalClock on line 148 from the crystal oscillator 130 for its timing. If one of the linear feedback shift registers 1716 or 1826 in the receiver or transmitter code-sequence generators 117 or 118 is running, the miscellaneous logic block 150 notifies the low-frequency real time clock 119 via a signal on the LSFR-running line 145. The selection logic 1950 supplies the clock signals via output terminals S2AClock and S2BClock on lines 1961 and 1971 to run the S2A and S2B counters 1960 and 1970, respectively. The S2 counters 1960 or 1970 send their terminal count TC signals to the static TC and low-noise TC inputs of the selection logic 1950 on lines 1962 and 1972, respectively. The TC signals are used by the selection logic 1950 to time-switch between the two S2 counters 1960 and 1970, and also to generate the signal on the S3Clock line 1901. The signal on the S3Clock line 1901 goes high for one XtalClock tick whenever one of the S2 clocks 1960 or 1970 produces a terminal count, incrementing an S3 static-CMOS counter 1910 by one. The S3 counter 1910 contains the second most-significant portion of the bits of the real time clock. The CMOS logic of the S3 static counter 1910 only generates power supply line noise and radio frequency noise when it is switching, so selection logic 1950 delays sending the S3Clock signal to the S3 counter 1910 during a transmission or reception event. This allows the S3 counter 1910 to be designed using standard low-power CMOS circuitry. When the S3 counter 1910 overflows, it interrupts the processor 140 via rollover line 154 to inform the processor 140 that it is time to increment the S4 stage of the counter.

A receiver triggering circuit 1930 is used to detect when it is time to trigger the high-frequency clock 120 to start a reception event. Before the reception event, the processor 140 loads an S3 receiver event register 1932 and an S2 receiver event register 1935 via data bus 190 with the appropriate components of the time that the reception event will happen. When the most-significant S4 portion of the reception event time matches the most-significant S4 portion of the counter (not shown) in the processor 140, the processor 140 generates a pulse on the S4RxTrig line 152. At this time, the processor 140 is disabled to prevent it from producing radio frequency noise. The S4RxTrig signal is directed via line 152 to the S3REnable input of an S3 receiver comparator 1931 and enables the S3 receiver comparator 1931. This comparator 1931 waits until the value from the S3 counter 1910 on an S3 data bus 1902 matches the value in the S3 receiver event register 1932, and then produces a pulse on the S3RxTrig$ line 1936. This S3RxTrig$ trigger pulse is latched into a reception flip-flop 1933 to delay the trigger until the next overflow of the S2 static counter 1960 which induces the selection logic 1950 to produce a pulse at the S3 clock output. This delay produced by the flip-flop 1933 gives the selection logic circuit 1950 time to switch to the S2B low-noise counter 1970 before the reception event starts. The software in the processor 140 takes this delay into account when determining the values to load into the S3 receiver event register 1932 and the S2 receiver event register 1935, and loads values that are one count less than the actual times required. For instance, if a reception event is supposed to be triggered when the counters in stages S3 and S2 have values $C_3$ and $C_2$, then the S3 and S2 event registers 1932 and 1935 are loaded with the values ($C_3-1$) and ($C_2-1$). To give the selection logic 1950 ample warning that a switch to the low-noise circuitry will be necessary, the un-delayed S3RxTrig$ signal from the S3 receiver comparator 1931 is fed to the S3Rx/TxTrig$ input of the selection logic 1950 via an OR gate 1920. The Q output from the reception flip-flop 1933 then enables an S2 receiver comparator 1934 via line 155. When the value in the S2B low-noise counter 1970 provided on an S2 data bus 1903 matches the value in the S2 receiver event register 1935, the S2 receiver comparator 1934 triggers, generating a pulse on the S2RxTrig$ line 146 which enables a portion of the high-frequency real time clock 120, as described below. The Q output from the reception flip-flop 1933 is also passed on to the receiver code-sequence generator 117 via RxPower line 155. This gives the receiver code-sequence generator 117 time to turn on low-noise circuits that are currently disabled to conserve power.

A transmitter triggering circuit 1940 operates in a similar fashion to the receiver triggering circuit 1930. This transmitter triggering circuit 1940 is used to detect when it is time to trigger the high-frequency clock 120 to start a transmission event. Before the transmission event, the processor 140 loads an S3 transmitter event register 1942 and an S2 transmitter event register 1945 via data bus 190 with the appropriate components of the time that a transmission event will happen. When the most-significant S4 portion of the transmission event time matches the most-significant S4 portion of the counter (not shown) in the processor 140, the processor 140 generates a pulse on the S4TxTrig line 153. At this time, the processor 140 will be disabled to prevent it from producing power line and radio frequency noise. The S4TxTrig signal enables an S3 transmitter comparator 1941 via its S3TEnable input. The S3 transmitter comparator 1941 produces a pulse on the S3TxTrig$ line 1946 when the value from the S3 counter 1910 on the S3 data bus 1902 matches the value in the S3 transmitter event register 1942. This S3TxTrig$ trigger pulse is latched into a reception flip-flop 1943 to delay the trigger until the next overflow of the S2A static counter 1960, which induces the selection logic 1950 to produce an pulse at the S3 clock output. This delay gives the selection logic circuit 1950 time to switch to the S2B low-noise counter 1970 before the transmission event starts. The software in the processor 140 takes this delay into account when determining the values to load into the S3 transmitter event register 1942 and the S2 transmitter event register 1945, and loads values that are one cycle earlier than the actual times required. For instance, if a transmission event is to be triggered when the counters in stages S3 and S2 have values $C_3$ and $C_2$, then the S3 and S2 event registers 1942 and 1945 are loaded with the values ($C_3$–1) and ($C_2$–1). To give the selection logic 1950 ample warning that a switch to the low-noise circuitry will be necessary, the un-delayed S3TxTrig$ signal is sent to the S3Rx/TxTrig$ input of the selection logic 1950 via OR gate 1920. The Q output from the transmission flip-flop 1943 in turn enables an S2 transmitter comparator 1944 via line 138. When the value in the S2B counter 1970 provided on the S2 data bus 1903 matches the value in the S2 transmitter event register 1945, the S2 transmitter comparator 1944 triggers, generating a pulse on the S2TxTrig$ line 147 which enables a portion of the high-frequency real time clock 120, as described below. The Q output from the transmission flip-flop 1943 is also passed on to the transmitter code-sequence generator 118 via the TxPower line 138. This gives the transmitter code-sequence generator 118 time to turn on low-noise circuits that are currently disabled to conserve power.

Detailed Description of the High-Frequency Real Time Clock

As mentioned above, the real time clock of the present invention has five separate components so as to provide high clock speed and an extended time base. The most-significant bits of the clock are stored and managed by an S4 stage which is implemented as software in the processor 140. The second most-significant bits of the clock are stored and managed in stages S3 and S2 by the low-frequency real time clock 119 described above. The lowest-significant bits of the real time clock are stored and managed in stages S1 and S0 of a high frequency real time clock 120 shown in detail in FIG. 16. During transmission and reception events, this high-frequency real time clock 120 generates the high-speed system clock DClock signal on line 160 that is utilized by the transmitter code-sequence generator 118, the receiver code-sequence generator 117, and the time-integrating correlator 114. The high-frequency real time clock 120 utilizes the low bits of the receiver and transmitter trigger times supplied by the processor 140, trigger transmission and reception events, as described in detail below.

Figure 16:
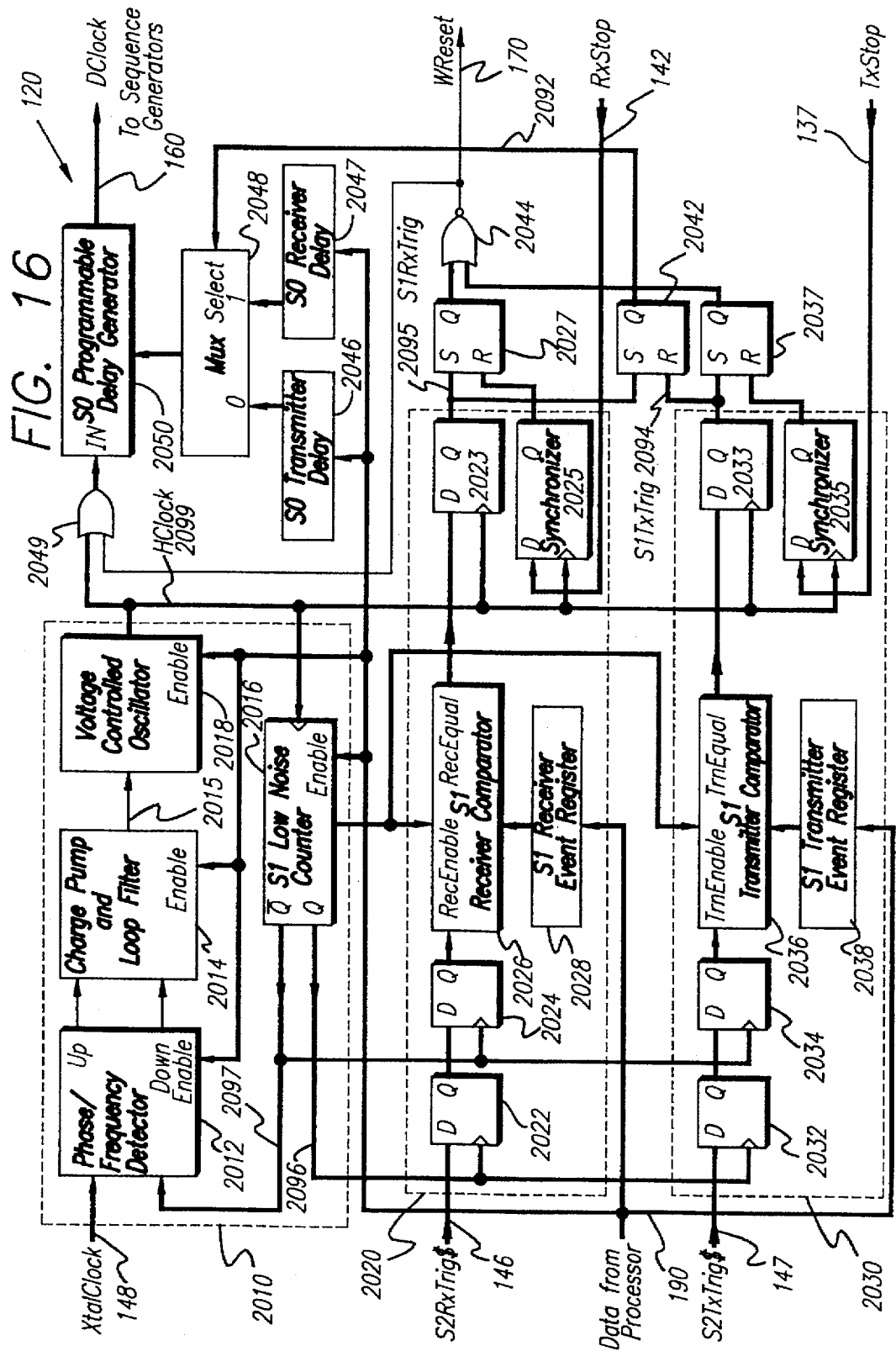

The high-frequency real time clock 120 of FIG. 16 uses a phase-lock loop circuit 2010 to convert the low-speed crystal clock signal XtalClock on line 148 into a high-speed clock signal HClock on line 2099. The high-speed clock HClock only runs internally to the high-frequency clock 120. The components of the phase-lock loop 2010 are activated by the processor 140 via the data bus 190 to the Enable inputs of the components. Because the phase-lock loop circuit 2010 requires a number of cycles to stabilize, the circuit 2010 is enabled by the processor 140 via the processor data bus 190, rather than by the triggering signals S2RxTrig$ or S2TxTrig$ from the low-frequency real time clock 119. To maximize the accuracy of the high-frequency clock 120 while minimizing power consumption, the phase-lock loop 2010 is maintained active during the communications in each ranging interaction (lasting on the order of milliseconds), but deactivated between ranging interactions (periods on the order of seconds). The approximately 6.25 MHz crystal clock XtalClock is multiplied by a number, which in the preferred embodiment is thirty-two, by the phase-lock loop 2010 to generate the 200 MHz internal HClock signal. In the phase-lock loop 2010, the HClock signal is divided back down by thirty-two in an S1 low-noise counter 2016 to produce a low-speed clock signal on line 2097. This S1 counter 2016 contains the second-least-significant bits of the real time clock. The low-speed clock signal from the Q-Bar output of the S1 counter 2016 on line 2097 is compared with the crystal clock signal XtalClock in a phase/frequency detector 2012. If the low-speed clock on line 2097 is too slow, the phase/frequency detector 2012 produces a pulse on its UP output. The length of this pulse will be equal to the time difference between when a transition happens on the crystal clock XtalClock on line 148 and when the late transition occurs on the low-speed clock on line 2097. If the low-speed clock on line 2097 is too fast, the phase/frequency detector 2012 produces an impulse on its DOWN output. In this case, the length of the impulse is equal to the time difference between a transition on the early low-speed clock on line 2097 and a transition on the crystal clock XtalClock on line 148. The UP/DOWN error signals are used by a type-II operation charge pump and loop filter 2014 to produce a voltage on output line 2015 proportional to the integral of the UP/DOWN error signals from the phase/frequency detector 2012. This voltage on line 2015 is used in turn by a voltage controlled oscillator 2018 to generate the internal high-speed clock signal HClock on line 2099. This HClock signal feeds back into the S1 counter 2016 to complete the loop.

An S1 receiver triggering circuit 2020 generates reset and clock signals for a receive event. This receiver trigger 2020 is enabled by the S2RxTrig$ signal on line 146 from the low-frequency real time clock 119. The S2RxTrig$ signal is synchronous with the crystal clock XtalClock (since the crystal clock XtalClock is also the clock signal for the low-frequency clock 119), but may arrive slightly early or late with respect to the low-speed clock from the S1 counter 2016 due to phase shifts produced by the phase-lock loop 2010. To correct for any phase error between the S2RxTrig$ signal and the low-speed clock signal on line 2097, a first receiver flip-flop 2022 samples S2RxTrig$ half way through a cycle by using the inverted low-speed clock signal from the Q output of the S1 counter 2016 on line 2096. The output from the first receiver flip-flop 2022 is then sampled with the low-speed clock signal from the Q-bar output of the S1 counter 2016 by a second receiver flip-flop 2024. The output from the second receiver flip-flop 2024 is used to enable an S1 receiver comparator 2026. Before a reception event, the processor 140 loads an S1 event register 2028 via data bus 190 with the second-least-significant bits of the reception event time. The receiver comparator 2026 compares the output from the S1 counter 2016 with the value in the S1 event register 2028, and produces a high signal at its RecEqual output when the two values match. A third receiver flip-flop 2023 latches the RecEqual output of the S1 comparator 2028 to produce a clean pulse as the S1RxTrig signal on line 2095. The S1RxTrig signal causes a receiver SR flip-flop 2027 to be set. This receiver SR flip-flop 2027 will stay on for the duration of the reception event.

When a reception event is complete, the time-integrating correlator 114 sends a RxStop signal on line 142 to the high frequency clock 120. This signal is synchronous with the system clock DClock, but may not be in phase with the internal clock HClock. To bring the RxStop signal into synchronization with the internal clock HClock, a receiver synchronizing flip-flop 2025 latches the RxStop signal to produce a pulse at its Q output synchronized with one of the HClock pulses. The output from receiver synchronizing flip-flop 2025 is directed to the reset input R of the receiver SR flip-flop 2027 to reset it, producing a low value at the Q output. Since the Q output from the transmitter SR flip-flop 2037 is also low (as will be discussed below), the output of the NOR gate 2044 goes high, so as to turn on the WReset signal on line 170 when the receiver event is done. When the output of the NOR gate 2044 goes high, this forces the output of the OR gate 2049 directed to the programmable delay 2050 to also go high, thereby preventing any transitions of the system clock DClock. The asserted S1RxTrig signal on line 2095 is also used to set a selection flip-flop 2042. The output of this selection flip-flop 2042 on line 2092 is used to select one of the S0 event registers 2046 and 2047, as described below.

An S1 transmitter triggering circuit 2030 operates in a similar fashion to the S1 receiver triggering circuit 2020. This transmitter trigger 2030 is enabled by the S2TxTrig$ signal on line 147 from the low-frequency real time clock 119. The S2TxTrig$ signal is synchronous with the crystal clock XtalClock, but may arrive slightly early or late with respect to the low-speed clock signal on line 2097 from the S1 counter 2016 due to phase shifts produced by the phase-lock loop 2010. To allow for any phase error between the S2TxTrig$ signal and the low-speed clock signal on line 2097, a first transmitter flip-flop 2032 samples S2TxTrig$ half way through a cycle by using the inverted low-speed clock from the Q output of the S1 counter 2016 on line 2096. The output from the first transmitter flip-flop 2032 is then sampled with the low-speed clock signal on line 2097 by a second transmitter flip-flop 2034. The output from the second transmitter trigger flip-flop 2034 is used to enable an S1 transmitter comparator 2036. Before a transmission event, the processor 140 loads a transmitter S1 event register 2038 with the second-least-significant bits of the transmission event time. The transmitter comparator 2036 compares the output from the S1 counter 2016 with the value in the S1 Event register 2038, and produces a high signal at its TrnEqual output when the two values match. A third transmitter flip-flop 2033 latches the TrnEqual output of the S1 comparator 2036 to produce a clean pulse as the S1RxTrig signal on line 2094. The S1TxTrig signal causes a transmitter SR flip-flop 2037 to be set. This transmitter SR flip-flop 2037 will stay on for the duration of the transmission event.

When the transmission event is complete, the transmitter code-sequence generator 118 sends a TxStop signal on line 137 to the high-frequency clock 120. The TxStop signal is synchronous with the system clock DClock, but may not be in phase with the internal clock HClock. To bring the TxStop signal into synchronization with the internal clock HClock, transmitter synchronizing flip-flop 2035 latches the TxStop signal to produce a pulse at its Q output synchronized to one of the HClock pulses. The output from transmitter synchronizing flip-flop 2035 is directed to the reset input R of the transmitter SR flip-flop 2037 to reset it, producing a low value at the Q output. Since the Q output from the receiver SR flip-flop 2027 is also low (as discussed above), the output of the NOR gate 2044 goes high, so as to turn on the WReset signal on line 170 when the transmitter event is done. When the output of the NOR gate 2044 goes high, this forces the output of the OR gate 2049 directed to the programmable delay 2050 to also go high, thereby preventing any transitions of the system clock DClock. The asserted S1TxTrig signal on line 2094 is also used to reset a selection flip-flop 2042. The output of this selection flip-flop 2042 on line 2092 is used to select one of the S0 event registers 2046 and 2047, as described below.

The outputs from the receiver SR flip-flop 2027 and the transmitter SR flip-flop 2037 are combined in a NOR gate 2044 to produce the WReset signal on line 170. The WReset signal remains high between transmitter and receiver events, and goes low only for the duration of a transmission or reception event. The RxStop signal on line 142 from the time-integrating correlator 114 and the TxStop signal on line 137 from the transmitter code-sequence generator 117 are used by the high-frequency real time clock 120 to terminate a reception or transmission event, respectively, and assert the WReset signal on line 170. As discussed above, OR gate 2049 uses the WReset signal to enable or disable the HClock signal into an S0 programmable delay generator 2050. Between transmission and reception events, the WReset signal is high, causing the OR gate 2049 to produce a continuous high signal, masking out the HClock signal to the IN input of the S0 programmable delay generator 2050. During a transmitter or receiver event, the WReset signal on line 170 goes low, and OR gate 2049 allows the internal clock HClock signal to pass through to the S0 programmable delay generator 2050.

The S0 programmable delay generator 2050 implements a time shift smaller than the time between the ticks of the internal clock HClock, and so is equivalent to the least-significant bits of the real time clock. Because the internal clock HClock is a 200 MHz signal, the S1 counter 2016 can only time events to the nearest 5 nanoseconds, and this only allows the measurement of distances to the nearest 1.5 meters. To achieve a greater time accuracy, the S0 delay generator 2050 shifts the phase of the internal clock HClock to produce a system clock signal DClock on line 160 aligned to the nearest 30 picoseconds. This level of time accuracy allows for distance measurements to the nearest centimeter. The processor 140 loads a delay via data bus 190 into an S0 transmitter delay unit 2046 or an S0 receiver delay unit 2047 before each transmission or reception event, respectively. The signal on line 2092 from select flip-flop 2042 is directed to the select input of a multiplexer 2048 to select which delay the multiplexer 2048 will pass through to the S0 delay generator 2050. During a receiver event when the signal on line 2092 is high, the multiplexer 2048 selects the value in the S0 receiver delay 2047. During a transmitter event when the signal on line 2092 is low, the multiplexer 2048 selects the value in the S0 transmitter delay 2046.

FIG. 16 shows the S0 Programmable delay generator 2050 as a separate component from the phased locked loop 2010. However, there are other ways to implement the programmable delay, including implementing the voltage controlled oscillator 2019 in the phased lock loop 2010 as a ring oscillator. In this case, an S0 delay generator could be implemented as a multiplexer that selects one of the taps off of the ring oscillator.

Detailed Description of the Receiver Code-Sequence Generator

Figure 17A:
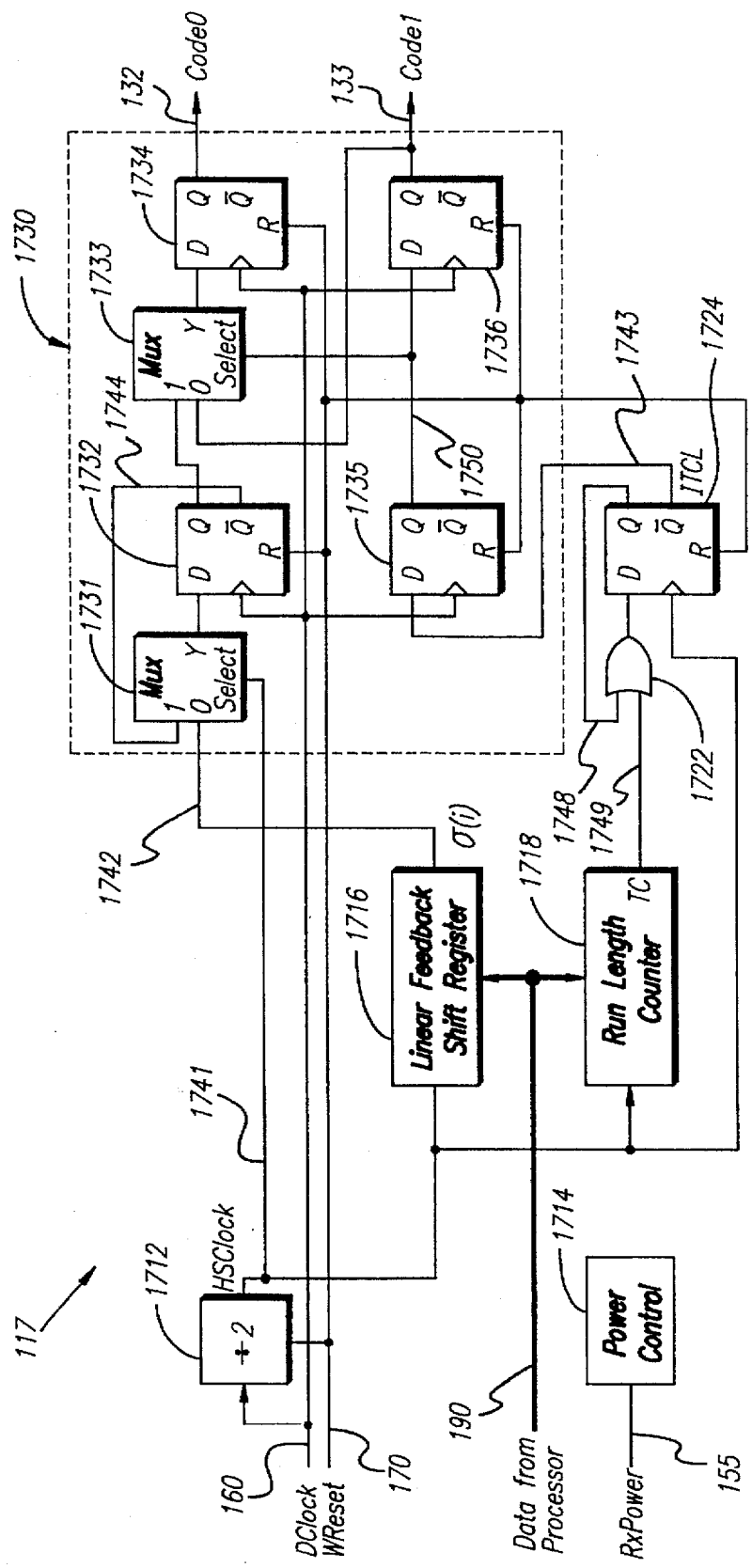
FIG. 17a is a schematic diagram of a receiver code-sequence generator of a localizer.

A receiver code-sequence generator 117 according to the present invention is shown in detail in FIG. 17a. During a receiver event, this circuit generates a code sequence σ(i) from parameters initialized by the processor 140 via data bus 190. The code sequence σ(i), a string of single bits, is converted into a two-bit reception command sequence consisting of Code0 on output line 132 and Code1 on output line 133. These commands provide a series of instructions to the integrators 1430 of the time-integrating correlator 114. The following table shows the meanings of the two-bit commands:

| Code1, Code0 | Name | Meaning |
|---|---|---|
| 0,0 | HOLD | Integrators hold their integral values and ignore received input signal $\Phi_e(t)$ -- equivalent to multiplying input $\Phi_e(t)$ by zero. |
| 1,1 | INT+ | Integrators add received signal $\Phi_e(t)$ to integral value -- equivalent to multiplying input $\Phi_e(t)$ by one. |
| 1,0 | INT− | Integrators subtract received signal $\Phi_e(t)$ from integral value -- equivalent to multiplying input $\Phi_e(t)$ by negative one. |
| 0,1 | SAMPLE | Integrators transfer integral value to sample-and-hold circuit. |

For each reception event the two-bit commands will consist of a string of pairs of INT+ and INT− commands, followed by a single SAMPLE command, and a string of HOLD commands.

To prevent the receiver code-sequence generator 117 from generating radio-frequency noise as a byproduct of its operation, the receiver code-sequence generator 117 is designed using low-noise current-steering logic. This type of logic consumes more power than standard CMOS logic, so it is disabled to conserve power when not in use by the power control circuitry 1714 which is switched by the RxPower signal on line 155 from the low-frequency real time clock 119. For clarity, the power lines running from power control circuitry 1714 to the other components in FIG. 17a are not shown.

Figure 17B:
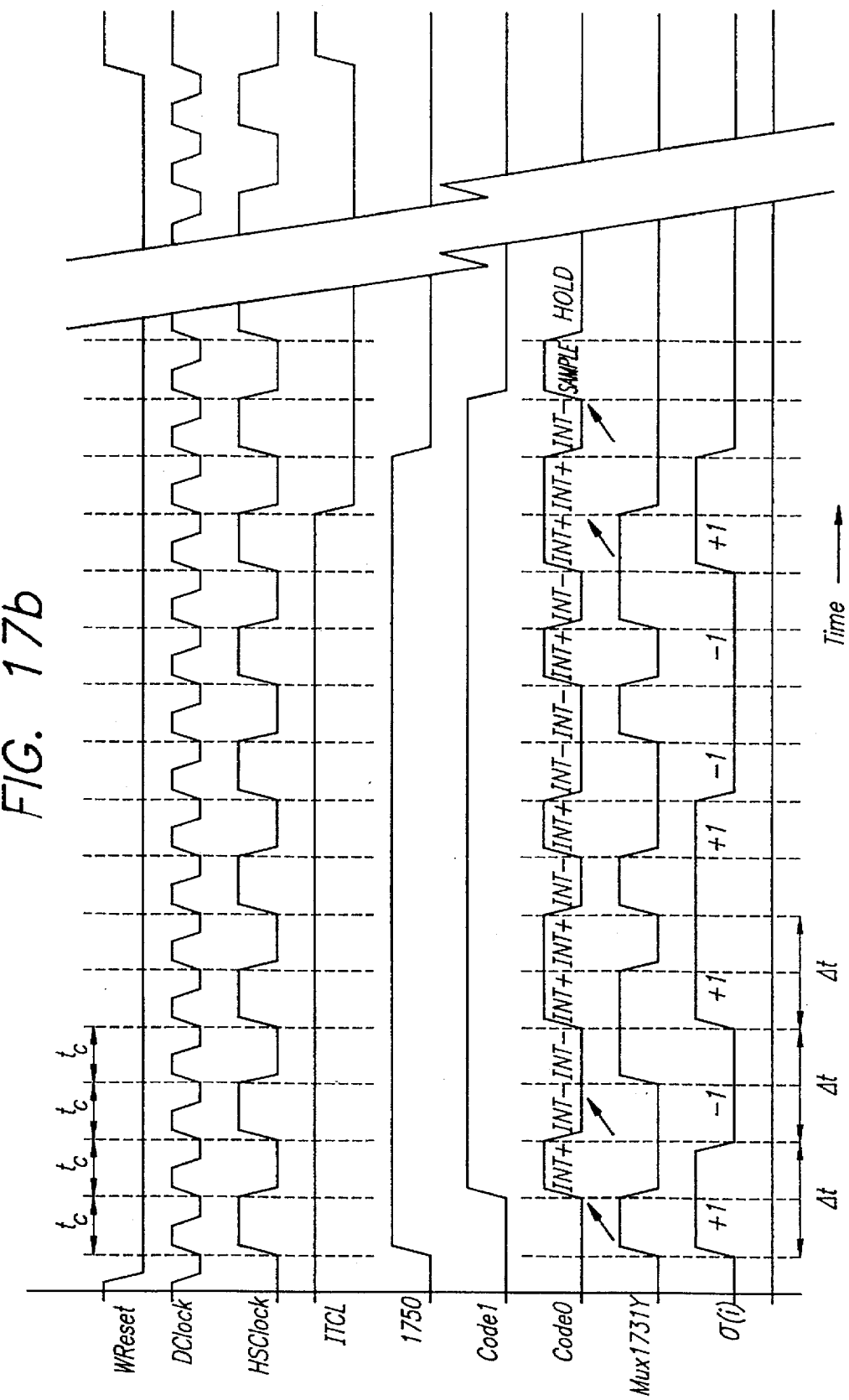

For every bit generated in the code sequence σ(i) by a linear feedback shift register 1716, two two-bit commands Code1/Code0 are sent to the time-integrating correlator 114, corresponding to one INT+ command and one INT− command. For this reason, the divide-by-two counter 1712 produces a half-speed clock signal, HSClock, on line 1741 that runs the linear feedback shift register 1716 at half the speed of the system clock signal DClock on the clock line 160. As shown in the timing chart of FIG. 17b, every time the linear feedback shift register 1716 produces one output bit of the code sequence σ(i) on line 1742, a two-bit code generation state machine circuit 1730 produces the two commands of a doublet consisting of an INT+ and an INT− command. The order of the INT+ and INT− commands is determined by the values of the bits in the code sequence σ(i) on line 1742 from the linear feedback shift register 1716. FIG. 17b shows a sample code sequence σ(i) that begins with a first code value σ(1) of positive unity, a second code value σ(2) of negative unity, and a third code value σ(3) of positive unity, etc. By means discussed below, the first three code values σ are converted to the three pairs of commands: INT+ (Code1=1, Code0=1), INT− (Code1=1, Code0=0), INT−, INT+, INT+ and INT−. The reception command sequence Code1/Code0 lags the code sequence σ by a clock tick $t_c$. As shown in FIG. 17b, the reception command sequence Code1/Code0 ends with a SAMPLE command and a string of HOLD commands.

The particular code that the linear feedback shift register 1716 produces is determined by initial seed and coefficient values provided by the processor 140 on data bus 190 before each reception event. Although the code sequence σ(i) is shown to be generated by a linear feedback shift register 1716 in FIG. 17a, there are many other ways that the code sequence σ(i) could be generated, including a random access memory or a shift register that contains the entire code. The linear feedback shift register 1716 can generate maximal sequences, Gold codes, Kasami-large codes, Kasami-small codes, BCH codes, and others. The processor 140 also loads the run length counter 1718 via data bus 190 prior to each reception event with the number of bits in the code sequence σ(i). When the reception event is complete, a terminal count signal from the TC output of the run length counter 1718 is asserted on line 1749 into a terminal count flip-flop 1724 via an OR gate 1722. The Q output from the terminal count flip-flop 1724 feeds back into the OR gate 1722 via a feedback line 1748 to force the terminal count flip-flop 1724 to stay high after the terminal count is complete. Therefore, the inverted terminal count signal, ITCL, on line 1743 from the Q-Bar output of terminal count flip-flop 1724 stays high during the generation of the code sequence σ(i), and goes low on the rising edge of the system clock DClock after the last value of the code sequence σ(i) is generated by the linear feedback shift register 1716.

While the code generation state machine circuit 1730 receives a WReset signal on the reset line 170, Code1 and Code0 are forced to zero to produce a HOLD command. An asserted reset signal WReset also causes the ITCL signal at the Q-Bar output of the terminal count flip-flop 1724 to be high. This ITCL signal on line 1743 is latched serially through the two lower state machine flip-flops 1735 and 1736. As shown in FIG. 17b, two ticks of the clock signal DClock after the WReset signal goes low, the Code1 output from the lower right state machine flip-flop 1736 goes high, and remains there until two DClock ticks after the ITCL signal from the terminal count flip-flop 1724 goes low. Since a high value of Code1 assures that the output Code1/Code0 command is either the INT+ command or the INT− command, depending on the value of Code0, the ITCL signal controls the number of ticks of the system clock DClock for which integrations occur in the integrators 1430.

Because the output of a first multiplexer 1731 in the state machine 1730 is selected by the half-speed clock signal HSClock on line 1741 from the divide-by-two clock 1712, its output will switch from the value at the 0 input to the value at the 1 input during each chip of the code sequence σ(i), producing a pair of INT commands, INT+ and INT−. As shown in FIG. 17b, during the first half of each chip, the first multiplexer 1731 passes the value from the linear feedback shift register 1716 to the upper left flip-flop 1732, which latches it and outputs the chip value on its Q terminal. During the second half of each chip, the upper left flip-flop 1732 produces at the Q output the inversion of the value from the first half of the chip by feeding the inverted output from its Q-Bar terminal back into the 1 input of the first multiplexer 1731 via a feedback line 1744. As shown in FIG. 17b, the Y output of the first multiplexer 1731 therefore changes in the middle of each value of the code sequence σ(i). The output of the second multiplexer 1733 is selected by the signal from the Q output of the lower left flip-flop 1735 via line 1750. Since the lower left flip-flop 1735 is high during a reception event until the terminal count, the second multiplexer 1733 passes the values from the upper left flip-flop 1732 through to the upper right flip-flop 1734 until two system clock DClock ticks after the terminal count from the TC output of the run length counter 1718 is asserted. The upper right flip-flop 1734 holds the Y output values from the second multiplexer 1733 for each tick of the DClock. The diagonal arrows between the code sequence σ(i) trace and the Code0 trace in FIG. 17b highlight the delay of one tick of the system clock DClock of the Code0 signal from the corresponding section in the code sequence σ(i).

One tick of the system clock DClock on line 160 after the ITCL signal on line 1743 from the Q-Bar output of the terminal count latch 1724 goes low, the Q output from the lower left flip-flop 1735 also goes low on line 1750, as shown in FIG. 17b. This causes the second multiplexer 1733 to select the high signal on the Q output of the lower right flip-flop 1736 which is directed into the 0 input of the multiplexer 1733, and to pass this on to the upper right flip-flop 1734. The output of the lower right flip-flop 1736 then goes to zero and the output of the upper right flip-flop 1734 goes to one on the next DClock tick on line 160, producing a SAMPLE command (Code0=1, Code1=0), as shown in FIG. 17b. Then the low signal input to the lower right flip-flop 1736 propagates through the second multiplexer 1733 to the Q output of the upper right flip-flop 1734 on the next tick of the system clock DClock on line 160 to provide a HOLD command (Code1=0 Code0=0). HOLD commands continue to be provided (until the next receiver event is triggered) since zeros are output from the lower flip-flops 1736 and 1736, the second multiplexer 1733 and the upper right flip-flop 1734 as long as the ITCL signal from the terminal count flip-flop 1724 continues to be low.

Detailed Description of the Time-Integrating Correlator

A time-integrating correlator according to the present invention is shown in FIG. 18. As is described in detail below, the integrators 1430 provide differential analog signals at their outputs IntOut+ and IntOut− equal to the integral of the product of the differential externally-generated signal $\Phi_e(t)^+$ and $\Phi_e(t)^-$ received at the antenna 102 and the internally-generated integration sequence $\Phi_i(t)$ delayed by the chain of D flip-flops 1460 (in the form of a two-bit reception command sequence Code1/Code0). As shown in FIG. 18, the received differential antenna signals $\Phi_e(t)^+$ and $\Phi_e(t)^-$ on the input differential signal lines 125 and 126 are directed to input terminals IntIn+ and IntIn− of the sixteen rising-edge integrators 1430r.1 through 1430r.16 (of which only the first two rising-edge integrators 1430r.1 and 1430r.2 and the last rising-edge integrator 1430r.16 are explicitly shown) and sixteen falling-edge integrators 1430f.1 through 1430f.16 (of which only the first two falling-edge integrators 1430f.1 and 1430f.2 and the last falling-edge integrator 1430f.16 are explicitly shown). For notational convenience similar components which share a first portion of their reference numerals will be referred to generally or collectively using only that first portion of the reference numeral. For example, the rising-edge integrators 1430r.1 through 1430r.16 may be referred to as "rising-edge integrators 1430r," or the rising-edge and falling-edge integrators 1430r and 1430f may be referred to as "integrators 1430." Similarly, when the particular integrator is immaterial, it will be referred to as "the integrator 1430." As discussed below, the rising-edge integrators 1430r and the falling-edge integrators 1430f are so named because the input to the rising-edge integrators 1430r changes on the rising-edge of the system clock signal DClock and the input to the falling-edge integrators 1430f changes on the falling-edge of the system clock signal DClock.

A reference voltage line 1422 provides supply voltage Vmid to the reference voltage inputs Vmid of the integrators 1430. (The ground and power buses are not shown in the figure.) The Reset inputs of the integrators 1430 are connected to a reset line 170 which carries the WReset signal. When the WReset signal goes high the voltages stored in the capacitors in the integrators 1430 are cleared to zero (as will be discussed in detail below). A gain control signal IGain on gain control line 136 supplied to the Gain inputs of the integrators 1430 controls the gain of the integrators 1430 according to the expected length of the received code sequence $\Phi_e(t)$ so that the peak output voltage across the output terminals IntOut+ and IntOut− can be maintained at an approximately constant level.

The reception command sequence Code1/Code0 on lines 132 and 133 is directed to a delay line of flip-flips 1460 as a two-bit signal, having first bit Code1 on line 133 and second bit Code0 on line 132. The system clock signal DClock is supplied via a clock line 160 to the clock inputs (represented by triangles on the left edges of the flip-flops) of the rising-edge flip-flops 1460r. The rising-edge flip-flops 1460r trigger on the rising edge of the system clock signal DClock. The clock inputs of the falling-edge flip-flops 1460f are inverted (represented by the small circles next to the clock inputs), so they trigger on the falling edges of the system clock signal DClock.

The Q outputs of the first pair of rising-edge flip-flops 1460r.1.1 and 1460r.1.2 are connected to the D inputs of the second pair of rising-edge flip-flops 1460r.2.1 and 1460r.2.2, and to the D inputs of a first pair of falling-edge flip-flops 1460f.1.1 and 1460f.1.2, respectively. In general, the Q outputs of the $n^{th}$ pair of rising-edge flip-flops 1460r.n.1 and 1460r.n.2 are connected to the D inputs of the $(n+1)^{th}$ pair of rising-edge flip-flops 1460r.(n+1).1 and 1460r.(n+1).2, and to the D inputs of the $n^{th}$ pair of falling-edge flip-flops 1460f.n.1 and 1460f.n.2, respectively. However, the Q outputs of the sixteenth pair of rising-edge flip-flops 1460r.16 are connected to the D inputs of a pair of terminating flip-flops 1461. The rising-edge flip-flops 1460r act as a shift array, shifting the two-bit command sequence Code1 and Code0 through the rising-edge flip-flops 1460r by one flip-flop per rising edge of the system clock Dclock. On the falling edges of the system clock Dclock the output of the nth rising-edge flip-flop 1460r.n is shifted through the nth falling-edge flip-flop 1460f.n. Therefore, the falling-edge flip-flops 1460f act as another shift array, effectively shifting the two-bit command sequence Code1 and Code0 through by one flip-flop per falling edge of the system clock signal Dclock. (It should be noted that there are other ways of constructing chains of flip-flops to produce the same result, such as connecting the outputs of the nth stage of falling-edge flip-flops to the inputs of the (n+1)th stage of rising-edge flip-flops.)

The Q outputs of the rising-edge flip-flops 1460r.n.1 and 1460r.n.2 are directed to the command sequence inputs Code1 and Code0 of the rising-edge integrators 1430r.n, respectively, thereby providing taps of the shift array produced by the rising-edge flip-flops 1460r. Similarly, the Q outputs of the falling-edge flip-flops 1460f.n.1 and 1460f.n.2 are directed to the command sequence inputs Code1 and Code0 of the falling-edge integrators 1430f.n, respectively, thereby providing taps of the shift array produced by the falling-edge flip-flops 1460f. As discussed earlier, when the command sequence Code1 and Code0 at the Code1/Code0 input of an integrator 1430 has a binary value of "11" the externally-generated signal $\Phi_e(t)$ is multiplied by +1 and integrated, and the integration signal $\Phi_i(t)$ is said to have a value of positive one; when the command sequence Code1 and Code0 at the Code1/Code0 input of an integrator 1430 has a binary value of "10" the externally-generated signal $\Phi_e(t)$ is multiplied by −1 and integrated, and the integration signal $\Phi_i(t)$ is said to have a value of negative one; when the command sequence Code1 and Code0 at the Code1/Code0 input of an integrator 1430 has a binary value of "01" the value of the integral calculated by the integrator 1430 is transferred to the output terminals Intout+ and IntOut− of the integrator 1430; and when the command sequence Code1 and Code0 at the Code1/Code0 input of an integrator 1430 has a binary value of "00," the integrator circuit 1430 holds its internal value constant, and the integration sequence $\Phi_i(t)$ is said to have a value of zero. When the command sequence Code1/Code0 value of "01" reaches the terminal flip-flops 1461, the AND gate 1453 activates the Rxstop signal on receive stop line 142.

The output terminals IntOut+ and IntOut− of the rising-edge integrators 1430r.1 through 1430r.16 are connected to the input terminals MuxIn+ and MuxIn− of analog rising-edge multiplexers 1450r.1 through 1450r.16, and the output terminals IntOut+ and IntOut− of the falling-edge integrators 1430f.1 through 1430f.16 are connected to the input terminals MuxIn+ and MuxIn− of analog falling-edge multiplexers 1450f.1 through 1450f.16, respectively. When the $n^{th}$ multiplexer 1450 is selected by the processor 140 via the data bus 190, the input to the $n^{th}$ multiplexer 1450 at input terminals MuxIn+ and MuxIn− is individually transferred to the output terminals MuxOut+ and MuxOut− where it is amplified by an amplifier 1452 to provide differential outputs $\Lambda(n)^+$ and $\Lambda(n)^-$ at the correlator output terminals 127 and 128. The difference of the differential outputs $\Lambda(n)^+$ and $\Lambda(n)^-$ is equal to the $n^{th}$ bin value of the discrete-time pseudo-autocorrelation (DTPAC) function $\Lambda(n)$.

Figure 19:
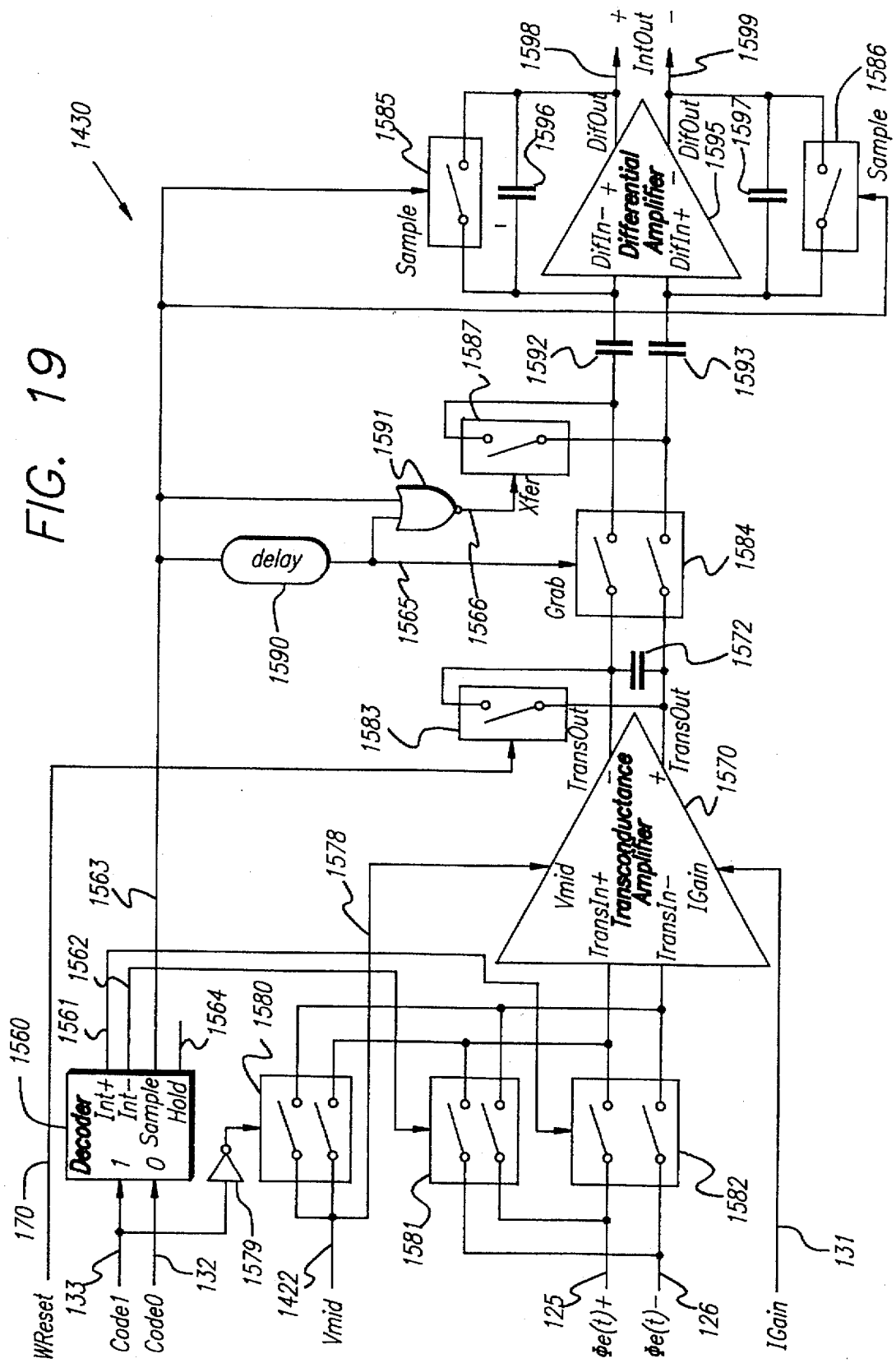
FIG. 19 is a schematic diagram of one of the integrator circuits used in the time integrating correlator.

The circuitry of the rising-edge and falling-edge integrators 1430 is the same, and is shown in detail in FIG. 19. Integrators are often implemented using an operational amplifier with a capacitor in the feedback path to the inverting input node. A resistor is connected from the same node to the voltage signal to be integrated. Because the op-amp maintains the inverting input node at a constant virtual ground voltage, the current through the resistor is proportional to the signal voltage. The op-amp balances the current through the resistor against the current into the capacitor. Integrators implemented in this fashion are highly accurate, but limited by the compensated frequency response of the amplifier. In contrast, in the preferred embodiment of the present invention the integrator uses a transconductance amplifier which does not rely on the features of high voltage gain and feedback which create the response limitations of an op-amp integrator. Furthermore, FETs in the transconductance amplifier of the preferred embodiment naturally convert input voltages to output currents, so by taking advantage of this natural mode of operation of CMOS devices the transconductance amplifier operates with times on the order of one nanosecond. This is to be compared with the operation time of operational amplifiers which is typically on the order of a hundred nanoseconds. Operation times on the order of a nanosecond are necessary since the system clock DClock changes its value every 2.5 nanoseconds.

As shown in FIG. 19, in each integrator 1430 the delayed command signals Code1 and Code0 are directed via code input lines 133 and 132 to a decoder 1560. Code1 and Code0 are binary signals and therefore the pair of signals represents four states. When Code1=1 and Code0=0, the integration sequence $\Phi_i(t)$ is considered to have a value of negative unity and this value is multiplied with the received externally-generated signal $\Phi_e(t)$ by inverting the polarity of the signal prior to integration. When Code1=1 and Code0=1, the integration sequence $\Phi_i(t)$ is considered to have a value of positive unity, and by leaving the received externally-generated signal $\Phi_e(t)$ unaltered the signal $\Phi_e(t)$ is multiplied by unity prior to integration. When Code1=0 and Code0=1, the integrator circuit 1430 produces as an output across output terminals Intout+ and Intout− the value of the integral of the product of the integration sequence $\Phi_i(t)$ and the externally-generated received signal $\Phi_e(t)$ by sampling the amount of charge on an internal capacitor (as explained below). Between integration and sampling operations (and in some doublets as discussed below) the values Code1=0 and Code0=0 are directed to the integrators 1430, causing them to hold their output values without sampling and therefore being equivalent to the multiplication of the externally-generated received signal $\Phi_e(t)$ by zero and summing, i.e., the integration sequence $\Phi_i(t)$ is considered to have a value of zero.

When the integration sequence $\Phi_i(t)$ has a value of positive unity (Code1=1 and Code0=1), the decoder 1560 sends a signal from an Int+ output terminal via a lead 1561 to a noninverting switch 1582 which directs the positive component of the differential received signal $\Phi_e(t)^+$ on input lead 125 to the positive input terminal TransIn+ of a transconductance amplifier 1570, and directs the negative component of the differential received signal $\Phi_e(t)^-$ on input lead 126 to the negative input terminal TransIn− of the transconductance amplifier 1570. Similarly, when the integration sequence $\Phi_i(t)$ has a value of negative unity (Code1=1 and Code0=0), the decoder 1560 sends a signal from an Int− output terminal via a lead 1562 to an inverting switch 1581 which directs the positive component of the differential received signal $\Phi_e(t)^+$ on input lead 125 to the negative input terminal TransIn− of the transconductance amplifier 1570, and directs the negative component of the differential received signal $\Phi_e(t)^-$ on input lead 126 to the positive input terminal TransIn+ of the transconductance amplifier 1570. Whether the internally-generated integration sequence $\Phi_i(t)$ has a value of positive unity or negative unity, the value of Code1 is unity, so after passing through inverter 1579, the signal to a hold switch 1580 is low and the hold switch 1580 remains open and does not affect the input to the transconductance amplifier 1570.

The transconductance amplifier 1570 converts a differential input voltage across inputs TransIn+ and TransIn− to a proportional output current across output TransOut+ and TransOut−. The amplification provided by the transconductance amplifier 1570 is controlled by signal IGain directed via an input line 131 to the IGain input of the amplifier 1570. The reference voltage Vmid, directed via a lead 1422 to the Vmid input of the transconductance amplifier 1570, is a reference voltage with a value equal to the ideal average of the differential received signals $\Phi_e(t)^+$ and $\Phi_e(t)^-$.

The current from the output terminals TransOut+ and TransOut− of the amplifier 1570 charges an integration capacitor 1572 connected across the output terminals TransOut⁺ and TransOut⁻ of the amplifier 1570, so the voltage across integration capacitor 1572 is proportional to the integral of the voltage across the input terminals TransIn⁺ and TransIn⁻ of the amplifier 1570. Ideally the transconductance amplifier 1570 would have infinite (Norton equivalent) output impedance, so that the output current is independent of the voltage across the output terminals TransOut⁺ and TransOut⁻. In practice, the output impedance is finite, and when a voltage appears across the integration capacitor 1572 some of the charge on the integration capacitor 1572 is drained off through the outputs TransOut of the transconductance amplifier 1570. During the period of approximately ten microseconds when an externally-generated code sequence $\Phi_e(t)$ is received, the voltage drain is only a few percent. However, if steps were not taken to prevent such voltage losses, significant charge would drain from the integration capacitor 1572 during the time on the order of 100 microseconds that it takes for the processor 140 to digitize the correlation results from all the integrators 1430.

When the input to the decoder 1560 is a Hold signal (Code1=0, Code0=0), the low value of Code1 is inverted by inverter 1579 to provide a high value to close the hold switch 1580. With the hold switch 1580 closed, the voltage applied to both inputs TransIn⁺ and TransIn⁻ of the transconductance amplifier 1570 is the reference voltage Vmid. Since the same voltage is applied to both inputs TransIn of the transconductance amplifier 1570, the amplifier 1570 does not produce an output current, the charge across the integration capacitor 1572 is unaffected, and the integration sequence $\Phi_i(t)$ is considered to have a value of zero.

When the input to the decoder 1560 corresponds to a Sample signal (Code0=1, Code1=0), again the Code1 value is low and the hold switch 1580 provides the voltage Vmid to both the inputs TransIn⁺ and TransIn⁻ of the transconductance amplifier 1570, so the charge across the output capacitor 1572 is unaffected. Also, the decoder 1560 switches the Sample output to high. The Sample output is directed to a delay unit 1590, a first input of a NOR gate 1591, and two feedback-capacitor shorting switches 1585 and 1586. The output of the delay 1590 is directed to the Grab input of a charge transfer switch 1584. When closed, the charge transfer switch 1584 connects the integration capacitor 1572 in series with two sampling capacitors 1592 and 1593. The output of the delay 1590 is also directed to a second input of the NOR gate 1591, and the output of the NOR gate 1591 is directed to a sampling-capacitors connection switch 1587 which connects the two sampling capacitors 1592 and 1593 in series.

Because the output impedance of the transconductance amplifier 1570 is finite and the charge across the integration capacitor 1572 decays by leaking through the transconductance amplifier 1570, the integrator circuit 1430 must determine the voltage across the integration capacitor 1572 on a time scale fast relative to this decay. (In the preferred embodiment the integrator circuit 1430 determines the charge across the integration capacitor 1572 in approximately five nanoseconds.)

As shown in the timing chart of FIG. 20, when the Sample output of the decoder 1560 is asserted, the Grab signal on line 1565 also goes high after a delay induced by the delay unit 1590. Also, the output Xfer of the NOR gate 1591 on line 1566 goes from high to low shortly after the Sample signal goes from low to high, but before the Grab signal goes from low to high. Therefore, prior to the Sample signal going high the feedback-capacitor shorting switches 1585 and 1586 are open, the charge transfer switch 1584 is open, and the sampling-capacitors connection switch 1587 is closed. When the Sample signal first goes high the feedback-capacitor shorting switches 1585 and 1586 close, connecting the positive input DifIn⁺ to the negative output DifOut⁻, and the negative input DifIn⁻ to the positive output DifOut⁺ of the differential amplifier 1595, forcing a virtual connection of DifIn⁺ and DifIn⁻ (i.e., a differential voltage of zero). After the high Sample signal passes through the NOR gate 1591 the sampling-capacitors connection switch 1587 opens. Then, after a delay induced by the delay unit 1590 the signal to the Grab input of the charge transfer switch 1584 goes high and the charge transfer switch 1584 closes so that a precise portion of the charge on the integration capacitor 1572 (determined by the ratio of the capacitance of the integration capacitor 1572 to the sum of the capacitances of the sampling capacitors 1592 and 1593) is transferred to the sampling capacitors 1592 and 1593 which are effectively in series. Because the inputs DifIn⁺ and DifIn⁻ of the differential amplifier 1595 are shorted to the outputs Difout⁻ and DifOut⁺, respectively, the voltage differential across the inputs DifIn is held at zero. When the Sample signal returns low the feedback-capacitor shorting switches 1585 and 1586 open. Then, after a delay induced by the delay unit 1590 the Grab signal goes low causing the charge transfer switch 1584 to open and the sampling-capacitors connection switch 1587 to close. Now a charge on sampling capacitors 1592 and 1593 proportional to the charge that had accumulated on the integration capacitor 1572 is present across the inputs DifIn of the differential amplifier 1595. The voltage at the outputs Difout of the differential amplifier 1595 will change to place an equal and opposite charge on the feedback capacitors 1596 and 1597, and bring the differential voltage at the inputs DifIn of the differential amplifier 1595 to zero. The voltage change required to do this is equal to the charge on the sampling capacitors 1592 and 1593 times the ratio of the values of the capacitances of the sampling capacitors 1592 and 1593 to the capacitances of the feedback capacitors 1596 and 1597. This ratio is selected to provide the desired amplification factor. The resulting voltages on the outputs DifOut of the differential amplifier 1595 are connected to the outputs IntOut⁺ and IntOut⁻ of the integrator circuit 1430 on lines 1598 and 1599 to provide an amplified value of the integral of the product of the internally-generated integration sequence $\Phi_i(t)$ and the received externally-generated signal $\Phi_e(t)$.

After a receive event is completed, the outputs of the integrators 1430 are selected by the multiplexers 1450, and the WReset signal on the reset bus 170 is asserted, causing an integration-capacitor shorting switch 1583 connected across the integration capacitor 1572 to close, thereby zeroing the charge on the integration capacitor 1572. When the WReset signal is asserted, the Code1 bit is held low so that hold switch 1580 is closed and the transconductance amplifier 1570 does not produce an output current. As discussed above, the WReset signal is unasserted just before a reception command sequence Code1 and Code0 is shifted into the first integrator 1430r.1.

Detailed Description of the Transmitter Code-Sequence Generator

Figure 21A:
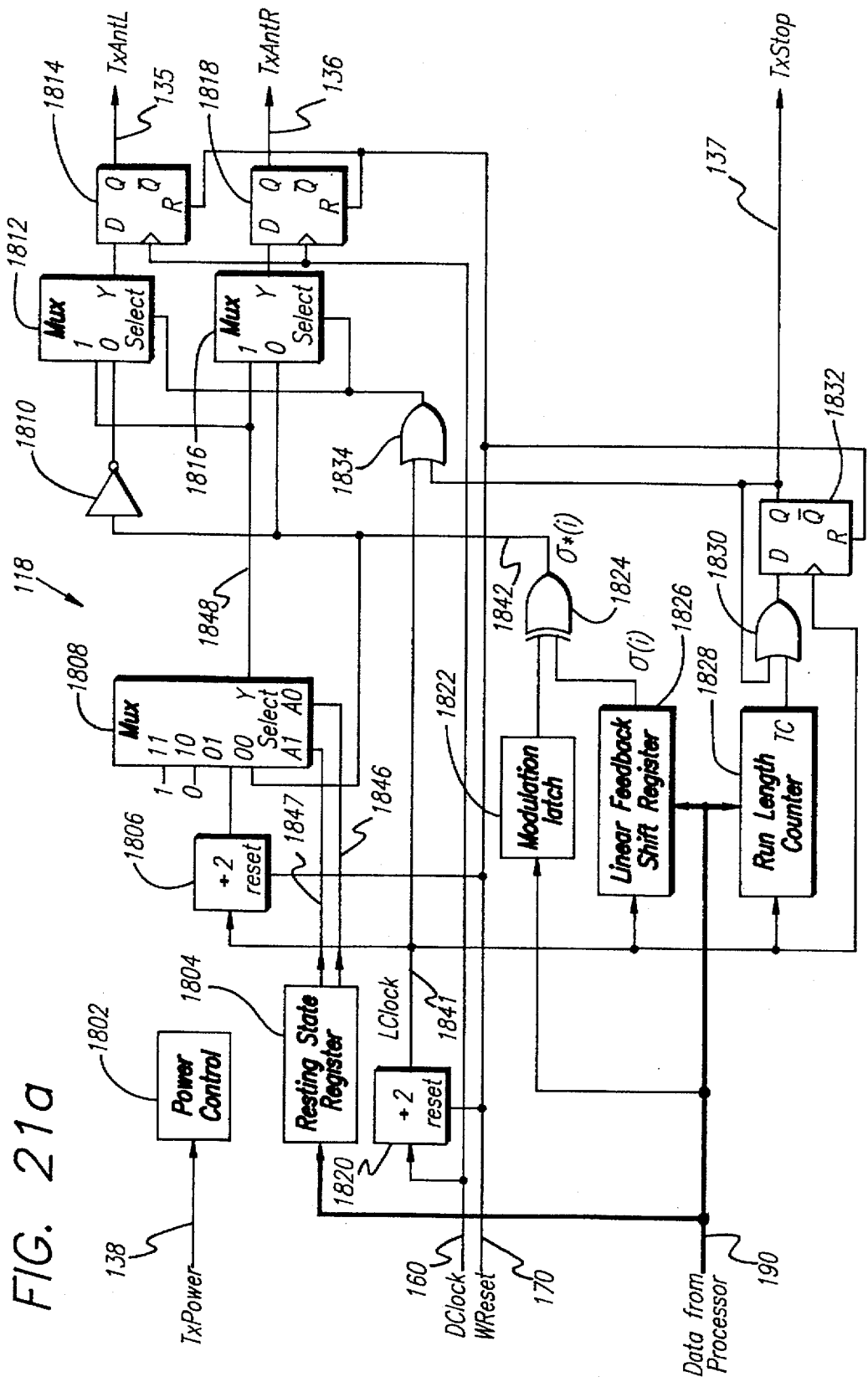
FIG. 21a is a schematic diagram of a transmitter code-sequence generator.

The transmitter code-sequence generator 118 is shown in detail in FIG. 21a, and timing charts FIGS. 21b–e show the values of WReset, DClock, LClock, TxStop, the code sequence σ(i), the output from multiplexer 1808, TxAntL, TxAntR and the transmitted signal $\Phi_a(t)$ for four different values in a resting state register 1804 of the transmitter code-sequence generator 118. During a transmission event, this circuit 118 generates a code sequence $\sigma_i(i)$ from parameters initialized by the processor 140 via data bus 190. The code sequence $\sigma(i)$, a string of ones and zeroes, is converted into a two-bit transmission command sequence, TxAntL on line 135 and TxAntR on line 136, that causes the transmitter driver circuit 116 (which is discussed in detail below) to produce the transmitted signal. Although the code sequence $\sigma(i)$ can be generated by a linear feedback shift register 1826 as shown in FIG. 21a, there are many other ways that the code sequence $\sigma(i)$ could be generated, including a shift register or a random access memory. The switching elements of the transmitter code-sequence generator 118 (i.e., every element except a power control unit 1802, the modulation latch 1822, and the resting state register 1804) utilize low-noise current-steering logic to prevent them from generating power supply and radio frequency noise while in operation. Because this low-noise logic has a large power consumption, the transmitter code-sequence generator 118 is disabled when not in use by power control circuitry 1802 according to the TxPower signal on line 138. For clarity, the power lines from the power control circuit 1802 are not shown.

For every bit in the code sequence $\sigma(i)$ the transmitter driver 116 produces the two Gaussian impulses of a doublet. A first divide-by-two counter 1820 reduces the frequency of clock pulses on line 160 by two to produce a half-speed clock signal LClock on line 1841. As shown in FIGS. 21b–21e, the half-speed clock signal LClock changes value for each rising edge of the system clock DClock. The half-speed clock signal LClock clocks the linear feedback shift register 1826 to produce one code value $\sigma(i)$ for every two ticks of the system clock DClock. As an example, in FIGS. 21b–21e the code values $\sigma(i)$ are shown to be +1, −1, +1, +1, −1, −1 and +1, and it is assumed that the code values $\sigma(i)$ are not modulated by the modulation latch 1822, i.e., the value in the modulation latch 1822 is zero.

Modulation latch 1822 and XOR gate 1824 are used to encode a message onto a string of pseudorandom sequences $\sigma(i)$ generated by the linear feedback shift register 1826, using a technique called "antipodal modulation." Before each transmission event, the processor 140 loads the modulation latch 1822 via data bus 190 with a single bit value. If the bit supplied by the modulation latch 1822 is zero, the XOR gate 1824 does not invert the code sequence $\sigma(i)$, and the unchanged code sequence $\sigma(i)$ is passed through as the modulated code sequence $\sigma^*(i)$ on line 1842, as shown in FIGS. 21b–e. However, when a bit supplied by modulation latch 1822 is one, the XOR gate 1824 causes the code sequence $\sigma(i)$ passed through as the modulated code sequence $\sigma^*(i)$ on line 1842 to be inverted. Other modulation techniques, such as phase modulation, can be used alone or in conjunction with antipodal modulation in the current invention. For ease of presentation, in the following discussion of the transmitter code-sequence generator 118 it will be assumed that the code-sequence $\sigma(i)$ is unmodulated, i.e., $\sigma(i)=\sigma^*(i)$.

The length of the code sequence $\sigma(i)$ is controlled by run length counter 1828. The processor 140 loads this counter 1828 via data bus 190 with the length of the code sequence $\sigma(i)$ before a transmission event begins. A counter OR gate 1830 located at the terminal count output TC directs its output to the D input of a counter flip-flop 1832. The Q output of the counter flip-flop 1832 is directed via TxStop line 137 to the other input of the counter OR gate 1830. This insures that the TxStop signal on transmission stop line 137 stays high after the run length counter 1828 reaches its terminal count and the terminal count output TC is asserted, until the WReset signal on line 170 is asserted to set the output of the counter flip-flop 1832 to zero.

As discussed below, the shape of the transmitted chip signals $\sigma_e(t)$ can be affected by the resting state of the transmission command sequence values TxAntL and TxAntR on lines 135 and 136. The resting state is determined by the bits which are loaded by processor 140 via the data bus 190 into the resting-state register 1804 before a transmission event. These two bits are passed via resting state select lines 1846 and 1847 to the A0 and A1 inputs of a resting state multiplexer 1808 to select one of four different resting state options and outputs. The resting state multiplexer 1808 produces a resting state signal at its Y output on line 1848 based on its inputs.

Figure 21B:
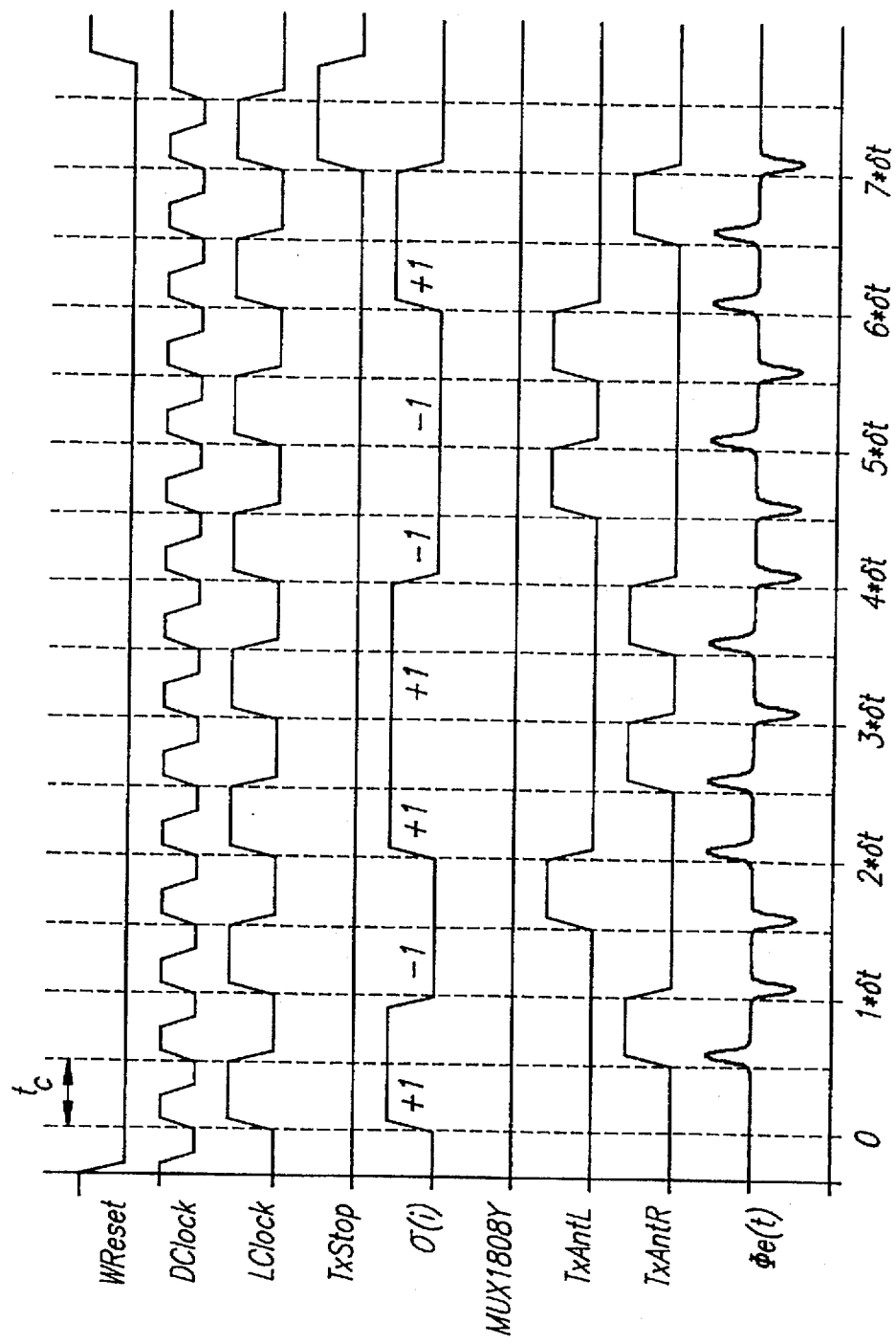
FIGS. 21b–21e show timing charts for the transmitter code-sequence generator for four possible resting state register values.
Figure 21C:
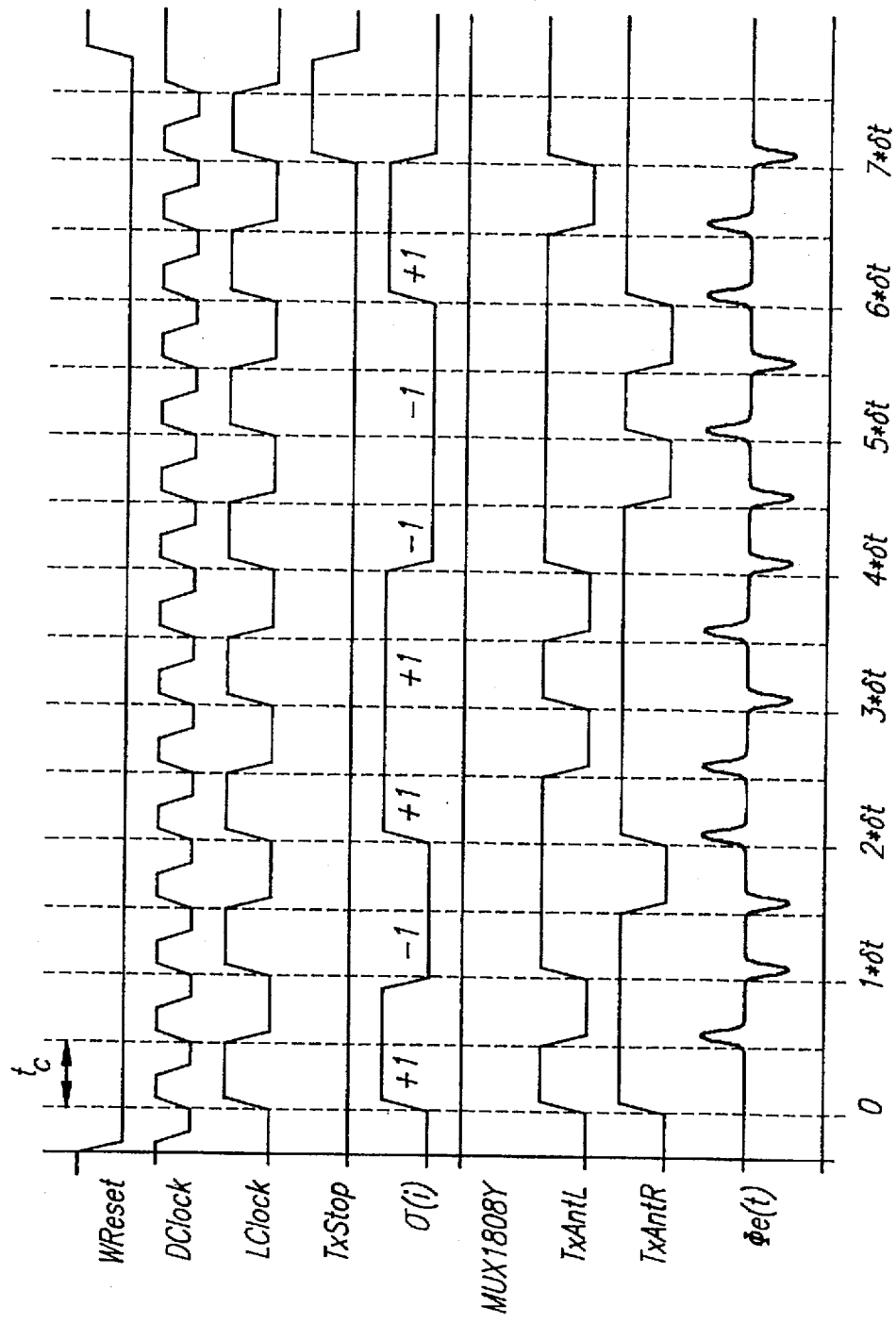
Figure 21D:
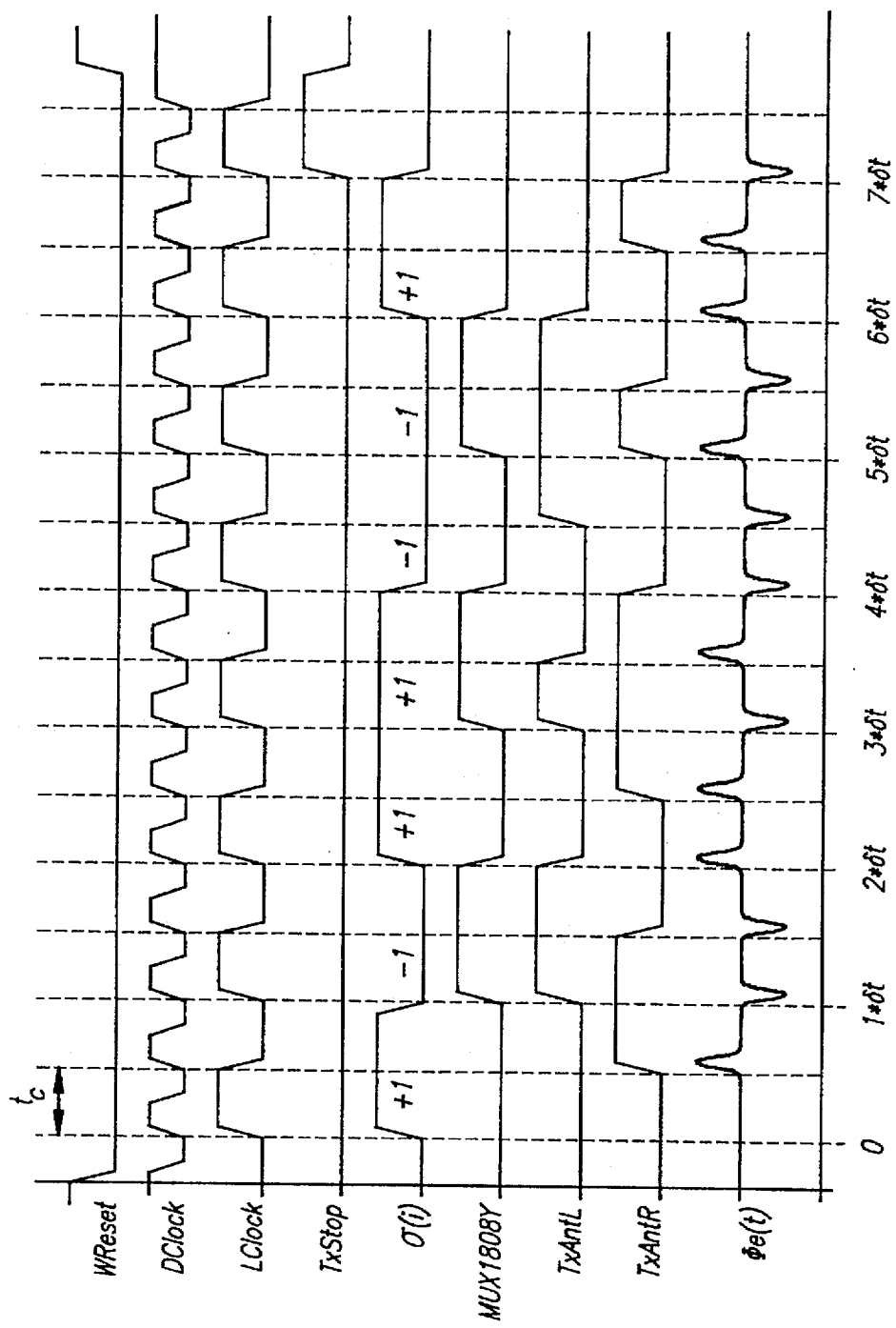

When the signal to the A1 input is one and the signal to the A0 input is zero, the signal at the Y output of the resting-state multiplexer 1808 is zero, as shown in FIG. 21b, and in every other $\delta t/2$ period the values of both TxAntL and TxAntR are low. When the signals to the A1 and A0 inputs of the resting state multiplexer 1808 are both one, the signal at the Y output is one, as shown in FIG. 21c, and in every other $\delta t/2$ period the values of both TxAntL and TxAntR are high. But since asymmetries and resistive losses in the circuit cause a small residual field in the antenna 101 after every doublet, if the same resting state is used after each doublet this residual field may accumulate. This effect can be minimized by alternating between the two resting states within the same code sequence $\sigma(i)$. A first method of alternating resting states is implemented when the signal to the A1 input is zero and the signal to the A0 input is one. In this case the output from a second divide-by-two counter 1806 is selected by the resting-state multiplexer 1808. The second divide-by-two counter 1806 has as its input the output LClock of the first divide-by-two counter 1820, so that the output of the multiplexer 1808 alternates between zero on odd chips and one on even chips, as shown in FIG. 21d. A second way of alternating resting states is implemented when the signals to the A1 and A0 inputs of the resting state multiplexer 1808 are both zero. This selection causes the resting state to be data dependent since the code sequence $\sigma(i)$ (assuming the value in the modulation latch 1822 is zero) output from the XOR gate 1824 is directed to the 00 input of the resting-state multiplexer 1808, so the output of the resting-state multiplexer 1808 is the same as the code sequence $\sigma(i)$ as shown in FIG. 21d. In the preferred embodiment of the invention, the linear feedback shift register 1826 produces balanced codes, i.e., codes which have an almost equal number of one and zero bits, (such as maximal sequences, Gold codes, Kasami-large codes, Kasami-small codes and BCH codes) so the average time spent in the high resting state is equal to the average time spent in the low resting state when A1 and A0 are zero.

A transmitter-enable OR gate 1834 forces the transmitter multiplexers 1812 and 1816 to output the resting state provided at their 1 inputs when the transmitter is stopped by a high signal at the terminal count output TC of the run length counter 1828. During a transmission event, the transmitter-enable OR gate 1834 allows the transmitter multiplexers 1812 and 1816 to alternate between the rest state and the code sequence states by passing the half-speed clock signal LClock on line 1841 through the transmitter-enable OR gate 1834 and directing it to the Select inputs of the transmitter multiplexers 1812 and 1816. The half-speed clock signal LClock is high for the first half of each chip, so the transmitter multiplexers 1812 and 1816 pass a resting state through to the output flip-flops 1814 and 1818 to be latched as the TxAntL and TxAntR signals on lines 135 and 136, respectively.

When the half-speed clock signal LClock is low for the second half of each chip, the transmitter multiplexers 1812 and 1816 select the inverted and non-inverted code sequence values σ(i) at the 0 inputs to provide antenna signals TxAntL and TxAntR on lines 135 and 136, respectively. The bottom transmitter multiplexer 1816 uses the code sequence σ(i) directly. The top transmitter multiplexer 1812 receives a code sequence σ(i) which is inverted by the left antenna inverter 1810 so that the values to the 0 inputs of the output multiplexers 1812 and 1816 are always different. Therefore during the first half of each chip one of TxAntL and TxAntR values will always be equal to the resting state when the other one is not.

FIG. 21b shows a timing chart for the transmitter code-sequence generator 118 when the resting state register 1804 values are A1=1 and A0=0. As shown in FIG. 21b, the antenna signals TxAntL and TxAntR are low prior to time zero since WReset is asserted until shortly before time zero. At the beginning of the first chip (at time zero) when the code sequence value σ(1) is high, the antenna signals TxAntL and TxAntR remain low since the high value of the half-speed clock LClock causes the output multiplexers 1812 and 1816 to select the values provided at their 1 inputs. When the half-speed clock LClock goes low at the beginning of the second half of the first chip (at time δt/2), the output multiplexers 1812 and 1816 then select the inverted and non-inverted values of the code sequence σ(1) at their 0 inputs, so the right antenna signal TxAntR goes high. This causes current to flow from right to left in the antenna, producing an impulse of a first polarity (which will henceforth be considered to be a positive polarity), as shown in FIG. 21a, in the transmitted signal $\Phi_e(t)$ shortly after time δt/2. At the beginning of the next chip (at time δt) the half-speed clock LClock goes from low to high, again selecting the resting state at the 1 inputs of the output multiplexers 1812 and 1816. This causes the right antenna signal TxAntR to again go low, producing no voltage differential across the antenna 101, so that the current which had previously flowed from right to left stops and the transmitted signal $\Phi_e(t)$ has an impulse of negative polarity shortly after time δt. At time 1.5*δt the half-speed clock LClock again goes low, so that the output multiplexers 1812 and 1816 select the inverted and non-inverted code sequence value σ(2) of the second chip. This causes the left antenna signal TxAntL to go high, generating current from left to right in the antenna 101 to produce an impulse of negative polarity shortly after time 1.5*δt. The selection of the resting state followed by the code sequence values σ(i) continues until the end of the code sequence σ(i) when the TxStop signal on line 137 is asserted. Subsequent to this the WReset signal is asserted and the DClock signal goes high.

FIG. 21c shows a timing chart for the transmitter code-sequence generator 118 when the resting state register 1804 values are A1=1 and A0=1. As shown in FIG. 21c, the antenna signals TxAntL and TxAntR are low prior to time zero since WReset is asserted (i.e., high). When WReset goes low, the antenna signals TxAntL and TxAntR go high since the Y output of the resting-state multiplexer 1808 is high. Since both antenna signal TxAntL and TxAntR change value at the same time, no impulses are generated in the transmitted signal $\Phi_e(t)$ at this point. When the half-speed clock LClock goes low midway through the first chip (at time δt/2), the output from the OR gate 1834 causes the output multiplexers 1812 and 1816 to select the inverted and non-inverted values of the code sequence σ(1) provided at their 0 inputs so the left antenna signal TxAntL goes low. This causes current to flow from right to left in the antenna (as was the case in FIG. 21b), producing an impulse of positive polarity in the transmitted signal $\Phi_e(t)$ shortly after time δt/2 (again, as in FIG. 21b). At the beginning of the next chip (at time δt) the half-speed clock LClock goes from low to high, again selecting the resting state provided at the 0 inputs of the output multiplexers 1812 and 1816 by the resting-state multiplexer 1808. This causes the left antenna signal TxAntL to again go high, producing an impulse of negative polarity in the transmitted signal $\Phi_e(t)$ shortly after time δt. At time 1.5*δt the half-speed clock LClock again goes low, so that the output multiplexers 1812 and 1816 select the inverted and non-inverted code sequence value σ(2)=−1 of the second chip. This causes the right antenna signal TxAntR to go low, generating current from left to right in the antenna 101 to produce an impulse of negative polarity shortly after time 1.5*δt (as was the case in FIG. 21b). The selection of the resting state followed by the code sequence values σ(i) continues until the end of the code sequence σ(i) when the TxStop signal on line 137 is asserted. Subsequent to this the WReset signal is asserted and DClock signal goes high.

FIG. 21d shows a timing chart for the transmitter code-sequence generator 118 when the resting state register 1804 values are A1=0 and A0=1. As shown in FIG. 21d, the antenna signals TxAntL and TxAntR are low prior to time zero since WReset is asserted until shortly before time zero. At the beginning of the first chip (at time zero) when the code sequence value σ(1) is high, the antenna signals TxAntL and TxAntR remain low since the second divide-by-two unit 1806 provides a low value which is output from the resting-state multiplexer 1808, and the high value of the half-speed clock LClock causes the output multiplexers 1812 and 1816 to select the values provided at their 1 inputs. When the half-speed clock LClock goes low at the beginning of the second half of the first chip (at time δt/2), the output multiplexers 1812 and 1816 then select the inverted and non-inverted values of the code sequence σ(1) at their 0 inputs, so the right antenna signal TxAntR goes high. This causes current to flow from right to left in the antenna, producing an impulse of a first polarity in the transmitted signal $\Phi_e(t)$ shortly after time δt/2, as shown in FIG. 21d (and as was the case in FIGS. 21b and 21c). At the beginning of the next chip (at time δt) the half-speed clock LClock goes from low to high, again selecting the resting state at the 1 inputs of the output multiplexers 1812 and 1816. Since the divide-by-two counter 1806 now provides a high value to the resting-state multiplexer 1808, this causes the left antenna signal TxAntL to go high, producing no voltage differential across the antenna 101, so that the current which had previously flowed from right to left stops and the transmitted signal $\Phi_e(t)$ has an impulse of negative polarity shortly after time δt. At time 1.5*δt the half-speed clock LClock again goes low, so that the output multiplexers 1812 and 1816 select the inverted and non-inverted code sequence value σ(2) of the second chip, respectively. This causes the right antenna signal TxAntR to go low, generating current from left to right in the antenna 101 to produce an impulse of negative polarity shortly after time 1.5*δt. The selection of the resting state followed by the code sequence values σ(i) continues until the end of the code sequence σ(i) when the TxStop signal on line 137 is asserted. Subsequent to this the WReset signal is asserted and the DClock signal goes high.

Figure 21E:
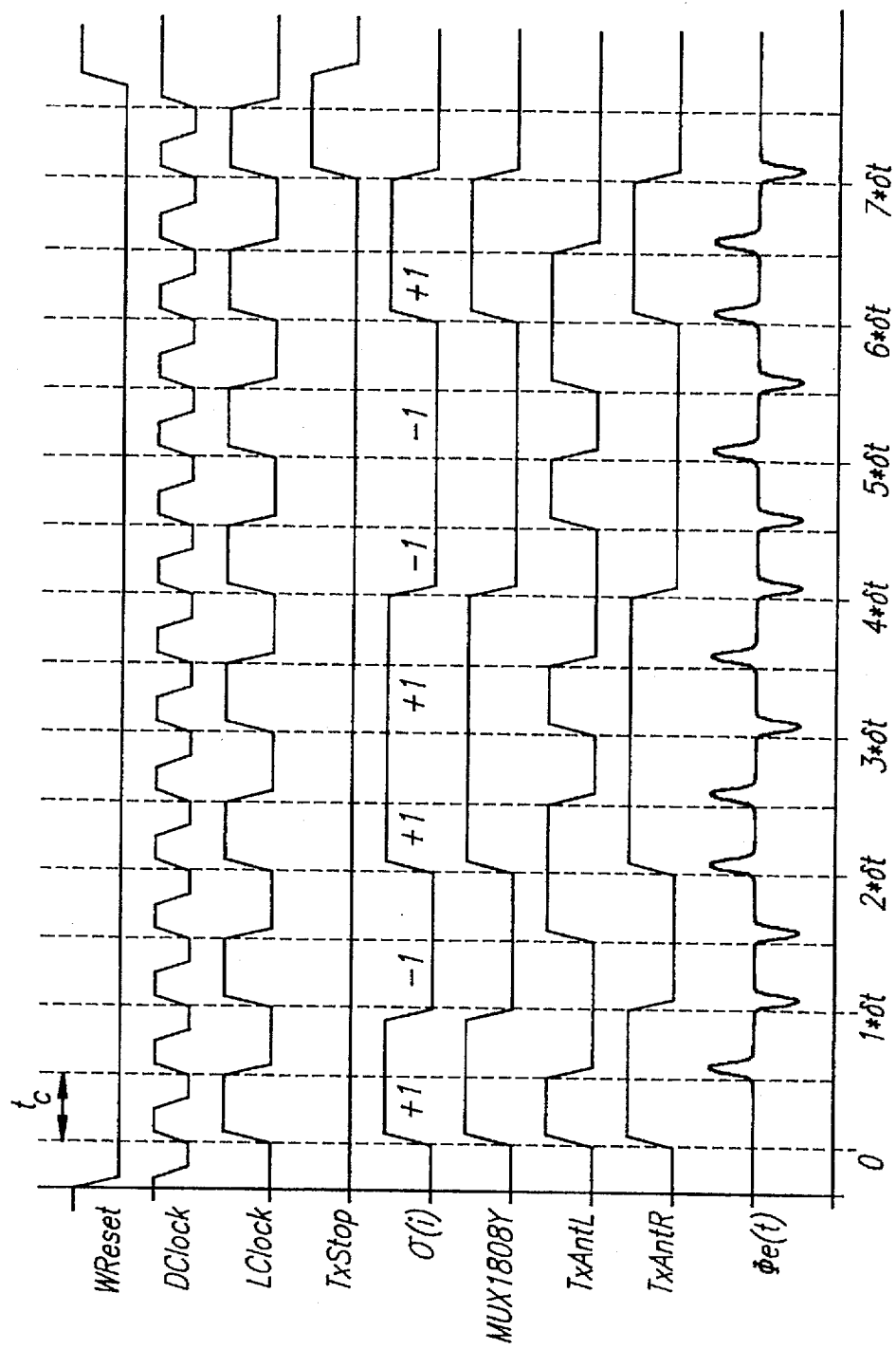

FIG. 21e shows a timing chart for the transmitter code-sequence generator 118 when the resting state register 1804 values are A1=0 and A0=0. As shown in FIG. 21e, the antenna signals TxAntL and TxAntR are low prior to time zero since WReset is asserted until shortly before time zero. At the beginning of the first chip (at time zero) when the code sequence value σ(1) is high, the antenna signals TxAntL and TxAntR go high since the value provided to the 00 input of the resting-state multiplexer 1808 is the value of the code sequence σ(1), and the high value of the half-speed clock LClock causes the output multiplexers 1812 and 1816 to select the values provided at their 1 inputs. Since both antenna signals TxAntL and TxAntR go high simultaneously, no current is produced across the antenna and the transmitted signal $\Phi_e(t)$ is unaffected. When the half-speed clock LClock goes low at the beginning of the second half of the first chip at time δt/2, the output multiplexers 1812 and 1816 then select the inverted and non-inverted values of the code sequence σ(1) at their 0 inputs, so the left antenna signal TxAntL goes low. This causes current to flow from right to left in the antenna, producing an impulse of positive polarity in the transmitted signal $\Phi_e(t)$ shortly after time δt/2, as shown in FIG. 21e (and as was the case in FIGS. 21b, 21c and 21d). At the beginning of the next chip at time δt the half-speed clock LClock goes from low to high, again selecting the resting state at the 1 inputs of the output multiplexers 1812 and 1816. Since the 00 input to the resting-state multiplexer 1808 now receives the low value of the second chip of the code sequence (σ(2)=−1), this causes the right antenna signal TxAntR to go low, producing no voltage differential across the antenna 101, so that the current which had previously flowed from right to left stops and the transmitted signal $\Phi_e(t)$ has an impulse of negative polarity shortly after time δt. At time 1.5*δt the half-speed clock LClock again goes low, so that the output multiplexers 1812 and 1816 select the inverted and non-inverted code sequence value σ(2) of the second chip, respectively. This cause the left antenna signal TxAntL to go high, generating current from left to right in the antenna 101 to produce an impulse of negative polarity shortly after time 1.5*δt. The selection of the resting state followed by the code sequence values σ(i) continues until the end of the code sequence σ(i) when the TxStop signal on line 137 is asserted. Subsequent to this the DClock signal goes high and the WReset signal is asserted.

The transmitter output flip-flops 1814 and 1818 are forced to zero by the WReset signal on line 170 between transmission events. The same WReset signal is used to reset the terminal count flip-flop 1832 and both the divide-by-two counters 1806 and 1820. Holding the divide-by-two counters 1820 and 1806 low until a transmission even starts insures that these counters 1820 and 1806 start up in phase with the system clock DClock on line 160.

Detailed Description of the Transmitter Antenna Driver

The transmitter antenna driver 116 of the present invention, shown in detail in FIG. 22, consists of a series of driver circuits 1680. In the preferred embodiment, there are eight identical driver circuits 1680.0 through 1680.7 (only three driver circuits 1680.0, 1680.1, and 1680.7 are shown for clarity, and only one 1680.0 is shown in detail). Under control of the processor 140 via data bus 190, a power control latch 1691 selects which driver circuits 1680 are enabled during a transmission. Enable signals from the active-low power enable outputs Y0 through Y7 are directed via lines 1670 through 1677 to transmitter driver circuits 1680.0 through 1680.7, respectively. The strength of the transmitted signal is proportional to the number of enabled driver circuits 1680, and the signal strength is increased for transmission to distant localizers or decreased to prevent overpowering nearby localizers. The power control latch 1691 is enabled by the TxPower signal directed to its Enable input via line 138. When the TxPower signal at the Enable input to the power control latch 1691 is low, all the power enable outputs Y0 through Y7 are high, disabling all the transmitter driver circuits 1680, thereby conserving power, and preventing the driver circuits 1680 from switching and generating noise during receiving or processing operations.

The transmitter code-sequence generator 118 generates a transmission command sequence TxAntL and TxAntR on lines 135 and 136 which controls the transmitter antenna drivers 1680. The transmission command sequence TxAntL and TxAntR is delayed through digitally-controlled delay units 1692 and 1693 and 1694 and 1695. The processor 140 controls the delays of these delay units 1692, 1693, 1694, and 1695 via the data bus 190 to compensate for timing variations in the delays induced by the antenna driver buffers (discussed below) in each transmitter driver circuit 1680.

The transmitter driver circuit 1680 includes an H-Bridge switch 1640 comprised of two upper p-channel MOSFET transistors 1641 and 1642, and two lower n-channel MOSFET transistors 1643 and 1644. As discussed above, when the H-bridge switch 1640 switches the current on or off across the antenna 101, an electromagnetic Gaussian impulse is radiated. The switching of MOSFET transistors is controlled by the voltage between the gate and the source. A p-channel transistor switches from off to on when its base voltage drops a threshold (approximately 1 to 2 volts) below its source voltage. Therefore, the upper left H-Bridge transistor 1641 switches on when a voltage below $V_{DD}$ arrives at its gate via the left OR gate 1610 and the top left series of buffers 1621–1624. The top left OR gate 1610 provides a low output when the power enable signal Y0 is low and the delayed transmission command value TxAntL on line 1665 is low. An n-channel transistor switches from off to on when its base voltage rises a threshold (approximately 1–2 volts) above its source voltage. Therefore, the lower left H-bridge transistor 1643 switches on when it receives a voltage greater than $V_{SS}$ at its gate via the left AND gate 1611 and the bottom left series of buffers 1625–1628. The left AND gate 1611 supplies a high signal when the transmission command value TxAntL is high, and a low signal from the Y0 output of the power control latch 1691 is inverted high by a left inverter 1612. Therefore, one of the left transistors 1641 or 1643 is turned on when the other is turned off. An advantage of using this combination of a p-channel and an n-channel transistor is that the switching is independent of the voltages on the antenna 101 since the antenna is connected to the drains of the transistors, and due to inductive effects the voltage across the antenna 101 may vary with time and even rise above $V_{DD}$ or below $V_{SS}$.

However, in an alternate embodiment the two upper MOSFET transistors 1641 and 1642 are replaced with n-channel MOSFET transistors. Advantages of n-channel MOSFET transistors is that they are smaller, have lower resistances, and better gain than equivalent p-channel transistors. To guarantee that the upper transistors turn off, a voltage greater than $V_{DD}$ must be provided, possibly by voltage multiplier circuits. It should be noted that voltages less than $V_{SS}$ are difficult to provide for chips fabricated using the N-Well process since the substrate voltage is $V_{SS}$, and therefore it is problematic to use p-channel MOSFET transistors in the lower portion of the H-bridge switch.

The right side of the H-bridge is controlled by the transmission command sequence TxAntR on line 136 and works in an identical manner. The upper right H-bridge transistor 1642 is a p-channel MOSFET which switches on when a low signal is directed to its gate via the right OR gate 1613 and the top right series of buffers 1631–1634. The right OR gate 1613 provides a low output when the power enable signal Y0 is low and the delayed transmission command sequence value TxAntR on line 1666 is low. The lower right H-bridge transistor 1644 is an n-channel MOSFET which switches on when it receives a high signal at its gate via the right AND gate 1614 and the bottom right series of drivers 1635–1638. The right AND gate 1614 only supplies a high signal when the delayed value TxAntR is high, and a low signal from the Y0 output of the power control latch 1691 is inverted high by a right inverter 1615.

The upper left staged buffers 1621, 1622, 1623 and 1624 are used to increase the current from the output of the left OR gate 1610 so that the upper left H-bridge transistor 1641 can be switched off and on quickly. Since the radiated signal is a function of the first derivative of the antenna current, the faster the transistors 1641, 1642, 1643 and 1644 switch, the greater the radiated signal strength. For clarity, four upper left staged buffers are shown in FIG. 22, though more or fewer may be employed. The required number of buffer stages is a function of the size of the H-bridge transistor 1641 and the CMOS process parameters. The actual value of the delay introduced by the upper left buffers 1621 through 1624 is not important, if this delay is identical to the delay of the buffers on all the other branches of the H-bridge. Slight differences in the characteristics of the semiconductor from which the upper left buffers are manufactured may however result in different delays for each chain of buffers. To counteract this, the digitally controlled delay 1692 is controlled by the processor 140 via data bus 190 to insure that the delay to the upper left H-bridge transistor 1641 is identical to the delays to all the other transistors 1642, 1643 and 1644. The resulting total delay between the arrival of a transmission command sequence value TxAntL at the upper left delay 1692 and the time that the upper left H-bridge transistor 1641 switches on is then a constant that can be subtracted out by the software during ranging calculations.

Similarly, the upper right staged buffers 1631–1634, the lower left staged buffers 1625–1628, and the lower right staged buffers 1635–1638 increase the current from the right OR gate 1613, and the left and right AND gates 1611 and 1614 to cause upper right and bottom left and right H-bridge transistors 1642, 1643 and 1644, respectively, to be switched on and off rapidly. Digitally controlled delays 1694, 1693, and 1695 allow the total delay through the upper right staged buffers 1631–1634, the lower left staged buffers 1625–1628, and the lower right staged buffers 1635–1638 to be adjusted, respectively, until the total delays are all equal.

Two vertical H-bridge lines 1653 and 1654 connect the upper H-bridge transistors 1641 and 1642 to the lower H-bridge transistors 1643 and 1644, respectively. Lead 157 connects the left H-bridge line 1653 to the left side of the external antenna 101, and lead 158 connects the right H-bridge line 1654 to the right side of the external antenna 101.

To produce a doublet, the H-bridge transistors may be turned on and off in any of several different patterns. In a first case, in the resting state the upper H-bridge transistors 1641 and 1642 are held on, while the lower H-bridge transistors 1643 and 1644 are held off. To start the transmission of a positive doublet, the command sequence value TxAntR goes high, causing upper right H-bridge transistor 1642 to switch off and lower right H-bridge transistor 1644 to switch on, so current flows through upper left H-bridge transistor 1641, down the upper half of the left vertical line 1653, out the left lead 157, across the antenna 101, back into the transmitter driver 116 through right lead 158, down the lower half of the right vertical line 1654, and through lower right H-bridge transistor 1644. During the time that the current is changing (1 or 2 nanoseconds), the antenna 101 will broadcast a single positive Gaussian electromagnetic impulse. After the current reaches the steady state, no signal is produced since the signal is proportional to the change in current. Next, the command sequence value TxAntR goes back to low, causing upper right transistor 1642 to switch on while lower right transistor 1644 switches back off again. This will cause the current across the antenna to change from maximum to zero, producing a second Gaussian electromagnetic impulse with a polarity of the electric vector opposite to that of the first Gaussian impulse. An impulse with a polarity of the electric vector in a first direction (caused by current flowing from left to right) followed by an impulse with a polarity of the electric vector in a direction opposite to the first one, is called a positive doublet. A negative doublet has impulses whose polarities of the electric vectors are opposite to that of a positive impulse. A negative impulse can be produced by raising and lowering the command sequence value TxAntL instead of the command sequence value TxAntR as outlined previously. In this case, the resulting current first goes from right to left through the antenna 101, producing a first Gaussian impulse with a polarity of the electric vector opposite to the polarity of the first impulse in a positive doublet. Then, when the current is turned off an impulse of the opposite polarity to the first pulse in the doublet is produced.

Doublets can also be produced by a starting state where the bottom two H-bridge transistors 1643 and 1644 are held on, while the upper two H-bridge transistors 1641 and 1642 are held off. This is called a low resting state. When in the low resting state, lowering and then raising the command sequence value TxAntL will produce a positive doublet, and lowering and then raising the command sequence value TxAntR produces a negative doublet. Asymmetries and resistive losses in the circuit cause a small residual field in the antenna after every doublet. Switching between different resting states helps to balance this current out to zero. There is a slight difference in the switching speed of the two upper p-channel transistors 1641 and 1642 and the switching speed of the two lower n-channel transistors 1643 and 1644 which can effect the shape of the Gaussian impulses and the spectrum of the resulting signal. Alternating between resting states helps to balance out these effects also.

The physical orientation of a receiving localizer can result in a positive doublet being detected as a negative doublet if the antenna is rotated by 180°. When a string of digital bits, such as corrections bits 451, 461, etc., are sent with antipodal modulation, having an incorrect polarity can result in an incorrect value being received. Several protocols can be used to determine the true polarity of a doublet. In a first protocol, all the ranging transactions are performed with positive doublets. If the polarity of these doublets appears to be negative, then the orientation of the transmitting antenna is assumed to be backwards, and the polarity of all transactions is assumed to be backwards. In a second protocol, strings of correction bits are always prefaced by a short prearranged code. If this code is received inverted, then the orientation of the antenna is assumed to be opposite, and all the digital bits are inverted.

Detailed Description of the Antennas

Figure 23A:
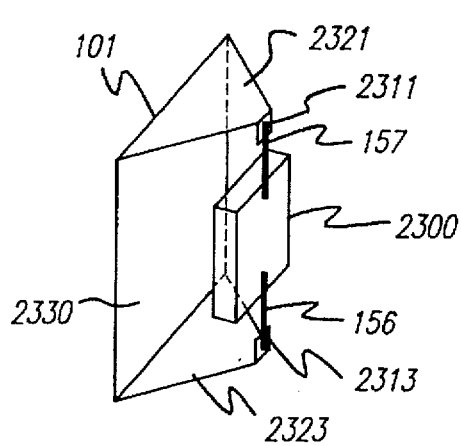
FIGS. 23a, 23c and 23e are perspective views of three embodiments of antenna/circuitry systems according to the present invention.
Figure 23B:
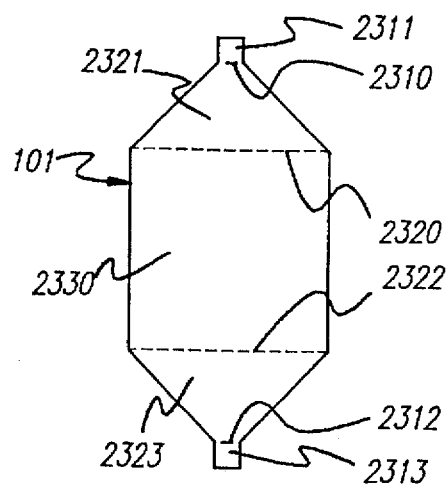
FIGS. 23b and 23d are views of metal sheets which may be folded to provide the antennas of FIGS. 23a and 23c, respectively.

As shown in FIG. 23a and the flattened view of the antenna 101 of FIG. 23b, the transmitter antenna 101 of the present invention is a modification of a frequency-independent current-mode shielded loop antenna developed by Dr. Henning Harmuth and disclosed in U.S. Pat. No. 4,506,267. The transmitter antenna 101 is an ultra-wideband large-current radiator (LCR) antenna which radiates outwards from the surface of a flat rectangular conducting plate 2330. In the preferred embodiment the conducting plate is rectangular 2330. A first triangular section 2321 extends from the top edge 2320 of the plate 2330, and a second triangular section 2323 extends from the bottom edge 2322 of the plate 2330. At the apexes of the triangular sections 2321 and 2323 opposite the edges adjacent the plate 2330 extend connection tabs 2311 and 2313, respectively. Leads 157 and 156 connect the circuit block 2300 to the conducting plate 2330 via connection tabs 2311 and 2313 and triangular sections 2321 and 2323, respectively. The circuit block 2300 contains a power source (not shown in the Figures) and all the circuitry of FIG. 1 (except the antennas 101 and 102). In contrast to the disclosures of Harmuth, it has been found that it is not necessary to shield the circuit block 2300 and the leads 156 and 157 to the LCR antenna 101 with high-permittivity or high-permeability materials. FIG. 23b shows a flattened view of the antenna 101 to illustrate how a planar sheet of metal foil can be folded to provide the transmitter antenna 101 of FIG. 23a by bending the two attachment tabs 2311 and 2313 up 90° along a first pair of dotted lines 2310 and 2312, then bending the two triangular sections 2321 and 2323 up 90° along a second pair of dotted lines 2320 and 2322, respectively.

Figure 23C:
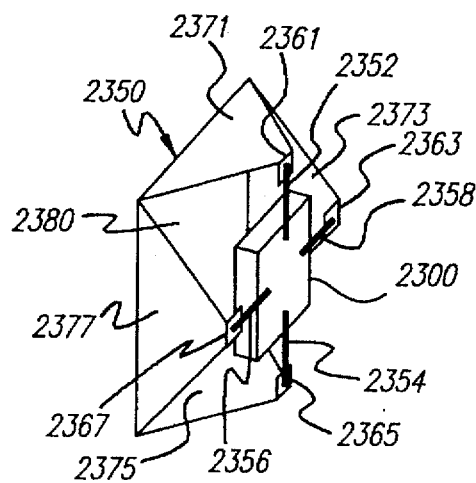
Figure 23D:
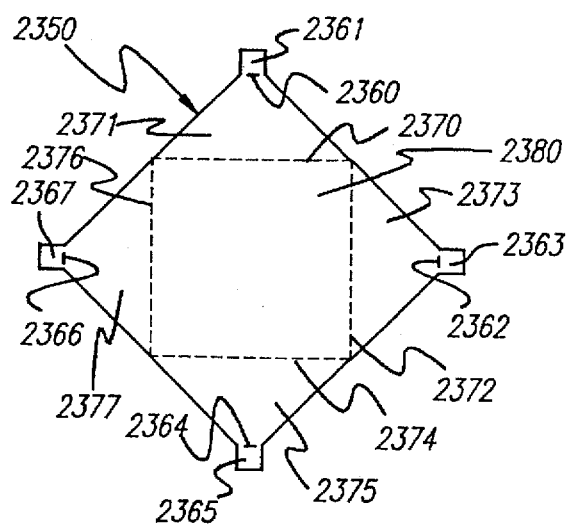

An alternate preferred embodiment of the present invention uses a bi-loop LCR antenna 2350, as shown in FIG. 23c, to produce a signal with polarizations on two axes separated by 90°. This antenna 2350 has a square radiating plate 2380 with a triangular section 2371, 2373, 2375 and 2377 extending from each side of the antenna 2350. Each triangular section 2371, 2373, 2375 and 2377 has a connection tab 2363, 2365 and 2367 extending from the apex of the triangular section 2371, 2373, 2375 and 2377, respectively, opposite the side adjacent the square radiating plate 2380. The antenna 2350 is attached to the circuit block 2300 by a first pair of leads 2352 and 2354 which are connected across one pair of opposite connection tabs 2361 and 2365 of the antenna 2350, and a second pair of leads 2356 and 2358 which are connected across the other pair of opposite connection tabs 2367 and 2363 of the antenna 2350. FIG. 23d shows a flattened configuration of the antenna 2350 of FIG. 23c. The antenna 2350 can be manufactured from a piece of planar metal foil by bending the four attachment tabs 2361, 2363, 2365, and 2367 up 90° along dotted lines 2360, 2362, 2364, and 2366, then bending the four triangular sections 2371, 2373, 2375, and 2377 up 90° along dotted lines 2370, 2372, 2374, and 2376.

By sending the same code on each transmission axis of the antenna 2350, separated by a short time interval, one or the other transmission will be received by a single loop antenna whose normal vector is substantially aligned with that of the plane of the bi-loop antenna 2350. If the receiver is also a bi-loop antenna 2350, then reception can occur regardless of the relative orientation of the antennas 2350. Another advantage of the bi-loop antenna 2350 is that it can be used, with sufficient extra circuitry, to transmit different codes on each axis and double the amount of information communicated between localizers, or increase the signal-to-noise ratio. Sending double codes would, however, put restrictions on the relative orientation of the two localizers.

Figure 23E:
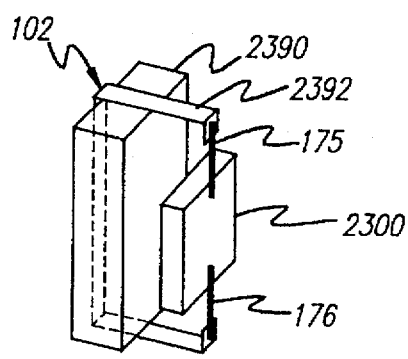
Figure 23F:
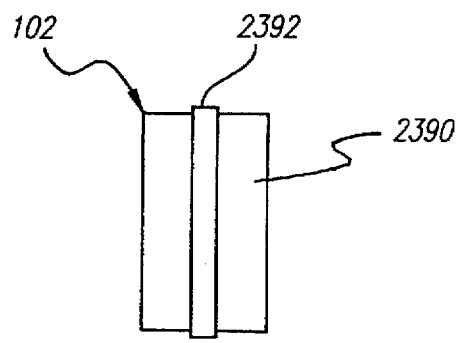
FIG. 23f is a front view of the system of FIG. 23e.
Figure 24A:
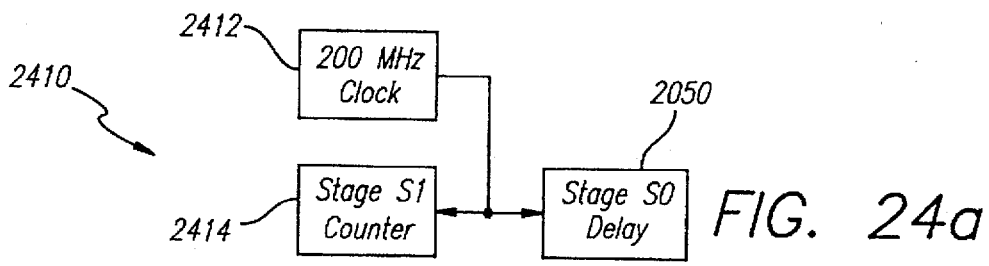
FIGS. 24a–24e show five embodiments of a timebase for providing an extremely fast clock with an extended range. The fifth embodiment shown in FIG. 24e corresponds to the preferred embodiment described in detail below.
Figure 24B:
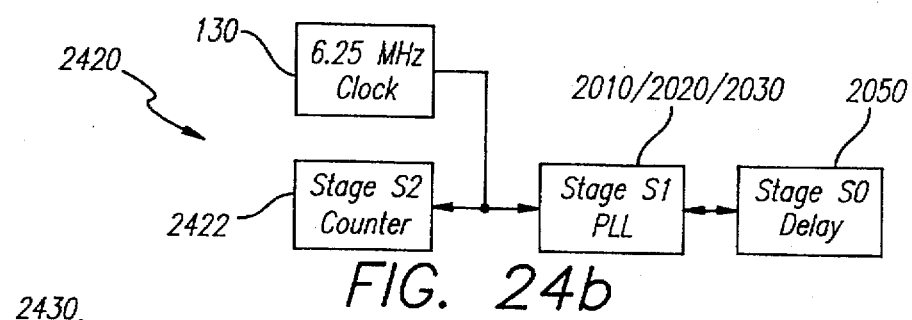
Figure 24C:
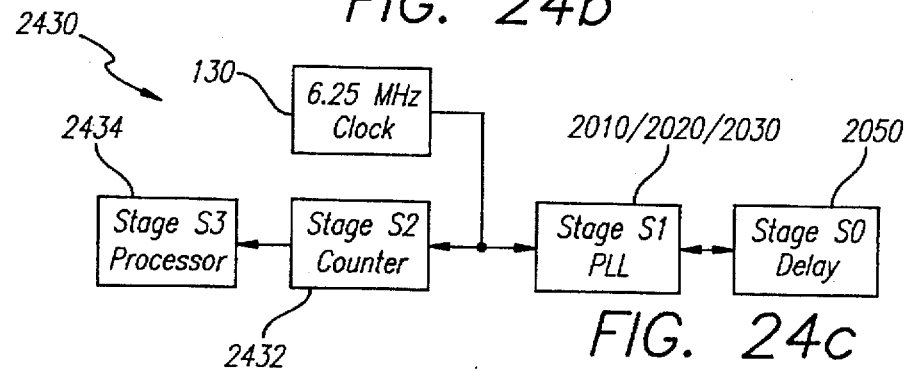
Figure 24D:
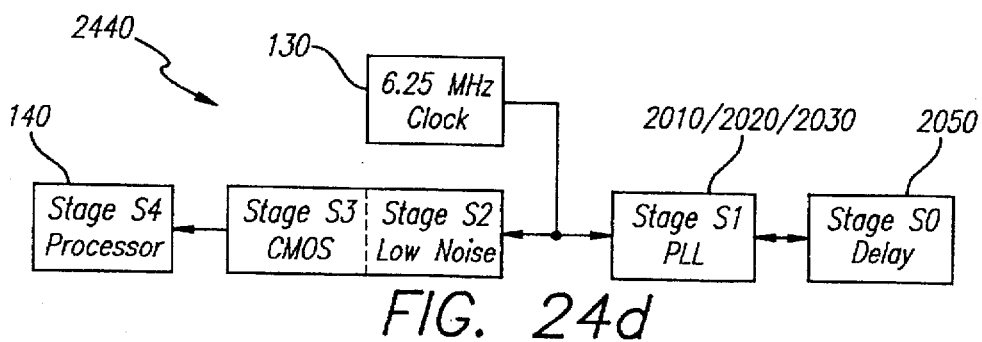
Figure 24E:
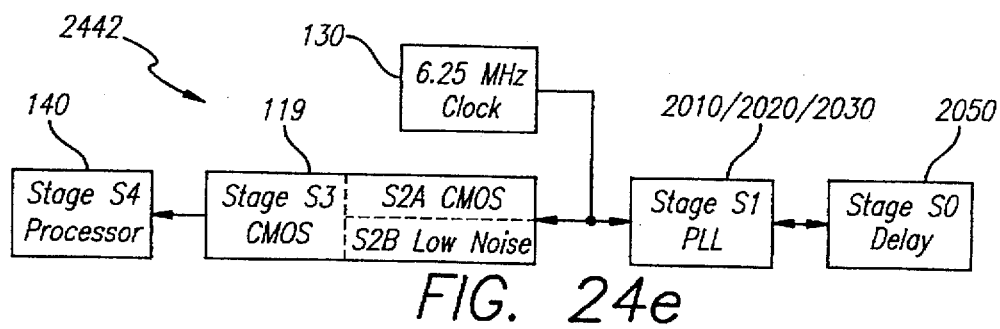

In the preferred embodiment, the transmitter antenna 101 or 2350 is used for both transmitting and receiving impulse sequences $\Phi_e(t)$. However, in some applications it is advantageous to have a separate receiver antenna 102. To switch a single antenna from connection between the transmission and reception circuitry, the required switch must be faster than standard mechanical switches and have less capacitance than a sufficiently large CMOS transistor. Switches of sufficiently high speed and low capacitance are difficult to construct with CMOS technology. It is often easier and less expensive to manufacture a localizer with a separate receiver antenna for applications where the bulk of a second antenna is not objectionable. As shown in the rear perspective view of FIG. 23e and the front view of FIG. 23f, the separate receiver antenna 102 is a closed loop sensor (see "Antennas and Wave Guides for Nonsinusoidal Waves," by Dr. Henning Harmuth, Academic Press, Inc., 1984) consisting of a U-shaped strip of metal 2392, backed by a ferrite plate 2390 or some other other high-permeability material, to increase the strength of the received signal $\Phi_e(t)$. (The transmitter antenna 101 is not shown in FIG. 23e for clarity.) A strip of metal 2392 is used rather than a wire, to achieve a lower impedance of the receiver antenna 102. Two leads 175 and 176 connect the circuit block 2300 to the receiver antenna 102.

The size of the antennas 101 and 102 is limited to less than 30 centimeters by the propagation time of current impulses through the antennas 101 and 102; when impulses as short as one nanosecond propagate through an antenna with a length greater than 30 centimeters, the current across the antenna is sufficiently nonuniform to substantially reduce the transmission and reception efficiencies. The lower bounds on the size of the transmitter and receiver antennas 101 and 102/circuit block 2300 system is determined only by the minimum sizes of the battery, the crystal oscillator 130, and the rest of the circuitry. In the preferred embodiment, all the circuitry resides on a single CMOS or BiCMOS VLSI chip. The power source is a small battery (such as the zinc-air batteries under development by Dreisbach ElectroMotor Inc. of Santa Barbara, Calif.), a thin-film fuel cell (such as those under development by. K. Dyer of Bell Communications Research, N.J.), or a rechargeable thin-film lithium microbattery (such as those under development at Oak Ridge National Laboratory, Tennessee, by John B. Bates) on the back of the chip. In an alternate embodiment which allows for further miniaturization, the crystal oscillator 130 is replaced with a micro-machined mechanical resonator integrally formed from the VLSI chip, and the entire localizer is only about the size of a coin, i.e., one or two centimeters square.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Many variations are within the scope of the present invention, for instance: the transmitted impulse sequences may be encoded to carry information using other forms of encoding; other means may be used to provide low-noise circuitry; the transmission code sequence circuitry need not be low-noise logic; other ranging protocols may be used; other means for privacy protection may be implemented; other methods for synchronization of localizers may be used; the time base may be decomposed into stages other than those described in the discussion of the low- and high-frequency clocks, for instance, the low-frequency clock may have more or fewer stages, or the high-frequency clock may have more or fewer stages; the clock rate of the crystal oscillator may be greater than or less than 6.25 MHz; the phase-lock loop circuit may increase the clock rate by more than or less than a factor of thirty-two; the antenna may have another configuration; the impulses may have larger or smaller widths; the transmitted impulses may be separated by other time intervals; the number of correlator bins may be different than described above; the linear feedback shift register may generate other types of pseudorandom impulse sequences; the linear shift register may be replaced with a RAM for generating Barker codes, Bent codes, "No" codes, GMW codes or complimentary codes; the impulse sequences may be generated from RAM; other integrator circuits may be used; other doublet waveforms may be used; fine structure waveforms other than doublets may be used; other time bin offsets may be used; the closed loop sensor receiver antenna may not be backed with a high-permeability plate; etc. In summary, it is intended that the scope of the invention be defined by the claims appended hereto and their equivalents.

We claim:

1. A receiver for reception of nonsinusoidal spread spectrum radio communications from a nonsinusoidal spread spectrum radio transmitter comprising:
a spread spectrum radio antenna having an ultra-wide bandwidth for receiving a nonsinusoidal communication signal impingent thereon during a reception time window;
a code-sequence generator to generate a digital pseudorandom sequence resembling a portion of said nonsinusoidal communication signal;
a time-integrating correlator to calculate values of integrals of a product of said communication signal and delayed versions of said digital pseudorandom sequences, said communication signal being an analog waveform derived from a digital signal generated at said nonsinusoidal spread spectrum radio transmitter; and
a processor for determining an arrival time of said communication signal from said values of said integrals.

2. The receiver of claim 1 wherein said processor determines data content of said communication signal.

3. The receiver of claim 1 wherein said code-sequence generator has a first low-coupled-noise circuit in use during said reception time window, and said time-integrating correlator has a second low-coupled-noise circuit in use during said reception time window, a signal path of said nonsinusoidal communication signal being external to said first and second low-coupled-noise circuits, and said first and second low-coupled-noise circuits reducing contamination of said nonsinusoidal communication signal with radiated noise and supply-line noise.

4. The receiver of claim 3 wherein said processor is inactive during said reception time window.

5. The receiver of claim 3 wherein said first and second low-coupled-noise circuits use current-steering circuitry to reduce supply-line noise and electromagnetic emissions, and increase signal-to-noise ratio of said reception.

6. The receiver of claim 1 wherein said nonsinusoidal spread spectrum radio communications have an extremely high chip rate, and components of said receiver have a maximum switching speed comparable to an inverse of said extremely high chip rate.

7. The receiver of claim 1 wherein said spread spectrum antenna effectively lacks a radio frequency electromagnetic resonance.

8. The receiver of claim 1 wherein said processor determines said arrival time by a comparison of said values of said integrals ordered according to delay times of said delayed versions of said digital pseudorandom sequences with a first function and a second function.

9. The receiver of claim 1 wherein said processor determines said arrival time according to a location of a zero crossing of said values of said integrals ordered according to delay times of said delayed versions of said digital pseudorandom sequences.

10. The receiver of claim 1 wherein said processor determines said arrival time based on sign and magnitude of multiple extrema of said values of said integrals.

11. A receiver for reception of nonsinusoidal spread spectrum radio communications comprising:
a spread spectrum radio antenna for receiving a nonsinusoidal communication signal impingent thereon during a reception time window;
a code-sequence generator to generate a digital pseudorandom sequence resembling a portion of said communication signal;
a time-integrating correlator to calculate values of integrals of a product of said communication signal and delayed versions of said digital pseudorandom squence, where said nonsinusoidal communication signal, denoted as $\Phi_e(t)$, has the form $$\Phi_e(t) = \sigma[t/\delta t] * \gamma_e(t \bmod \delta t),$$

where square brackets indicates that an argument inside said square brackets is to be taken as a greatest integer less than or equal to said argument, $\gamma_e$ is a received chip waveform, $\delta t$ is a chip duration, and $\sigma$ is a pseudorandom sequence, and said digital pseudorandom sequence, denoted as $\Phi_i(t)$, has the form $$\Phi_i(t) = \sigma[t/\delta t] * \gamma_i(t \bmod \delta t),$$

where $\gamma_i$ is a digital chip waveform, and said received chip waveform and said digital chip waveform are similar enough that $$\frac{[\int \gamma_i(\tau)^* \gamma_e(\tau) d\tau]^2}{[\int \{\gamma_i(\tau)\}^2 d\tau] * [\int \{\gamma_e(\tau)\}^2 d\tau]},$$

integrating from 0 to $\delta t$, is on the order of unity; and
a processor for determining an arrival time of said communication signal from said values of said integrals.

12. The receiver of claim 11 wherein a difference in delay times of a pair of said delayed versions of said digital pseudorandom sequence is less than or equal to one quarter of said chip duration $\delta t$.

13. A receiver for reception of nonsinusoidal spread spectrum radio communications comprising:
a spread spectrum radio antenna for receiving a nonsinusoidal communication signal impingent thereon during a reception time window;
a code-sequence generator to generate a digital pseudorandom sequence resembling a portion of said communication signal, said code-sequence generator having a first low-coupled-noise circuit in use during said reception time window;
a time integrating correlator to calculate values of integrals of a product of said communication signal and delayed versions of said digital pseudorandom sequence, said time-integrating correlator having a second low-coupled-noise circuit in use during said reception time window;

a processor for determining an arrival time of said communication signal from said values of said integrals;

a low-frequency clock which provides a low-frequency clock signal, said low-frequency clock having a first standard-logic circuit which is inactive during said reception time window, a third low-coupled-noise circuit which is active during said reception time window, and a means for inactivating and activating said first standard-logic circuit and said third low-coupled-noise circuit; and a high-frequency clock which processes said low-frequency clock signal from said third low-coupled-noise circuit to provide a high-frequency clock signal supplied to said code-sequence generator and said time-integrating correlator, said high-frequency clock having a fourth low-coupled-noise circuit in use during said reception time window.

14. The receiver of claim 13 wherein said first, second, third and fourth low-coupLed-noise circuits use current-steering circuitry to reduce supply-line noise and electromagnetic emissions, and increase signal-to-noise ratio of said reception.

15. A receiver for reception of nonsinusoidal spread spectrum radio communications comprising:

a spread spectrum radio antenna for receiving a nonsinusoidal communication signal impingent thereon during a reception time window;

a code-sequence generator to generate a digital pseudorandom sequence resembling a portion of said communication signal, said code-sequence generator having a first low-coupled-noise circuit in use during said reception time window;

a time-integrating correlator to calculate values of integrals of a product of said communication signal and delayed versions of said digital pseudorandom sequence, said time-integrating correlator having a second low-coupled-noise circuit in use during said reception time window;

a processor for determining an arrival time of said communication signal from said values of said integrals;

a high-frequency clock which provides a high-frequency clock signal supplied to said code-sequence generator and said time-integrating correlator, said high-frequency clock having a third low-coupled-noise circuit in use during said reception time window; and a low-frequency clock which derives a low-frequency clock signal from said high-frequency clock signal, and provides said low-frequency clock signal to said processor, said low-frequency clock having a first standard-logic circuit which is inactive during said reception time window, and a means for inactivating said first standard-logic circuit during said reception time window.

16. A receiver for reception of nonsinusoidal spread spectrum radio communications comprising:

a spread spectrum radio antenna for receiving an ultra-wide bandwidth nonsinusoidal communication signal impingent thereon during a reception time window; and a monolithic integrated signal processor for processing said nonsinusoidal communication signal impingent on said spread spectrum radio antenna, said monolithic integrated signal processor including a code-sequence generator to generate a digital pseudorandom sequence resembling said communication signal;

a time-integrating correlator to calculate values of integrals of a product of said communication signal and delayed versions of said digital pseudorandom sequence; and means for determining an arrival time of said communication signal from said values of said integrals.

* * * * *